(12) United States Patent
Stamler et al.

(10) Patent No.: US 7,469,279 B1
(45) Date of Patent: Dec. 23, 2008

(54) AUTOMATIC RE-PROVISIONING OF NETWORK ELEMENTS TO ADAPT TO FAILURES

(75) Inventors: Arnold Stamler, Sunnyvale, CA (US); Tohru Kao, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 914 days.

(21) Appl. No.: 10/635,894

(22) Filed: Aug. 5, 2003

(51) Int. Cl.
G06F 15/177 (2006.01)
G06F 15/173 (2006.01)

(52) U.S. Cl. ................... 709/221; 709/220; 709/222; 709/223

(58) Field of Classification Search ............ None
See application file for complete search history.

(56) References Cited

U.S. PATENT DOCUMENTS

| | | | |
|---|---|---|---|
| 5,751,967 A * | 5/1998 | Raab et al. ............ 709/228 |
| 5,835,696 A | 11/1998 | Hess |
| 5,963,540 A | 10/1999 | Bhaskaran |
| 6,148,410 A | 11/2000 | Baskey et al. |
| 6,456,600 B1 * | 9/2002 | Rochberger et al. ......... 370/255 |
| 6,628,661 B1 * | 9/2003 | Goldman et al. ............ 370/408 |
| 6,636,239 B1 | 10/2003 | Arquie et al. |
| 6,788,315 B1 | 9/2004 | Kekic et al. |
| 6,856,591 B1 | 2/2005 | Ma et al. |
| 6,903,755 B1 | 6/2005 | Pugaczewski et al. |
| 7,076,645 B2 | 7/2006 | Mittal et al. |
| 7,092,354 B2 * | 8/2006 | Jensen ....................... 370/218 |
| 7,139,928 B1 * | 11/2006 | Bhattacharya et al. ......... 714/4 |
| 2001/0021198 A1 | 9/2001 | Hsu et al. |
| 2002/0186653 A1 | 12/2002 | Jensen |
| 2003/0169692 A1 * | 9/2003 | Stern et al. .................. 370/242 |

OTHER PUBLICATIONS

Hewlett-Packard, "Using Network Node Manager—HP OpenView, Edition 1," Copyright 1997, J1136-90001 HP-UX and Solaris, Apr. 1997, pp. 1-80.

* cited by examiner

Primary Examiner—John B. Walsh
(74) Attorney, Agent, or Firm—Hickman Palermo Truong & Becker LLP

(57) ABSTRACT

A method of automatically re-provisioning a network element in adaptation to a failure comprises the computer-implemented steps of identifying a network element that has failed; selecting a substitute network element from among a pool of one or more available network elements; receiving connection configuration information from the identified network element; and, based on the connection configuration information, re-configuring the substitute network element and one or more switch devices associated with the identified network element, wherein the re-configuring causes the one or more switch devices to change one or more connections from the identified network element to the substitute network element.

61 Claims, 27 Drawing Sheets

FIG. 5

AUTOMATIC RE-PROVISIONING OF NETWORK ELEMENTS TO ADAPT TO FAILURES

FIELD OF THE INVENTION

The present invention generally relates to network management. The invention relates more specifically to automatic re-provisioning of network elements to adapt to failures.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

For network management purposes, a network element cluster may be defined as a first network switch, a plurality of network elements, some of which are actively processing or routing data and others of which are held in a backup pool for use in the event of a failure, and a second network switch. If one of the active network elements experiences a transient or permanent failure, proper operation of the network requires taking the failed network element offline and substituting one of the backup network elements. Because the first and second network switches have numerous logical connections established with the failed network element, such substitution also requires re-configuration of both the first and second network switches so that the connections reference the substituted backup network element.

At present, the process of substitution and re-configuration is manual and requires an unacceptably long amount of time, ranging from hours to days. There is no automated method for performing the substitution and re-configuration, which are collectively termed "re-provisioning" herein. Industry service providers have a great need for improved methods and system that can solve this problem.

In one specific industry context, Cisco 7400 ASR from Cisco Systems, Inc. offers enterprise and service provider customers a cost-effective, single-platform solution with the high performance, density, availability, and scalability to be deployed across the network from enterprise to POP environments. By leveraging the multifunction capabilities of the Cisco 7400 ASR, a customer can simplify its network architecture, significantly reducing costs and increasing revenue opportunities through value-added services.

In particular, as the business of a service provider grows, a group of 7400 devices may be clustered into a single logical resource for administrative and management simplicity. The cluster typically is logically interposed between two switch devices that are associated with different networks, such as a metro ATM switch and an Ethernet switch. Commercial examples of ATM switches include the LS1010, Catalyst 8510, and Catalyst 8540 from Cisco Systems. Commercial examples of Ethernet switches include the 2948G and 3500XL from Cisco Systems. The ability to provision and manage a cluster of device is critical to the success of a customer and hence the success of the 7400 platform.

However, at this time, there is no single solution to manage this particular cluster of devices. Service provider customers, in particular, desire to have service and subscriber-provisioning tools that provide a full solution, including re-provisioning of clusters in response to failure of a network element in a cluster.

One of the chief concerns during cluster management is the case where one of the devices in the cluster fails. It is a costly solution if human intervention is required to move all the connections from the failed node to a back-up node. Customers need a higher availability solution that will automate fail-over when a node in a cluster fails, and that has a minimal impact on service. Hence, in case of a failure of a node, all connections on that node must be switched to an alternate with minimal effect or no effect on service.

Various failover techniques are known for use with replicated servers in a server farm and in redundant processor scenarios. For example, Cisco Systems has technology known as stateful switchover (SSO) and non-stop forwarding (NSF); however, both are intra-device solutions that can be applied only at the switch level and cannot provide a solution for a cluster or stack of network elements. Currently no approach provides for automatically implementing changes on both an ATM switch and a Router with one tool.

Other solutions include redundant processor cards, but none of them can deal with redundancy across different platforms. For example, the IBM HACMP system and the Tandem NonStop system require total "shadowing" of software, data and hardware resource in the system. The NonStop computing architecture is based on hot-standby replication of cluster nodes combined with transaction processing enforced at the OS level. Rings of cluster nodes regularly ping each other. If a node suspects another failed node, it becomes the 'leader' and broadcasts a regrouping message. This is a very expensive and complicated approach that does not address the specific problems outlined above. Thus, prior techniques have not been applied to clustered network devices in a way that addresses the foregoing problems.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5 is a screen display diagram showing a user interface page providing for creating a stack;

DETAILED DESCRIPTION OF THE PREFERRED EMBODIMENT

Figure 1A:
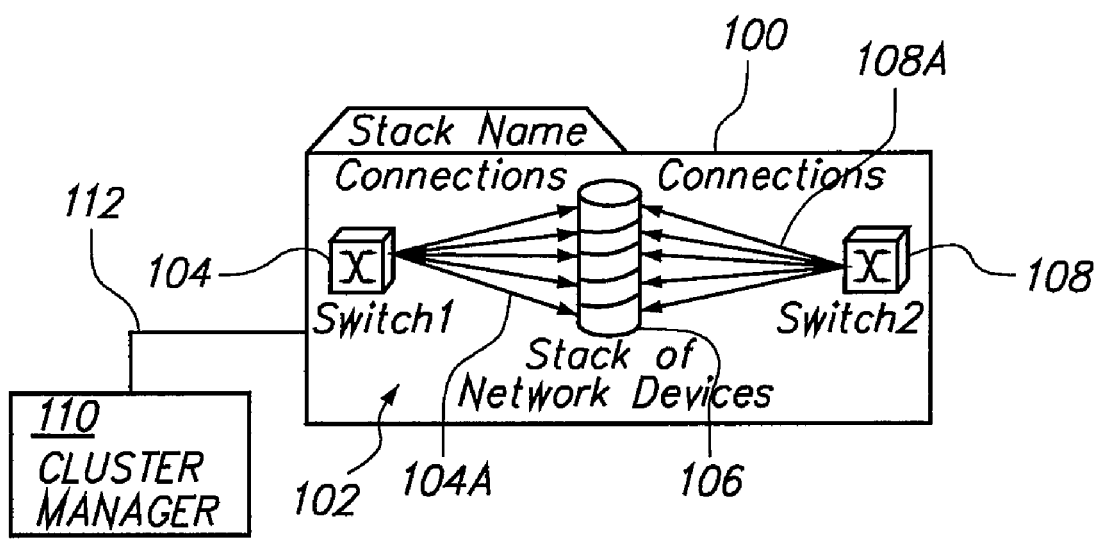
FIG. 1A is a diagram of a graphical image that may be used to illustrate elements of a cluster.

Automatic re-provisioning of network elements in adaptation to failure is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Structural and Functional Overview
3.0 Automatic Re-Provisioning of Network Elements to Adapt to Failures
   3.1 Cluster Manager Operations
   3.2 User Interface Example
      3.2.1 Create Stack Operation
      3.2.2 Edit Stack Operation
      3.2.3 Console Access Operation
      3.2.4 Operational Overview Operation
4.2 Implementation Mechanisms—Hardware Overview
5.0 Extensions and Alternatives

1.0 General Overview

The needs identified in the foregoing Background, and other needs and objects that will become apparent for the following description, are achieved in the present invention, which comprises, in one aspect, a method for automatically re-provisioning a network element in adaptation to a failure comprises the computer-implemented steps of identifying a network element that has failed; selecting a substitute network element from among a pool of one or more available network elements; receiving connection configuration information from the identified network element; and, based on the connection configuration information, re-configuring the substitute network element and one or more switch devices associated with the identified network element, wherein the re-configuring causes the one or more switch devices to change one or more connections from the identified network element to the substitute network element.

According to one feature of this aspect, the identified network element is one of a plurality of network elements in a cluster that is associated with first and second network switches. According to another feature, the steps are performed by a cluster manager that is communicatively coupled to a cluster comprising a plurality of active network elements, the pool of one or more available network elements, a first network switch, and a second network switch. In yet another feature, the step of re-configuring comprises the steps of sending a trigger event to the substitute network element that causes the substitute network element to retrieve a configuration over a network connection.

Alternatively, a configuration is sent directly to a device; however, this alternative increases bandwidth and may affect responsiveness of a device.

In still another feature, re-configuring comprises dynamically reconfiguring the selected network element as a logical clone of the identified network element. According to still another feature, the method further comprises the step of associating the identified network element with the pool of available network elements. In yet another feature, the method further comprises sending an initial configuration to the substitute network element; sending a partial accumulated configuration to the substitute network element; and sending instructions that cause the identified network element to adopt a configuration setting of a cluster associated with the identified network element. In certain embodiments, the configuration setting is adopted by instructing the device to reboot; in other embodiments, rebooting is not required.

In another feature, the method further comprises receiving first user input in a graphical user interface that associates the network elements in a cluster with a first switch and a second switch; receiving second user input that specifies which network elements are reserved in the pool of available network elements. In one feature, each of the network elements is a network aggregation device or a network access server. In still another feature, the steps are repeated for multiple concurrently failed network elements.

In yet another feature, the method further comprises receiving a message specifying a failure of a network element over an event bus on which the network elements publish events and on which a cluster manager subscribes to events; based on the message, identifying the network element that has failed. In still another feature, the network switches comprise an asynchronous transfer mode (ATM) switch and an Ethernet switch, and the network elements are routers in a packet-switched network. In other embodiments, any other types of switches can be used in a cluster, and there may be no switches in a cluster.

In other aspects, the invention encompasses a computer apparatus and a computer-readable medium configured to carry out the foregoing steps.

2.0 Structural and Functional Overview

An automated solution for managing the process of failover is provided. In one embodiment of the solution herein, a cluster manager provides a user interface (UI) and an application programming interface (API) for administrators to create, edit and remove programmatic cluster objects. Each cluster object represents a physical cluster consisting of a first switch, a plurality of network devices ("nodes"), and a second switch. Alternatively, a cluster may comprise more than one first switches, and more than one second switches, as described further in the section entitled "Extensions and Alternatives." For each cluster object, the user may specify which devices are reserved as an available pool of backup devices. The pool can be any size, resulting in 1 to N redundancy where N is the size of the pool.

Although certain embodiments herein are shown as implemented using a graphical user interface, most of the functions of the GUI as they relate to a human administrator could also be performed programmatically by a management system interacting with cluster manager 110 through an appropriate API. An example API is provided in the Appendix.

FIG. 1A is a diagram of a graphical image that may be used to illustrate elements of a cluster. Image 100 illustrates a cluster 102 that comprises a first switch 104, a stack 106 of network devices, and a second switch 108. First switch 104 is connected to stack 106 by a plurality of first physical interfaces 104A. Second switch 108 is connected to stack 106 by a plurality of second interfaces 108A. In certain embodiments cluster 102 may be termed a stack.

Cluster 102 is managed by a cluster manager 110, which comprises one or more software elements, hardware elements, or a combination thereof, executed by a network management station or other server device. In one embodiment, cluster manager 110 comprises Cisco Intelligent Engine 2100. Cluster manager 110 may communicate directly with cluster 102 or indirectly. In one embodiment, cluster manager 110 is communicatively coupled to cluster 102 by a software event bus 112. Commercially available examples of event bus 112 include the products from TIBCO. Cluster manager 110 may manage any number of clusters 102.

As used herein, the term "connection" means an end-to-end application logical connection that is supported by a cluster, which in this context emphasizes the set of CLI configurations of the network elements of the cluster that implement that connection. This usage is distinct from the physical connections among cluster elements and switches to the stack of devices; such physical connections are termed "interfaces" herein. In the context of the cluster manager 110, a connection is a collection of CLI commands. In one embodiment, a connection comprises a programmatic object that points to a fixed defined set of templates intended to be applied to a stack device and adjacent switches. The connection object also contains attributes providing specific substitution values to be used when instantiating the templates into actual configurations.

In an example embodiment, each connection object contains CLI commands and values for a specific ATM connection that is used to support a single end-to-end user. In this embodiment, each time a network administrator needs to support a new user, the cluster manger 110 is used to create a new connection object to contain CLI commands that correspond to the new user connection. Thus, in a practical embodiment, cluster manager 110 could manage thousands of connection objects corresponding to the number of subscribers in the network.

Although an ATM connection has been given as an example, any CLI could be in the templates; thus, the CLI itself is opaque to the cluster manager 110. The cluster manager 110 provisions the CLI according to certain rules, meaning that templates and attribute values are used to build switch configurations while others are used to build stack device configurations. When failover occurs, the cluster manager 110 logically re-associates all the connection objects of the failed device with the new device selected from the pool. The cluster manager 110 then reconstructs and accumulates or concatenates the CLI that is generated from all the connection objects, and provisions that CLI to the newly selected device from the pool.

Thus, the cluster manager 110 is not aware of specific CLI commands; a connection object is a container for some generic configuration. The network administrator uses the connection definitions as a way of defining and applying incremental configurations. Whenever a failover occurs, all the accumulated incremental configurations (connections) are applied the newly allocated router from the backup pool.

Figure 2:
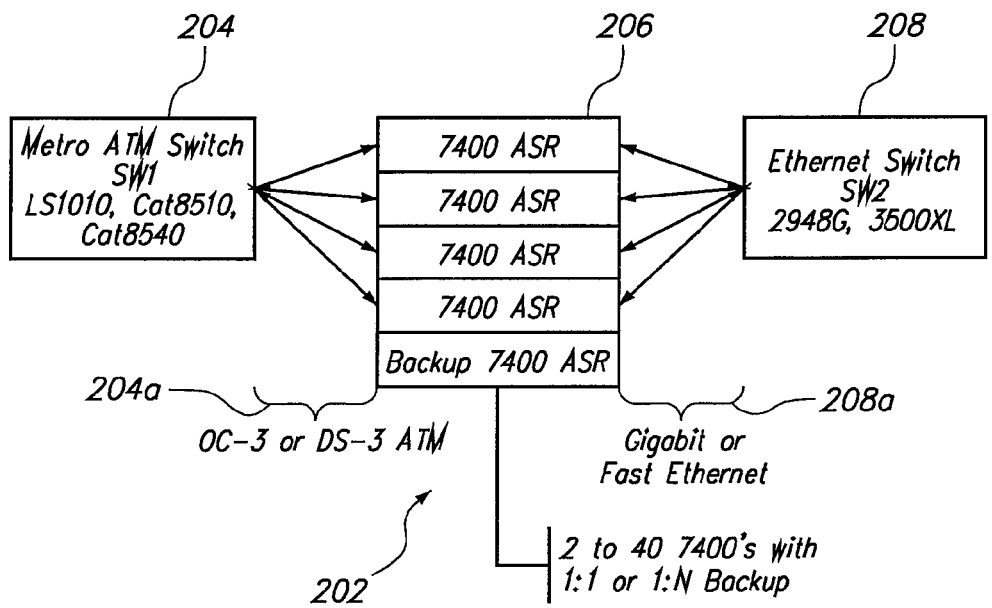
FIG. 2 is a block diagram of one specific embodiment of a cluster.

FIG. 2 is a block diagram of one specific embodiment of a cluster 202 comprising a metro ATM switch 204, an Ethernet switch 208, and a stack 206 of network devices. Metro ATM switch 204 may comprise, for example, a Cisco LS 1010, Catalyst 8510, or Catalyst 8540. The Ethernet switch 208 may comprise a Cisco 2948G, 3500XL, etc. Stack 206 may comprise Cisco 7200 Routers, 7400 Routers, etc. In one embodiment, there are between 2 and 40 7400 Routers in stack 206, with 1:1 backup. A plurality of OC-3 or DS-3 ATM interfaces 204A are coupled between switch 204 and stack 206. A plurality of Gigabit Ethernet or Fast Ethernet interfaces 208A are coupled between switch 208 and stack 206.

In either embodiment of FIG. 1A or FIG. 2, when a failure occurs with respect to one of the network devices, the cluster manager performs the following processing. The cluster manager receives an event and identifies which node has failed. In one embodiment, two methods of detection of failure are used. In a first approach, one of the adjacent switches sends an event on the bus indicating that an interface on the switch is no longer active. The cluster manager can correlate which interface on the switch is connected to which specific stack element, and then infer that it has failed. In a second approach, the cluster manager is configured to use a keepalive or heartbeat protocol against all the stack elements. When a stack element fails to respond, then the cluster manager infers that that element has failed. The cluster manager searches for a device in the free pool that is available for use as a fail-over device. Because more than one device may be designated as a back-up device, the cluster manager selects the first free device in the backup pool. The cluster manager switches all configuration (CLI) corresponding to the application connections that the failed device handled to the available back-up device. To do so, the cluster manager acquires an understanding of all connection configuration information from the failed device and applies it to the chosen back-up device. The cluster manager also changes the configuration of the switches so that all connections that were switched to the failed device are now switched to the chosen back-up device.

In one embodiment, the configuration is delivered by using a pull model. For example, the cluster manager sends a trigger event to a device, and in response the device retrieves configuration information using an HTTP connection to a provisioning server, which may be the cluster manager. Alternatively, the configuration is sent directly to the device. However, if this alternative involves sending too much data on the event bus, such as from many configuration files, excess bandwidth may be consumed, which would adversely affect responsiveness failure events that are published on the same event bus. Therefore, as an optimization, sending a short trigger message is considered preferable.

In one approach, an initial configuration is sent to the backup device, a partial configuration (or an accumulated configuration comprising an accumulation of all the connections previously applied) is sent to the backup device, and the failed device is rebooted based on the configuration setting of the current cluster. This places the failed device in the free pool.

The user defines a set of configuration template files that are used to determine the configuration in the foregoing cluster failover process.

All devices on the cluster have commands in their startup configuration that inform the devices how to connect to the cluster manager. Upon startup, such devices automatically connect to and register with the cluster manager.

Specifically, in one embodiment, all devices that are in use or within the free pool have a minimal configuration (bootstrap configuration) that is persistently stored in non-volatile memory. This minimal configuration provides minimum information sufficient for the router to communicate with a cluster manager or provisioning server over an event bus. When a router is moved from the free pool to in-use, an Initial Configuration is provisioned. The Initial Configuration contains a one-time configuration that is a base on which subsequent incremental configurations (connections) are built. Once the initial configuration is provisioned, then all of the accumulated incremental configurations are provisioned. The initial configuration and connections are not stored persistently. If a device reboots, then it restarts using the minimal configuration.

As a result, when an element of the cluster fails, the cluster manager re-configures other elements in the cluster such that the failed element is logically cloned. Further, other peer elements of the failed element in the cluster are dynamically reconfigured in real time. Still further, the switches associated with the cluster are dynamically reconfigured in real time.

As a result, the solution herein provides automated detection of a failed network device, such as a router, switch, access server or aggregation device. Both software and hardware failures are detected through appropriate event bus messages. The solution provides automated logical allocation of a substitute device from backup pool, and automated transfer of configuration from the failed device to the backup device. The solution provides automated re-configuration of the adjacent switch-pair to recognize the backup device, and automated de-configuration of the adjacent switch-pair to isolate failed device. The solution also provides support for multiple concurrent device failure within a cluster.

The disclosed approach overcomes several issues found in the prior art. For example, the presence of multiple points of failure has been a long-standing disadvantage of network device clusters, which otherwise provides desirable business growth benefits. The approach herein provides new value for existing cluster solutions. Further, 1 to N redundancy is provided, where N can be whatever size the administrator chooses. N is the size of the pool of backup devices, which can be enlarged or shrunk according to a tradeoff of risk management and cost selected by the administrator. The solution provides an increased level of availability than can be achieved otherwise in a cluster configuration.

Further, in response to failure of one cluster element, a new element is automatically brought up, and all other elements in the cluster and its associated switches are automatically re-configured to account for the new element. No other known failover techniques offer automatic re-configuration of associated devices and related devices in this area. In prior approaches, such reconfiguration is a manual process taking hours, whereas an implementation of the approach herein on a server-class processor can provide re-provisioning in from a few seconds to up to a few minutes. For example, experimentation has shown that with the approaches herein, times to failover 4000 ATM connections range from three minutes to eight minutes depending on the broadband configuration of the devices in the cluster. Of this time, it has been found to take less than one second for the cluster manager to detect a problem and fully reconfigure all the equipment; the rest of the time is limited by the rate at which the network device operating system can respond to its reconfiguration and bring up the ATM connections.

In one embodiment, the approach herein may be combined with other redundancy and failover approaches. For example, during its administration, the Cluster Manager can be directed to use an external repository, such as an LDAP directory and file system, for its primary data and template storage. Third-party cluster management solutions are available for these externally managed directories and file systems. Further, devices in a cluster can be configured with appropriate commands such that if they become disconnected from the Cluster Manager, they automatically reconnect to an alternate cluster manager that is specified in the commands. For Cisco devices, the "cns" Command Line Interface (CLI) commands provide this capability.

In still another variation, two instances of the Cluster Manager can be deployed, thereby providing hot-standby redundancy of the Cluster Manager itself. Both Cluster Mangers may be configured through administration commands to point to the same repository and file system. If one Cluster Manager fails, the corresponding disconnection with the cluster devices triggers all the devices to reconnect to the alternate Cluster Manager.

3.0 Detailed Example Embodiment

A detailed description of an example embodiment is now presented. Alternative embodiments may have different structure or function. In this description, the following terms have the following definitions:

SW Cisco Switch
ATM Asynchronous Transfer Mode
AIP ATM Interface Processor
AAL ATM adapter layer
pvc Permanent Virtual Circuit
vcd Virtual Circuit Descriptor
vpi Virtual Path Identifier
vci Virtual Channel Identifier In this embodiment, within a stack of devices, a user can define how many devices are preserved as backup in case of device failure. Once a device failure occurs, the process described herein detects the failure automatically, and initiates a device failover process. Thus, a system and process as described herein provide two major functional processes: Stack activation and failover processing.

3.1 Cluster Manager Operations

In one embodiment, stack activation and failover processing are provided by cluster manager 110. The cluster manager communicates with one or more clusters 102 using events that are sent and received, or published and subscribed to, on event bus 112. In the description below, events denoted SPEC_EVT_IN_xx indicate events that the cluster manager 110 received, and events denoted SPEC_EVT_OUT_xx indicate events that the cluster manager 110 published. Cluster manager 110 may provide a user interface in the form of HTML documents or pages. To interact with cluster manager 110, a user connects a conventional browser, such as Internet Explorer or Netscape Communicator, to the cluster manager and accesses a specified home page. The home page provides commands, keywords or function indications. Selecting the commands, keywords or function indications causes the cluster manager to perform the selected functions, or display other user interface pages, as further described below.

To activate a stack, the cluster manager uses events to cause the stack to initiate operation. In one embodiment, a user of cluster manager 110 selects an "Activate" button in an "Edit Stack" UI page. In response, the cluster manager performs the stack activation steps described below. The stack activation process described below is based on the following assumptions. In other embodiments, one or more of the assumptions may be relaxed.

a) The devices in the stack (both active and backup) have a 'bootstrap' configuration as the startup configuration that provides OSI Layer 1 and Layer 2 connectivity on all interfaces that are physically connected to either switch and that provides connectivity to the Event Bus and TCP/IP connectivity to the cluster manager.
  b) The switches in the stack have a 'bootstrap' configuration as the startup configuration that provides connectivity to the event bus and TCP/IP connectivity to the cluster manager.
  c) Prior to the performing stack activation as described herein, administrative steps are performed with the cluster manager 110 to define the configurations that are mentioned in the descriptions of the various steps below. This administration may include the definition and usage of CLI templates.
  d) All the configurations that are provisioned by the cluster manager are not stored persistently within any of the stack devices or switches. While these configurations are applied as the running configuration of the devices/switches, only the 'bootstrap' startup configurations are persisted in those devices.
  e) There is one Layer 2 connection corresponding to each active stack device and each switch.

Based on the preceding assumptions, cluster activation may involve the following steps performed by the following actor elements.

1. ACTOR: CLUSTER MANAGER: The cluster manager prepares 110 and makes pending for each switch the set of CLI to configure the switches for all end-to-end functions such as ATM PVC connections; however, any Layer 1 (physical) or Layer 2 (link) connections to physically attached devices in the stack are specifically disabled. The CLI defining each End-to-end connection (ATM PVC) references one of the switch interfaces that is in turn physically attached to one of the active stack devices. The cluster manager 110 then publishes a configuration load event, such as a SPEC_EVT_OUT_config.load event, onto the event bus targeting just the two switches. In an embodiment, the cisco.cns.cfgsrv.config.load event subject is used.
2. ACTOR: SWITCH: In response to receipt of the SPEC_EVT_OUT_config.load, each switch is triggered to connect to the cluster manager 110 over HTTP, and perform a HTTP post or get operation to request its pending set of CLI to configure the end-to-end functions.
3. ACTOR: SWITCH: The two switches each process the end-to-end connection (e.g. ATM PVC connection) CLI configuration from the cluster manager 110. In response, each switch publishes a SPEC_EVT_IN_config.complete explicit acknowledgement event onto the event bus to the cluster manager. In one embodiment the cisco.cns.cfgsrv.config.complete event subject is used.
4. ACTOR: CLUSTER MANAGER: In response to the SPEC_EVT_IN_config.complete, the cluster manager 110 prepares and makes pending for each switch the set of CLI to configure the switches enabling Layer 1 (physical) and Layer 2 (link) connections to each physically attached device in the stack. The cluster manager 110 subsequently publishes the SPEC_EVT_OUT_config.load onto the event bus targeting just the two switches. In an embodiment, the cisco.cns.cfgsrv.config.load event subject is used.
5. ACTOR: SWITCH: In response to receipt of the SPEC_EVT_OUT_config.load event, each switch is triggered to connect to the cluster manager 110 over HTTP and perform a HTTP post or get operation to request its pending set of CLI to configure the Layer 2 and Layer 1 connections to the stack devices.
6. ACTOR: SWITCH: The two switches each process the above physical and link layer CLI configuration from the cluster manager 110 and in response publish a SPEC_EVT_IN_config.complete explicit acknowledgement event onto the event bus to the cluster manager 110. In one embodiment the cisco.cns.cfgsrv.config.complete event subject is used.
7. ACTOR: SWITCH: Each switch publishes a SPEC_EVT_IN.log event onto the bus including in its payload 'interface protocol up' indicating that the physical and link level protocols are active corresponding to each physically attached device in the stack. One such log message is published onto the bus to the cluster manager 110 corresponding to each switch interface attached to each stack device.
8. ACTOR: CLUSTER MANAGER: In response to both the SPEC_EVT_IN_config.complete, and the SPEC_EVT_IN.log events indicating physical and link layer activity on the switch interfaces the cluster manager 110 prepares and makes pending, for each device in the stack, the set of CLI forming the fixed initial configuration upon which any subsequent end-to-end connection would be built on. The cluster manager 110 subsequently publishes the SPEC_EVT_OUT_config.load onto the event bus targeting just the active devices in the stack (not any of the devices in the backup pool). In an embodiment, the cisco.cns.cfgsrv.config.load event subject is used.
9. ACTOR: STACK DEVICES: In response to receipt of the SPEC_EVT_OUT_config.load, each stack device is triggered to http connect to the cluster manager 110 and perform a HTTP post or get operation to request its pending set of CLI for initial configuration.
10. ACTOR: STACK DEVICES: The stack devices each process the above initial configuration from the cluster manager 110 and in response publish a SPEC_EVT_IN_config.complete explicit acknowledgement event onto the event bus to the cluster manager 110. In one embodiment the cisco.cns.cfgsrv.config.complete event subject is used.
11. ACTOR: CLUSTER MANAGER: The cluster manager 110 prepares and makes pending for each stack device the set of CLI to configure the devices for all end-to-end functions such as ATM PVC connections. The cluster manager 110 subsequently publishes the SPEC_EVT_OUT_config.load onto the event bus targeting just the active stack devices (not the devices in the backup pool). In an embodiment, the cisco.cns.cfgsrv.config.load event subject is used.
12. ACTOR: STACK DEVICES: In response to receipt of the SPEC_EVT_OUT_config.load, each stack device is triggered to HTTP connect to the cluster manager 110 and perform an HTTP post or get operation to request its pending set of CLI to configure the end-to-end functions.

13. ACTOR: STACK DEVICES: The stack devices each process the above end-to-end connection (e.g. ATM PVC connection) CLI configuration from the cluster manager 110 and in response publish a SPEC_EVT_IN_config.complete explicit acknowledgement event onto the event bus to the cluster manager 110. In one embodiment the cisco.cns.cfgsrv.config.complete event subject is used.

14. ACTOR: CLUSTER MANAGER: Upon receipt of the _EVT_IN_config.complete events from the stack devices (corresponding to the end-to-end PVC configuration) the cluster manager 110 considers the cluster to be in an ACTIVE state.

In one embodiment, automatically detecting failure of a device within a stack can occur in one of three possible ways as described below.

In a first failure detection approach, when the device fails, it causes a loss of the corresponding Layer 1 and/or Layer 2 connection to an adjacent switch which is part of that cluster. The adjacent switch upon detecting loss of Layer 1 or Layer 2 connection publishes a SPEC_EVT_IN.log event onto the bus including in its payload 'interface protocol down' along with the associated switch interface name/number. This indicates that the physical and link level protocols are inactive corresponding to the physically attached failing device in the stack. One such log message is published onto the bus to the cluster manager corresponding to each failing stack device attached to the switch. (see Assumption a) and Assumption e)). Upon detection or receipt by the Cluster Manager of the SPEC_EVT_IN.log event onto the bus including in its payload 'interface protocol down' the cluster manager can reference the included parameter of switch interface name/number and correlates that to a specific stack device and thus infer which stack device has failed.

In a second failure detection approach, the cluster manager publishes a keepalive event on the bus, one such event individually targeted and corresponding to each switch and stack device in the cluster. Upon not receiving the required keepalive response from a given stack device, the cluster manager infers that the device has failed.

In a third failure detection approach, a stack device, upon encountering an certain internal software failures, generates crash dumps to its file system. This functionality is outside the scope of this disclosure, however as part of an embodiment, the crash dump function may be enhanced to also generate a SPEC_EVT_IN.device_fail event carrying a unique MAC address of the dialing device as a parameter. Depending on the nature and timing of the software failure within the stack device, this event may or may not be successfully published on the event bus. Upon detection/receipt of the SPEC_EVT_IN.device_fail event, the cluster manager infers that the device is failed.

In one specific embodiment, a process for automatically re-provisioning network elements to adapt to failures consists of the following steps:

1. ACTOR: CLUSTER MANAGER: The cluster manager 110 logically selects the first available stack device from the backup pool and designates this stack device as the pending recovery device.

2. ACTOR: CLUSTER MANAGER: The cluster manager 110 prepares and makes pending for each switch the set of CLI to disable the Layer 1 and Layer 2 connection to the failing stack device. The cluster manager then publishes the SPEC_EVT_OUT_config.load onto the event bus targeting just the two switches. In an embodiment, the cisco.cns.cfgsrv.config.load event subject is used.

3. ACTOR: SWITCH: In response to receipt of the SPEC_EVT_OUT_config.load, each switch is triggered to connect to the cluster manager 110 using HTTP and perform a HTTP post or get operation to request its pending set of CLI to disable the physical and link connectivity to the failing stack device.

4. ACTOR: SWITCH: The two switches each process the above CLI configuration from the cluster manager and in response publish a SPEC_EVT_IN_config.complete explicit acknowledgement event onto the event bus to the cluster manager 110. In one embodiment the cisco.cns.cfgsrv.config.complete event subject is used. This operation effectively isolates the failing stack device.

5. ACTOR: CLUSTER MANAGER: In response to the SPEC_EVT_IN_config.complete corresponding to the UNconfigure of the end-to-end connections (e.g ATM PVC) that were traversing the failed stack device; the cluster manager 110 re-executes the cluster activation process, however in the limited context of the pending recovery stack device and its corresponding interface on the switches. In other words, the cluster manager 110 re-uses the cluster activation mechanism to achieve the following results:
   a) re-provisioning of the end-to-end connections on the switches referencing the switch interface attached to the pending recovery stack device instead of the failed stack device.
   b) Provisioning the CLI to the switch to activate of the physical and link layer of the interface attached to the pending recovery stack device.
   c) Provisioning the same initial configuration as was on the failed stack device to the pending recovery stack device.
   d) Re-constructing the accumulated end-to-end connection CLI from the failed stack device and applying that same CLI to the pending recovery stack device.

Figure 1B:
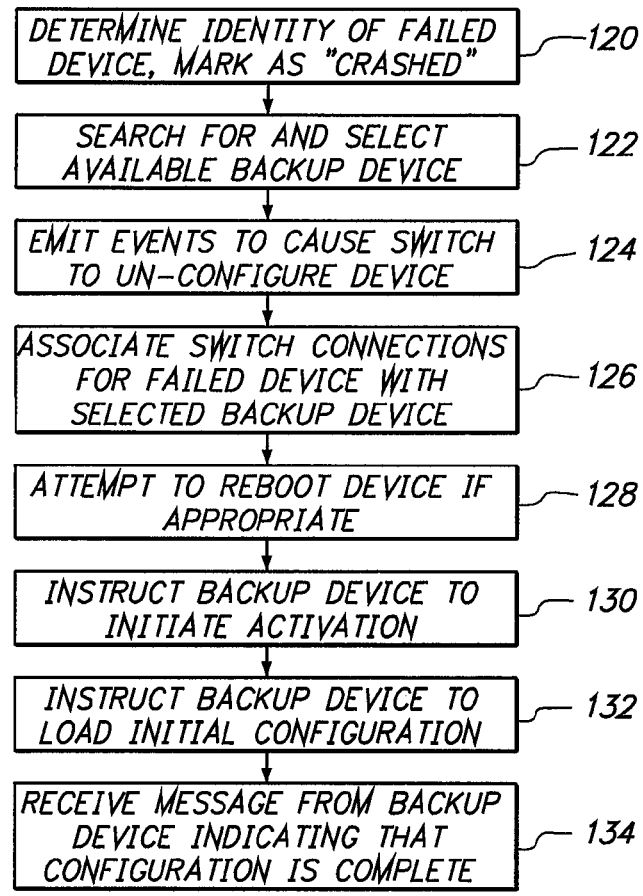
FIG. 1B is a flow diagram of one embodiment of a process for automatically re-provisioning network elements to adapt to failures.
Figure 1C:
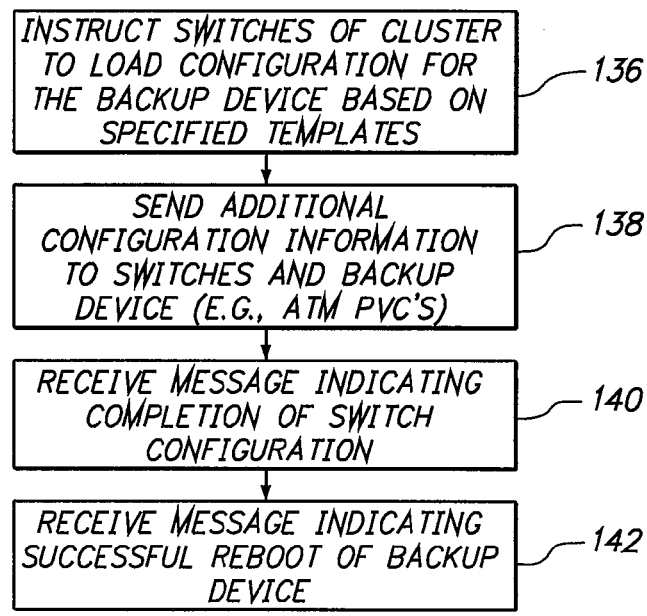
FIG. 1C is a flow diagram of further steps in the process of FIG. 1B.

FIG. 1B is a flow diagram of one embodiment of a process for automatically re-provisioning network elements to adapt to failures. FIG. 1C is a flow diagram of further steps in the process of FIG. 1B. In one approach, to implement FIGS. 1B-1C, cluster manager 110 listens to Syslog events that are generated from switches and the devices in a cluster stack to detect failure events. When a device fails, the cluster manager 110 determines which device has failed based on the Syslog event content, and then starts process FIG. 1B.

In block 120, a failed device is identified, and the state of that device as internally managed by cluster manager 110 is marked as "crashed" or the equivalent.

In block 122, a search is performed to identify and select an available backup device within a backup pool of devices.

In block 124, one or more events are emitted to cause the switches associated with the selected backup device to un-configure the device. In one embodiment, cluster manager 110 emits a config.load event to cause the switches to un-configure the device.

In block 126, all switch connections associated with the failed device are moved to the selected backup device.

In block 128, an attempt is made to reboot the failed device so that it can be placed in the pool of available backup devices. In one embodiment, a config.reboot event is sent to the failed device. The use of a reboot event may not be appropriate for all devices. Thus, block 128 may involve determining whether a reboot event should be sent. For some devices, manual intervention may be required to correct a fault, and sending a reboot event may not be appropriate.

In block 130, the backup device is instructed to start an activation process. In one embodiment, cluster manager 110 sends a startpoint event to the device. In block 132, the backup device is instructed to load an initial configuration. In one embodiment, block 132 involves sending a config.load event that causes the backup device to request or "pull" its initial configuration from the configuration manager 110. In block 134, the process receives a message indicating that the configuration is complete. In one embodiment, the backup device processes the initial configuration and sends a "config.complete" event to the cluster manager 110.

Referring now to FIG. 1C, in block 136, the switch devices associated with the cluster are instructed to load configuration information for the backup device. In one embodiment, in block 136 the cluster manager 110 sends a config.load event to the switch devices and instructs them to load specified configuration templates. The templates are expected to be pre-configured in the system by an administrator and made accessible to the switch devices.

In block 138, the cluster manager sends additional configuration information to the switch devices. For example, where one or more of the switches of a cluster are ATM switches, the cluster manager 110 sends accumulated PVC configuration information to the switches and to the backup device. In one embodiment, cluster manager sends a config.load event to the switches to cause them to load the configuration information. Other configuration also may be provided as part of block 138 as appropriate for particular types of devices.

In block 140, a message is received indicating successful completion of configuration of the switches. For example, cluster manager 110 receives a config.complete event from the switch devices, and changes status values associated with the devices to "fully configured," or the equivalent. At this point, the selected backup device becomes an active device; the backup device can become an active device only upon successful completion of re-configuration of the switches of the stack in the cluster.

In block 142, a message indicating successful reboot of the failed device is received. For example, cluster manager 110 receives a config.boot message from the failed device. In response, the cluster manager marks the state of the failed device to "boot configuration," or the equivalent, and makes the rebooted failed device available as a backup device.

3.2 User Interface Example

FIG. 4 to FIG. 28, inclusive, are screen display diagrams showing user interface pages providing various functions described further herein. In general, a user interface for cluster manager 110 provides automatic fail-over detection and connection switching, manipulation of data relating to high-availability devices in the stack, a cluster console, ease of maintenance, and efficient monitoring. These aspects are now generally described, followed by a detailed description of example screen displays for implementing the functions.

Automatic fail-over detection and connection switching functions are provided. In one embodiment, cluster manager 110 allows an administrator to specify how many devices in a stack are designated as back-up devices. In the case of failure of a node, the cluster manager detects the failure and prepares for fail-over. One of the designated back-up devices is chosen and all connections from the failed device are switched to the selected back-up device. Further, an administrator is able to specify the number of nodes to be reserved as standby devices for a cluster. An administrator may de-activate an entire cluster at any time. All connections to that cluster will then experience downtime.

Cluster management data manipulation is provided by functions of cluster manager 110 that allow a user to create, edit and remove a stack object representing a cluster stack. All information regarding a stack object is stored under a stack name. All data is stored securely and is available across reboots of any or all of the nodes in the cluster. In one embodiment, each stack object consists of the following components: Switch1; Switch2; Devices; and Connections.

Figure 3:
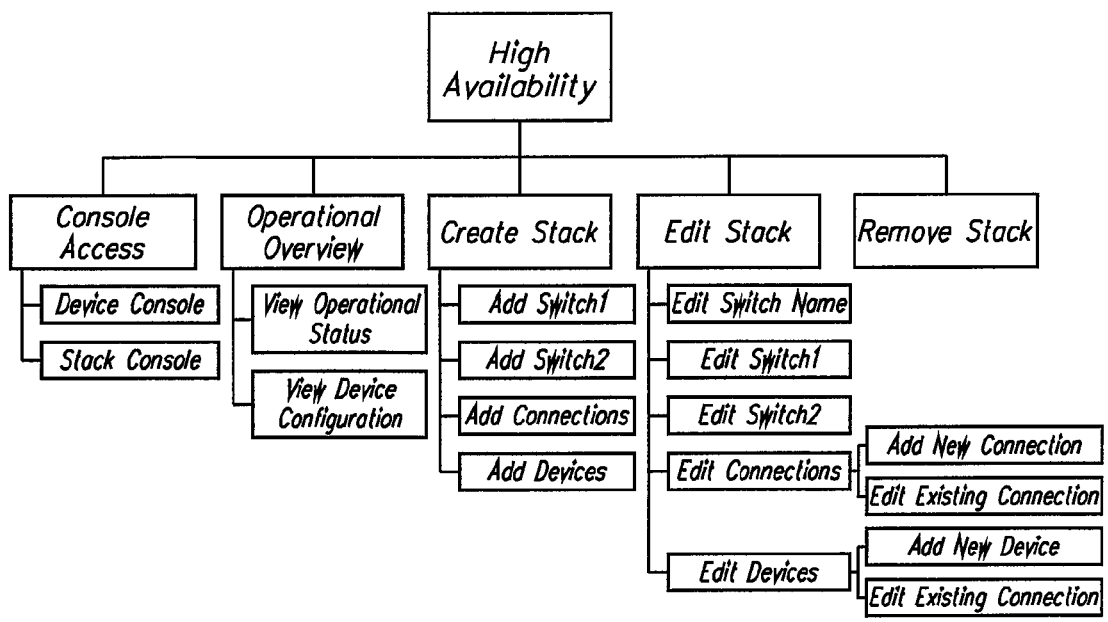
FIG. 3 is a block diagram of a hierarchy of tasks that may be performed by an embodiment of a cluster manager.
Figure 4:
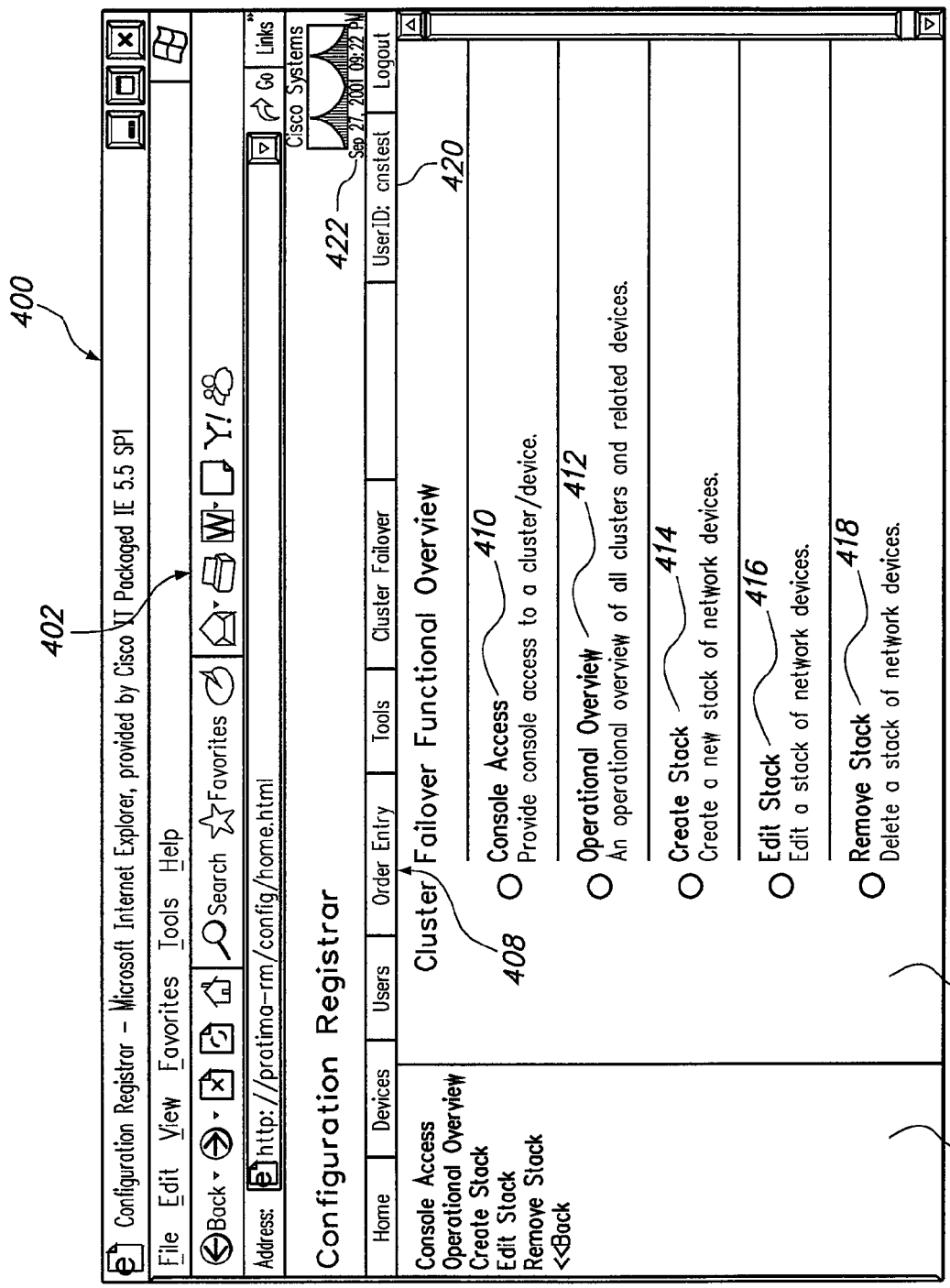
FIG. 4 is a screen display diagram showing a user interface page providing a cluster failover functional overview.

FIG. 3 is a block diagram of a hierarchy of tasks that may be performed by an embodiment of a cluster manager. FIG. 4 is a screen display diagram showing a user interface page providing a cluster failover functional overview. Generally, screen display 400 of FIG. 4 comprises a standard browser toolbar area 402 and an application window 404. The application window 404 comprises a shortcut bar 406 and a context bar 408. The shortcut bar 406 provides a summary of functions that are accessible in application window 404. The context bar 408 provides that may be used to rapidly access different operational contexts, such as functions relating to devices, users, etc. In one embodiment, FIG. 4-FIG. 28 are implemented as one part of a configuration system that includes other applications.

As shown in FIG. 3, a Create Stack function is provided that is accessible by selecting Create Stack option 414 of FIG. 4. The user can create a logical stack by specifying the necessary objects in each stack. All the required information may be stored in the directory prior to activating a stack.

The "Create Stack" is implemented on the assumption that all the information regarding all the components of a stack may not be available during stack creation time. The administrator may enter information regarding as many of the components as is available and store the information under a stack name. A stack may be activated during creation time, or later during editing. However, a stack that does not have a minimum amount of information regarding its components is not activated. If the user attempts to activate such a stack, the stack fails a validation step. In one embodiment, the minimum amount of information required for a stack to pass validation is a definition of Switch1, a definition of Switch2, and a definition of at least two network devices.

More than one device may be added to the stack at the same time. All devices in a stack are assumed to use the same templates for configuring and unconfiguring Switch1 and Switch2; alternatively, different templates may be used.

Each device which is added to a stack may have up to 4 private attributes. New devices may be added to an active stack without impacting service. Connections to a cluster may be provisioned in using a Round Robin approach in which all connections are equally distributed among the available devices, or a Fill Up approach in which each device is filled with connections up to its maximum capacity before connections are placed on other devices.

An Edit Stack option 416 is provided that enables a user to add to the active stack without impacting service. All components of a stack may be edited using this option. All devices that are specified as the network devices forming the stack of devices should already be present because they are referenced to form the stack. The association of devices to a stack may be changed using the Edit Stack function. In one embodiment, once a stack is activated, it is not possible to edit Switch1 and Switch2 selections, because if a user can edit these values the result may interrupt connectivity.

A Remove Stack option 418 is provided to delete a logical stack object. Objects representing devices that constituted the stack are not deleted, but they are no longer logically grouped together.

A Console Access option 410 provides the user the option to have console access to a particular device within a stack or to send the same event to all the devices on a stack. In one approach, both a Cluster Console and a Device Console are provided. The Cluster Console may be viewed as a window into the operations of cluster. By using a Cluster Console, a user can send configuration commands to all devices that are part of a cluster. With a separate Device Console, integrated into the functions of cluster manager 110, a user can attach to the console of any device that is part of the cluster and perform any device specific features. To support such console access, an administrator specifies telnet information for each device during stack creation time for each device.

The Cluster Console provides ease of maintenance and efficient monitoring because it is not practical to assume that administrators can maintain a separate console for each node of a cluster. In one embodiment, a cluster can grow to up to eighty (80) devices; this would require maintaining 80 Consoles. It would impractical to monitor the node in the cluster from different consoles.

An Operational Status option 412 is provided that may be used to view operational status of all the logical stacks created with the cluster manager. If a failure is detected in a cluster, then a warning is displayed in the status for that cluster.

In an embodiment, application window 404 displays a user identifier 420 (userID) of the then-current administrator user at all times. The user is also provided with a view of the current system time and date 422.

3.2.1 Create Stack Operation

Figure 5:
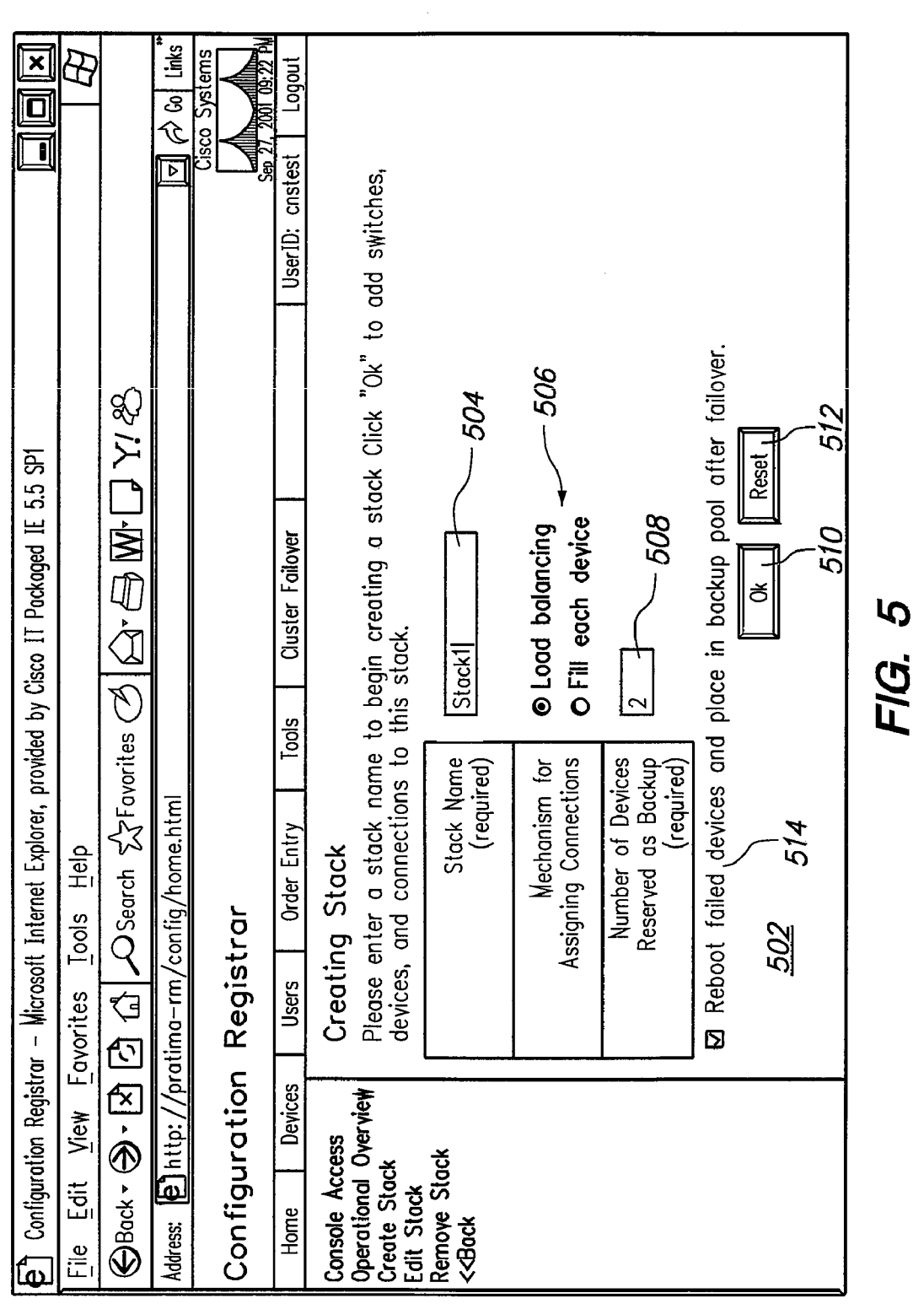

FIG. 5 is a screen display diagram showing a user interface page providing for creating a stack. To create a stack, an administrator logs in to cluster manager 110 using an assigned username and password, navigates to application window 404 by selecting a "Cluster Failover" tab in context bar 408 (FIG. 4), and selects "Create Stack" link 414.

In response, screen display 502 of FIG. 5 is presented and prompts the administrator to enter the name of the stack to be created in Stack Name field 504. The user is also required to enter information specifying key attributes of a stack, including a method of connection provisioning using radio buttons 506, and a number of devices to reserve as backup using field 508.

Selecting a checkbox 514 indicates that the system should reboot all failed devices and to return them to the back-up pool. In an embodiment, checkbox 514 is checked by default so that, by default, every failed device will be rebooted and returned to the back-up pool. Unchecking the box enables the administrator of the stack to leave the failed device outside the stack for manual intervention.

When all the values are entered, the user may create a logical stack by selecting 'Ok' button 510. In response, a stack object with the given name is created.

Figure 6:
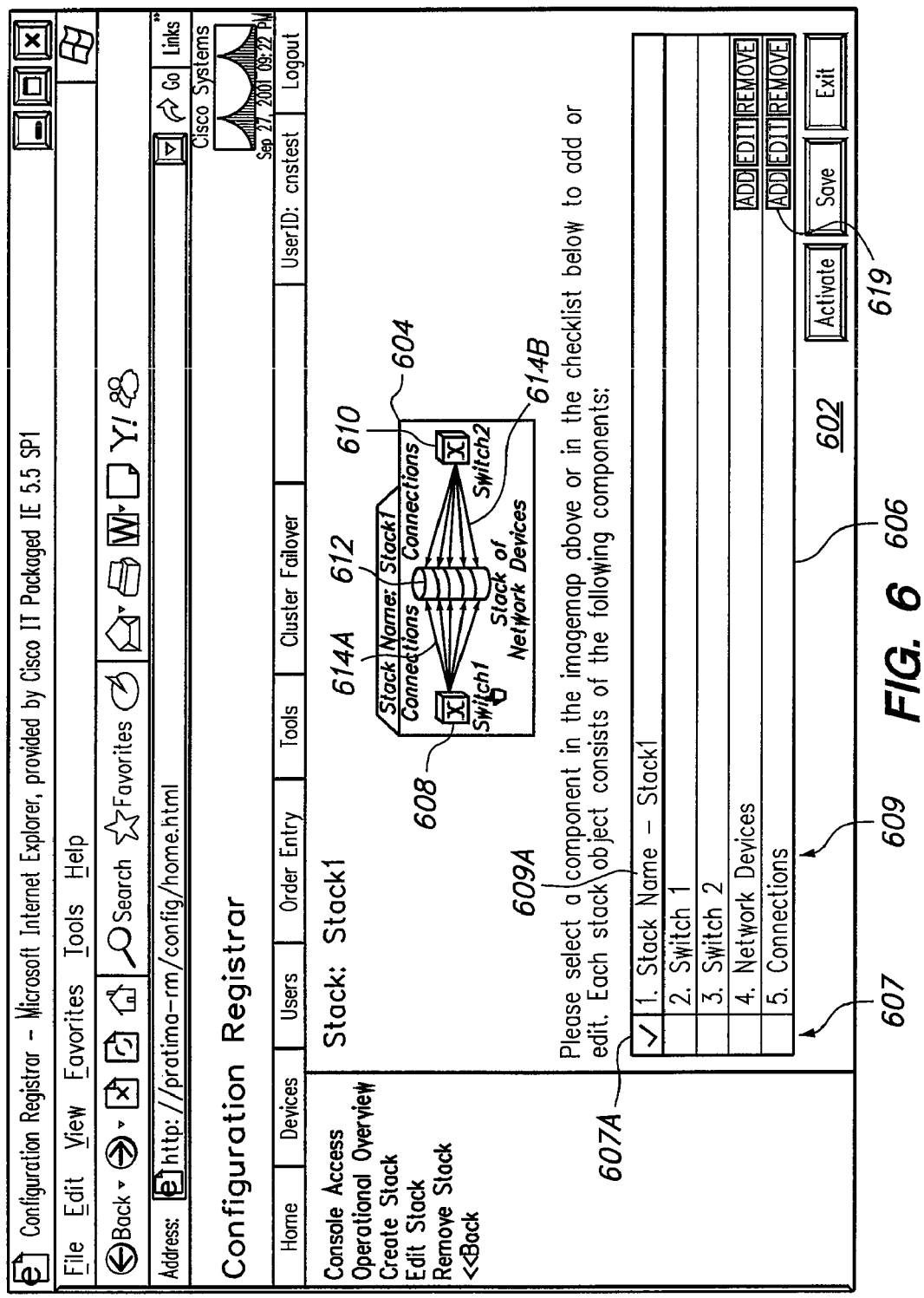
FIG. 6 is a screen display diagram showing a user interface page providing a stack display.

Further, in response, a graphical overview of the cluster fail over solution is displayed. FIG. 6 is a screen display diagram showing a user interface page providing a stack display. A stack display page 602 comprises a stack object image map 604 and a checklist 606. Each stack object image map 604 includes a first switch object 608, a second switch object 610, two or more network devices 612, and two or more connections 614A, 614B.

To enter data for any component of a stack object, the user can select the appropriate object in the image map 604. For example, to enter data regarding Switch1, the administrator selects the first switch 608 in the image map 604.

Checklist 606 provides information regarding the components of the stack for which values are already defined, and components not yet defined. The current value of the defined components is also reflected. The checklist 606 comprises a plurality of line entries corresponding to objects in a cluster. Each line entry comprises a checkbox 607 and a name 609. When all information has been properly specified for a cluster object, the corresponding checkbox is displayed with a check mark, and a summary of pertinent information is displayed in the name field. For example, in FIG. 6 only the Stack Name 609A is complete, as indicated by check mark 607A. The switches, devices, and connections are not yet specified, so corresponding checklist entries are not completed.

Figure 7:
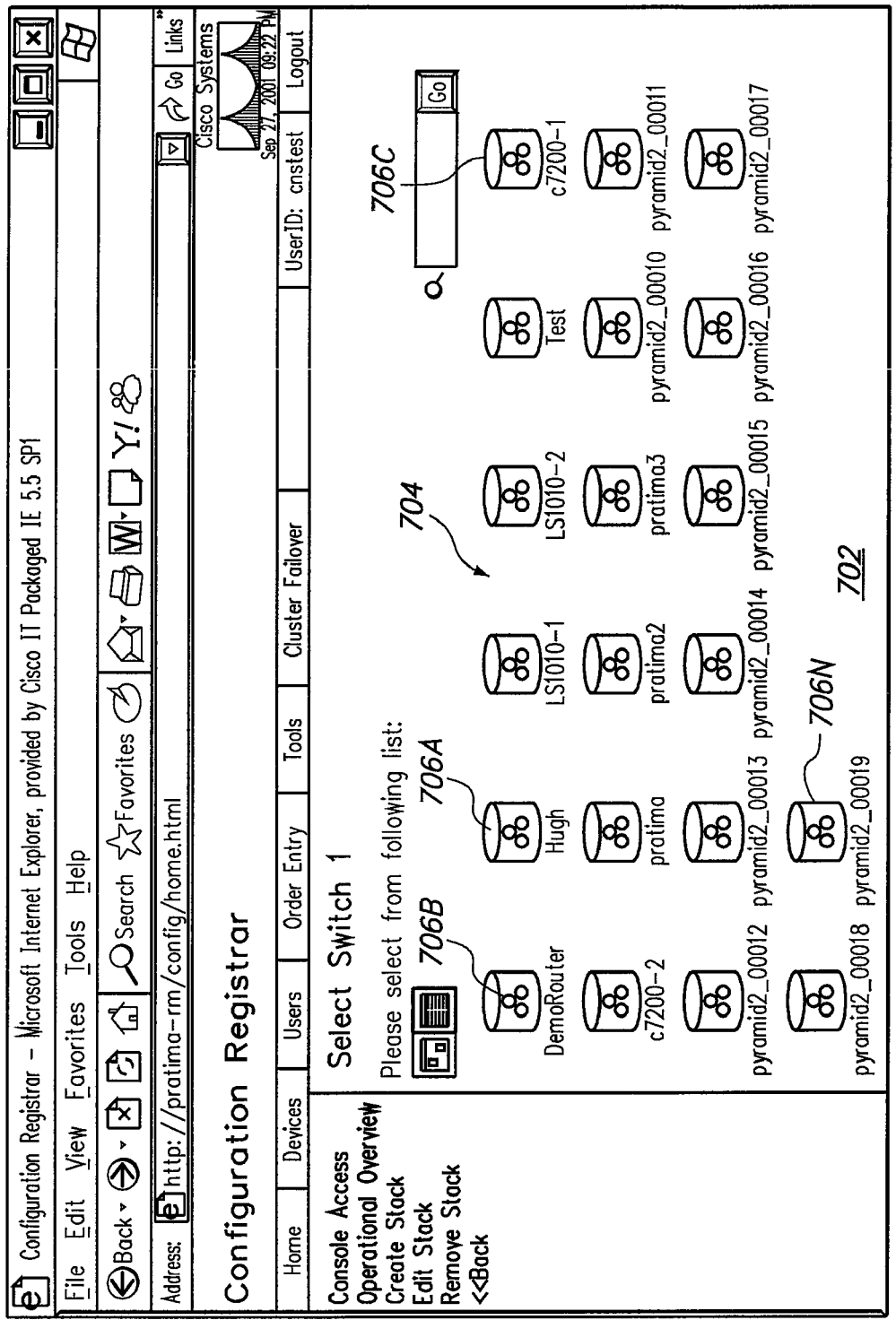
FIG. 7 is a screen display diagram providing an example of a switch selection page.

For purposes of illustrating an example, assume that a user selects the first switch 608 in the image map 604. In response, a switch selection page is displayed. FIG. 7 is a screen display diagram providing an example of a switch selection page. A switch selection page 702 includes a list 704 of one or more icons 706A, 706N representing switch devices that have been previously created in the configuration system. Selecting one of the icons 706A, 706N associates information relating to the selected switch with the first switch of the then-current cluster. In an embodiment, an icon 706A-706N is selected by double-clicking on it using a mouse. The second switch 610 (FIG. 6) may be selected in a similar manner.

Figure 8:
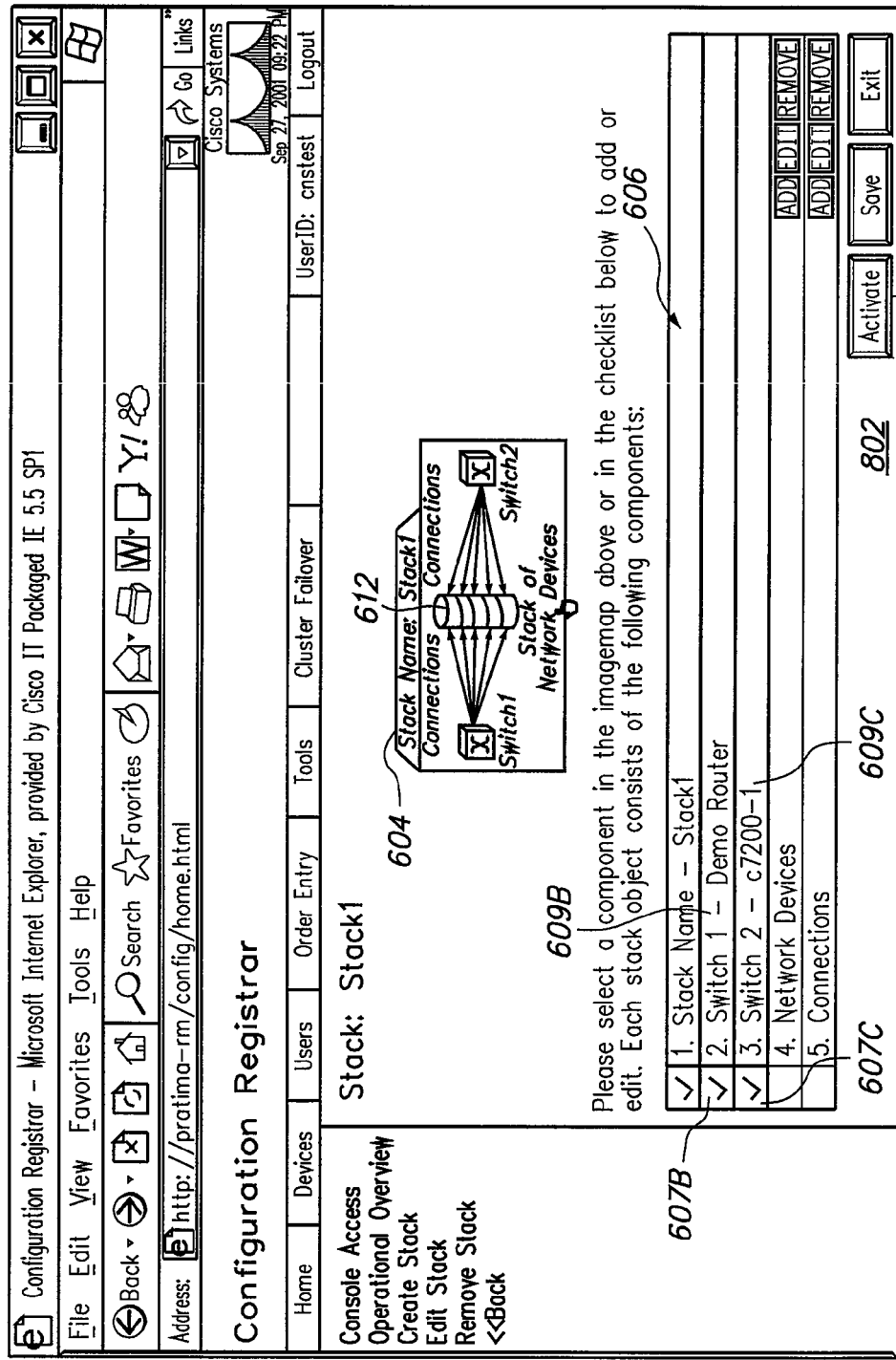
FIG. 8 is a screen display showing a stack display page with additional information.

In response to each selection, stack display page 602 is re-displayed showing the newly selected information. For example, assume that a user selects device "DemoRouter" 706B as the first switch 608 in the image map 604 and selects device "c7200-1" 706C as the second switch 610. FIG. 8 is a screen display showing a stack display page with additional information. In contract to FIG. 6, in FIG. 8 the checklist 606 includes completed entries for Switch1 and Switch2, as indicated by check marks 607B, 607C and switch names 609B, 609C indicating "DemoRouter" and "c7200-1."

Thus, the user is presented with a checklist 606 of objects that need to be specified before the stack information is complete. Once all the components have been defined, the user may select an "Activate" button 804 to activate the current stack. In response to a selection of the "Activate" button 804, cluster manager 110 performs a data validation process to ensure that all required information has been entered.

Figure 9:
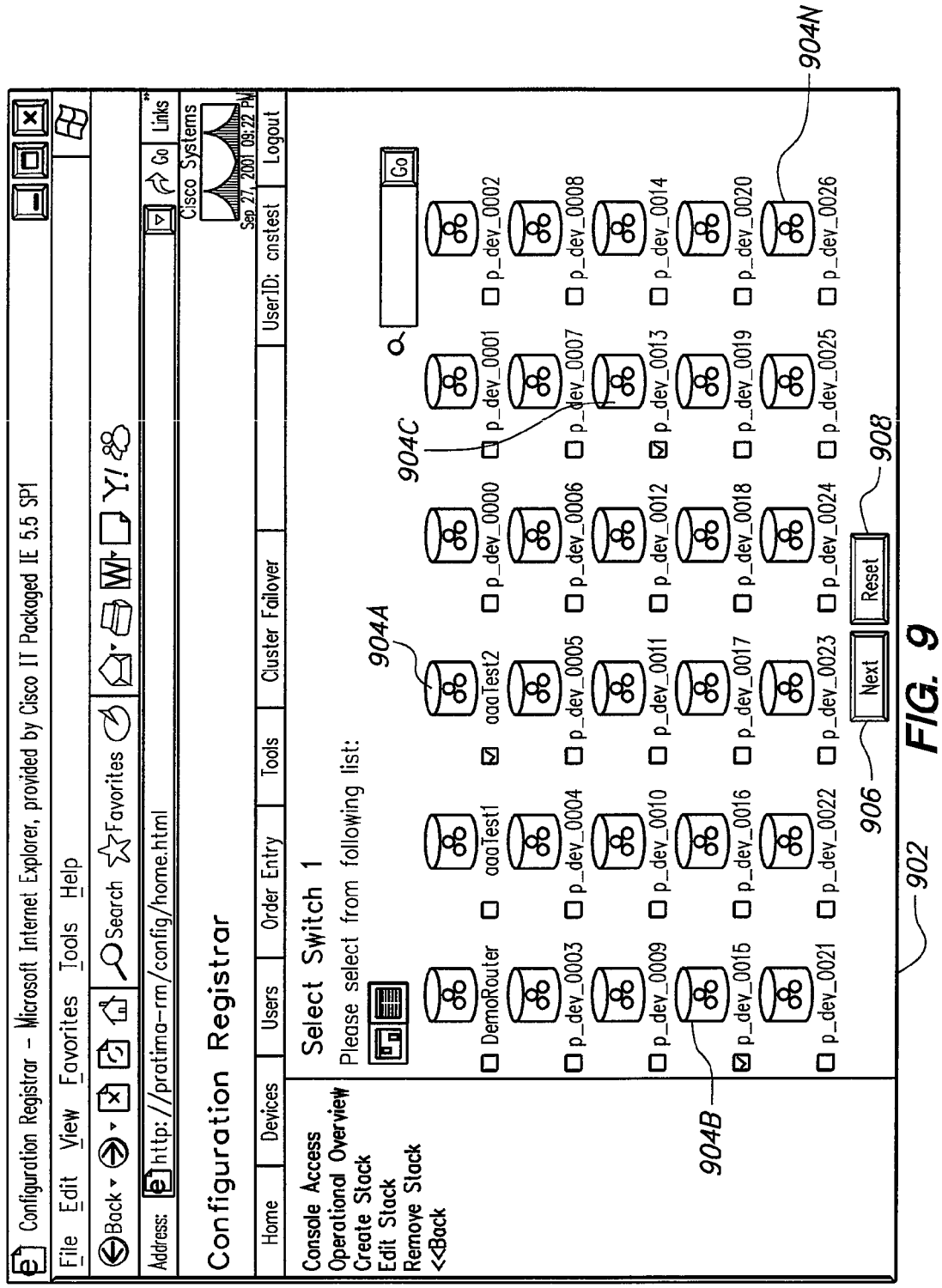
FIG. 9 is a screen display diagram showing a stack device selection screen.

FIG. 9 is a screen display diagram showing a stack device selection page. A stack device selection page 902 is displayed in response to a selection of device stack 612 in image map 604 of FIG. 6, FIG. 8. The effect of device selection page 902 is to prompt the user to choose one or more the devices to add to the then-current stack by selecting one or more device icons 904A, 904B, 904C, 904N. An icon is selected by selecting a checkbox associated with the icon. Each icon 904A, 904B, 904C, 904N represents a device previously configured in the configuration management application.

Selecting a Reset button 908 clears all checkbox selections. All the devices that are logically grouped under the current stack name can be added at once. When all devices are selected, the user may select a Next button 906, which instructs the system to accept the selected devices. In response, the user is prompted to enter further information regarding the selected devices.

Figure 10:
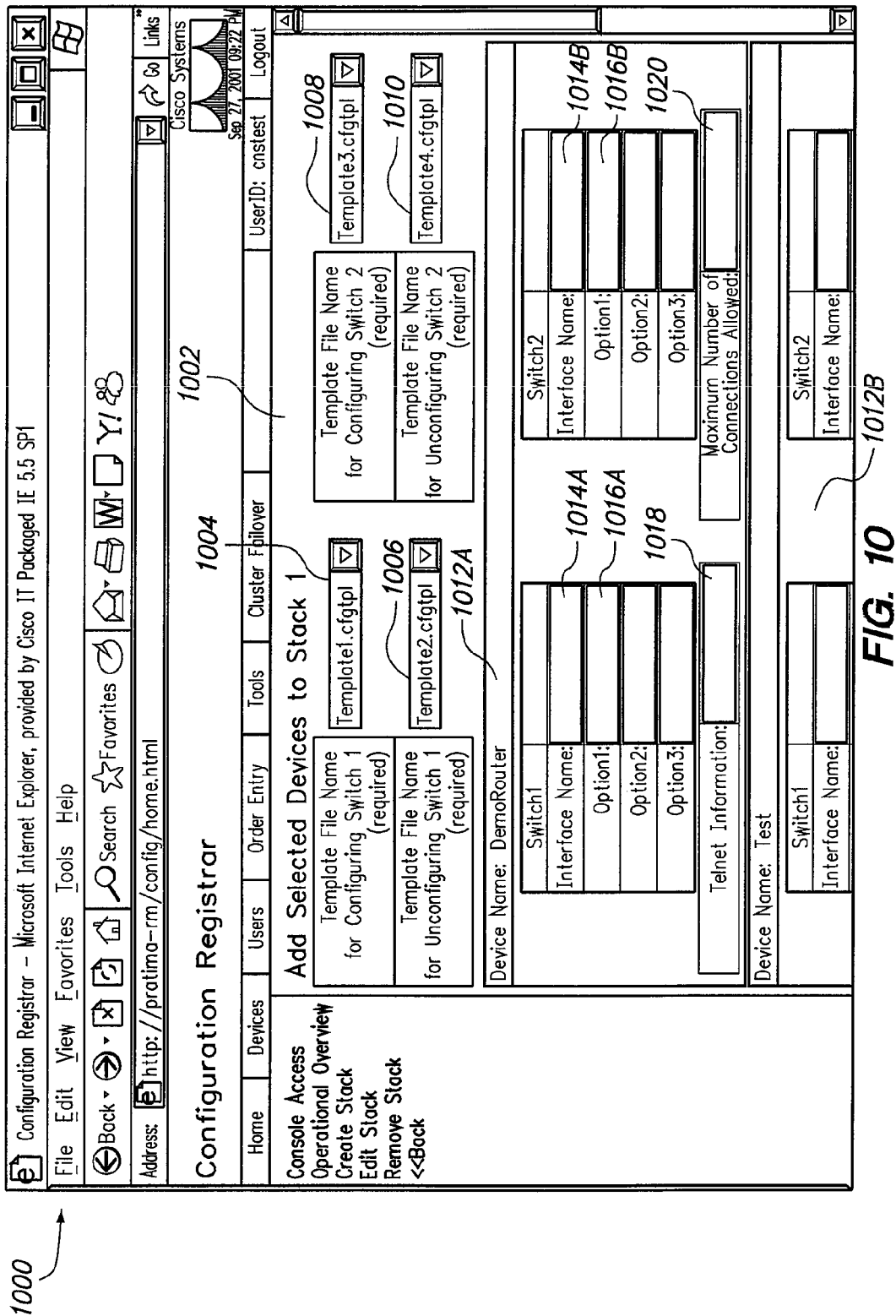
FIG. 10 is a diagram of a screen display for providing detailed device information.

FIG. 10 is a diagram of a screen display for providing detailed device information. Device detail screen 1000 comprises a stack data area 1002 and one or more device data areas 1012A, 1012B corresponding to each device in the stack. Information relating to a stack as a whole is provided in stack data area 1002. In one embodiment, a file name of a template for configuring the first switch is provided in template field 1004; a template file name for un-configuring the first switch is provided in template field 1006; a template file name for configuring the second switch is provided in template field 1008; and a template file name for un-configuring the second switch is provided in template field 1010.

Thus, in this embodiment, templates to configure and unconfigure Switch1 and Switch2 are common for all devices in a stack. In another embodiment, the user can specify separate templates for configuring or un-configuring Switch1 and Switch2 for each device in a stack.

Device-specific values are provided in device data areas 1012A, 1012B. There may be any number of device data areas, corresponding to the number of devices in the stack. In one embodiment, each device added to the stack is provided with values specifying an Interface Name and one or more options for each of the first switch and the second switch. Thus, in device data area 1012A, for device "DemoRouter," for Switch1, an interface name is provided in field 1014A and one or more option values are provided in fields 1016A. Similar data is provided for Switch2 in interface name field 1014B and option fields 1016B.

Telnet information for the device, such as a device IP address, is provided in a telnet field 1018. The telnet information enables the system to connect to the device console. A maximum number of connections allowed for the device is provided in field 1020. Each device can support a fixed number of connections, which is an inherent characteristic of the device that is used; using a value in field 1020, the user can specify the maximum number of connections that are allowed. In an embodiment, allowed values are 0 to 4000.

Figure 11:
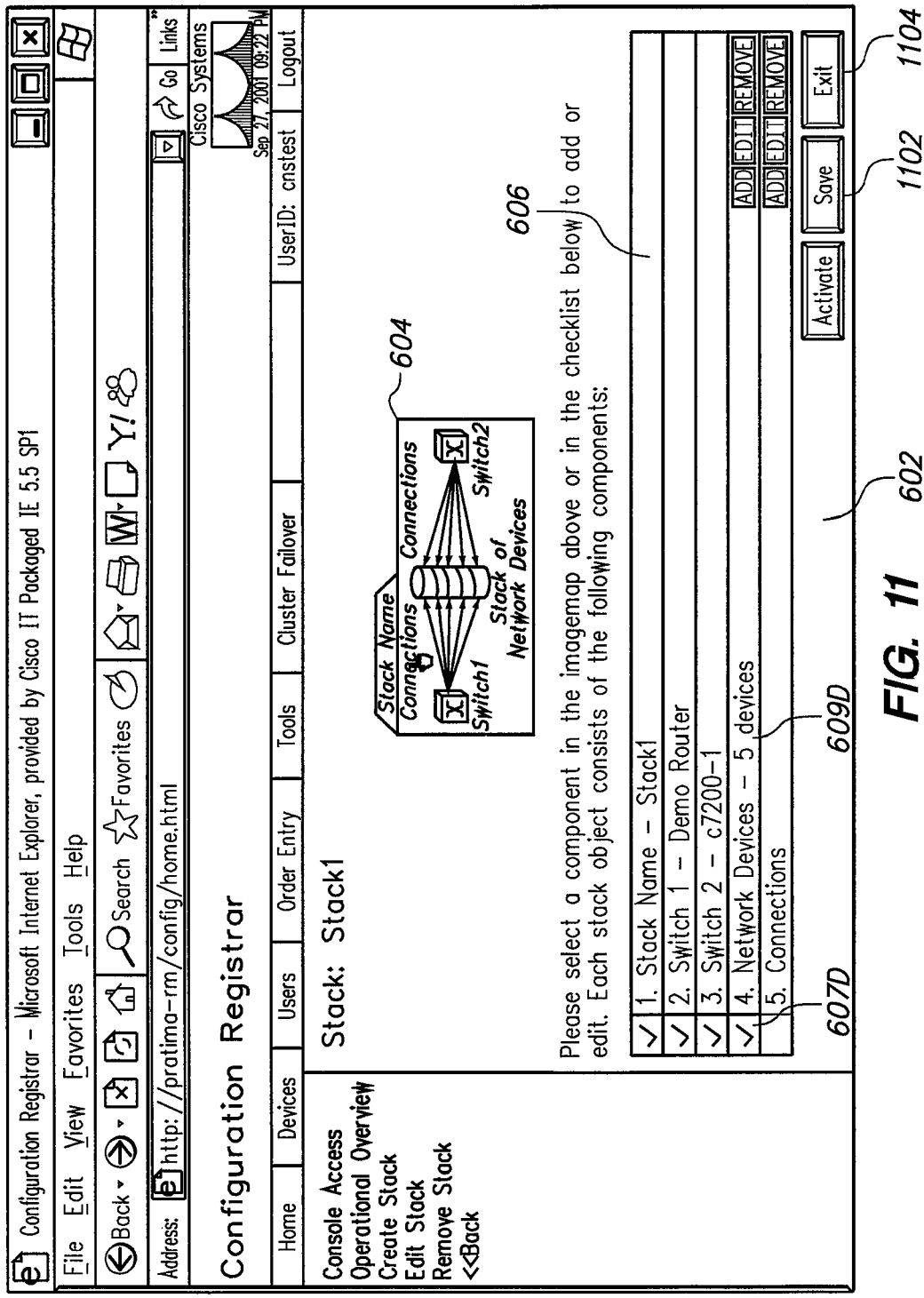
FIG. 11 is a screen display diagram illustrating an updated checklist after device information has been entered for a stack of device.

Selecting an "Ok" button confirms the user's input. In response, stack display page 602 (FIG. 6) is re-displayed, showing the newly entered information. FIG. 11 is a screen display diagram illustrating an updated checklist after device information has been entered for a stack of device. Checklist 606 includes a further check mark 607D indicating that device information has been provided, and device information summary 609D indicating that five (5) devices are defined in the stack. To change any data values, the user may select on the appropriate object in image map 604.

In one embodiment, all stack component values are stored in memory until the user selects a Save button 1102 (FIG. 11) to instruct the system to persistently save the information. Although checklist 606 reflects the number of network devices present in the stack, the entire list of devices is not provided. When connections are added to a stack, the total number of connections of the stack is reflected in checklist 606.

Selecting the Exit button 1104 causes the system to prompt the user to save changes. In response, the user may choose to discard the changes and exit. If the user chooses to save the changes, then in response the system saves all changes that have been made since the last save operation, and the user is returned to the main cluster fail over overview page as shown in FIG. 4.

Figure 12:
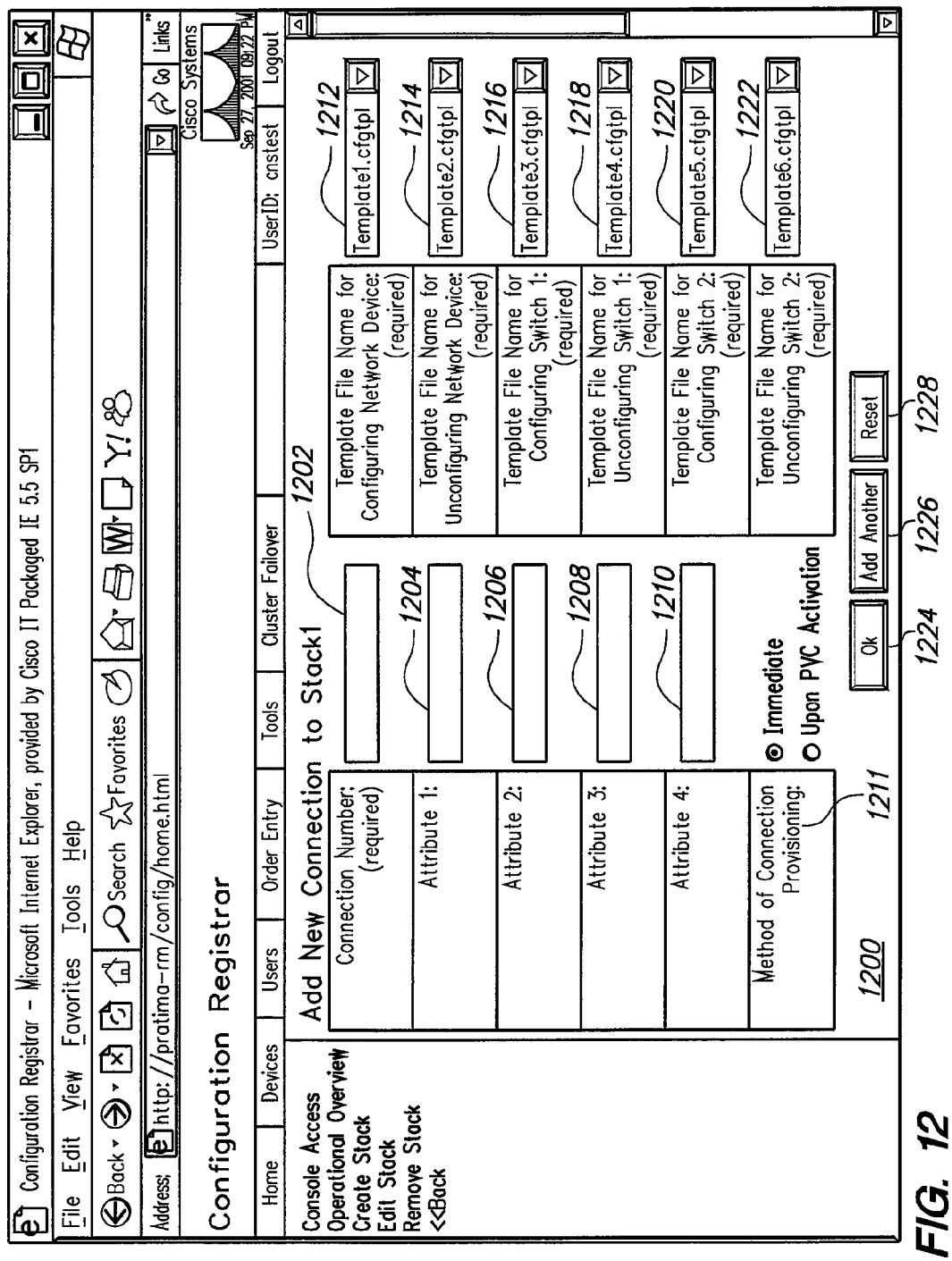
FIG. 12 is a screen display showing an example of a connection information page showing status of a provisioning operation of the command-line interface (CLI) commands for an ATM PVC connection.

Referring again to FIG. 6, a user may add information about connections between switches and stack devices of a cluster by selecting connection 614A or connection 614B in image map 604. In response, a screen display for providing connection information is displayed. FIG. 12 is a screen display showing an example of a connection information page. In this example, connection information page 1200 comprises a connection number field for entering a unique numeric identifier for a connection. For the given connection, the user also may enter one or more text attribute values in attribute fields 1204, 1206, 1208, 1210.

Radio buttons 1211 accept a selection indicating a method of connection provisioning. A selection of "Immediate" indicates that each connection will be immediately provisioned. A selection of "Upon PVC activation" indicates that all connections will be provisioned after PVC activation. Template file names for configuring and un-configuring network devices in the stack, and for configuring and un-configuring switches, are displayed in file name fields 1212, 1214, 1216, 1218, 1220, 1222, respectively.

After entering desired values and selecting 'Ok' button 1224, the system re-displays the fail over graphical overview map as shown in page 602 of FIG. 6. The user may add more connections either by selecting an Add button 619 in page 602 of FIG. 6, or by selecting an Add Another button 1226 in connection information page 1200 of FIG. 12. If the Add Another button 1226 is selected, then current connection information shown in page 1200 is saved as a new connection, and the page is reset with blank data fields so that the user may enter information regarding a new connection.

Figure 13:
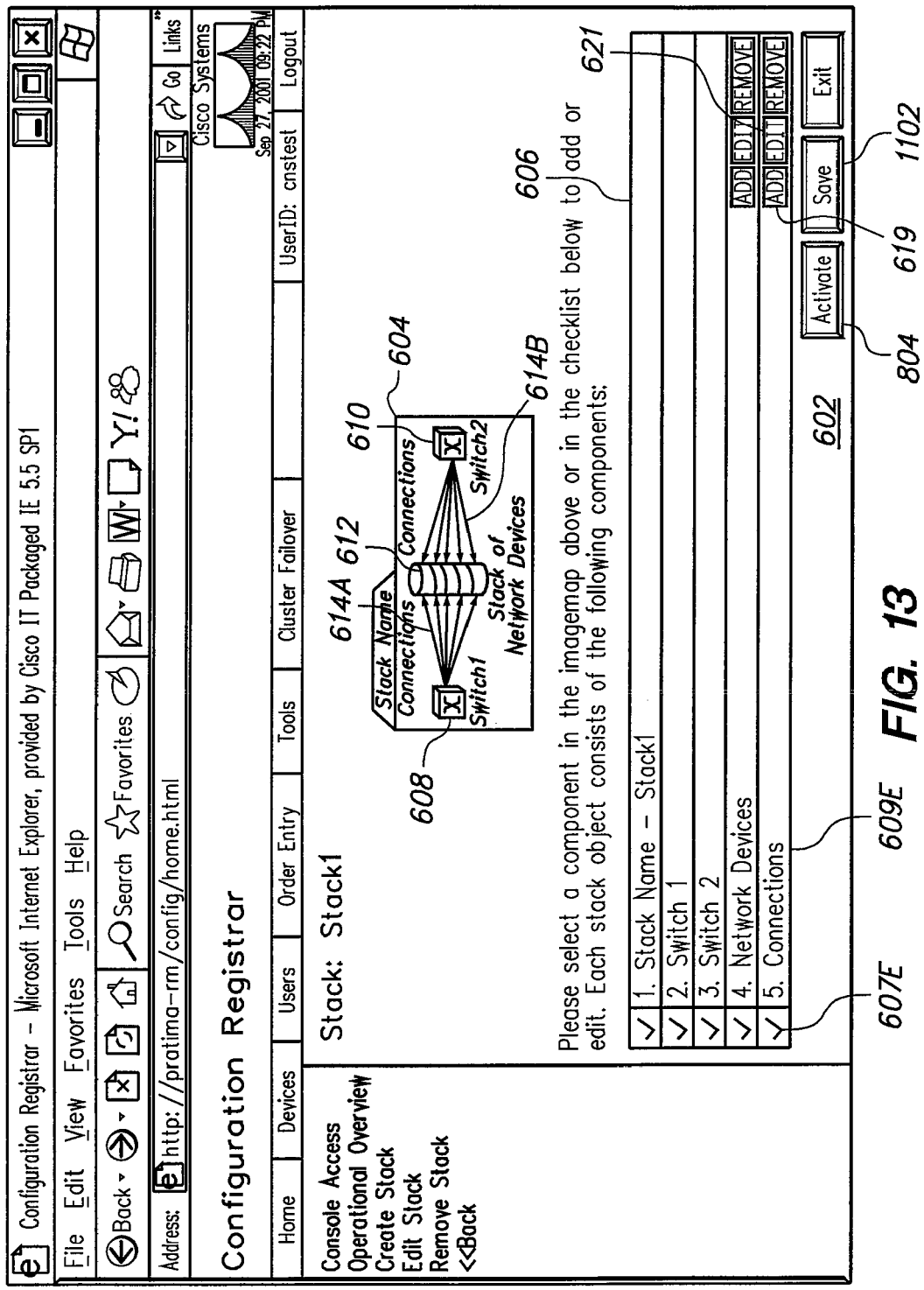
FIG. 13 is a block diagram of a screen display showing an updated cluster information checklist.

In response to entering one or more connections, page 602 is re-displayed showing a summary of the connection information. FIG. 13 is a block diagram of a screen display showing an updated cluster information checklist. Checklist 606 is updated with a further check mark 607E indicating that connection information is entered and updated with connection summary information 609E. However, the logical stack represented in image map 604 is not active at this point. Selecting the Activate button 804 causes the system to validate the values shown in FIG. 13 and to activate the stack. For example, selecting the Activate button 804 causes cluster manager 110 to activate the fail over mechanism described herein for the then-current stack.

3.2.2 Edit Stack Operation

Each cluster stack that is created using Create Stack option 414 of FIG. 4 is stored under a name locally. Thereafter, the user can edit any component of a stack. Referring again to FIG. 4, the stack can be activated immediately after creation from within the Create Stack option 414, or the stack can be activated from within the Edit Stack option 416.

Figure 14:
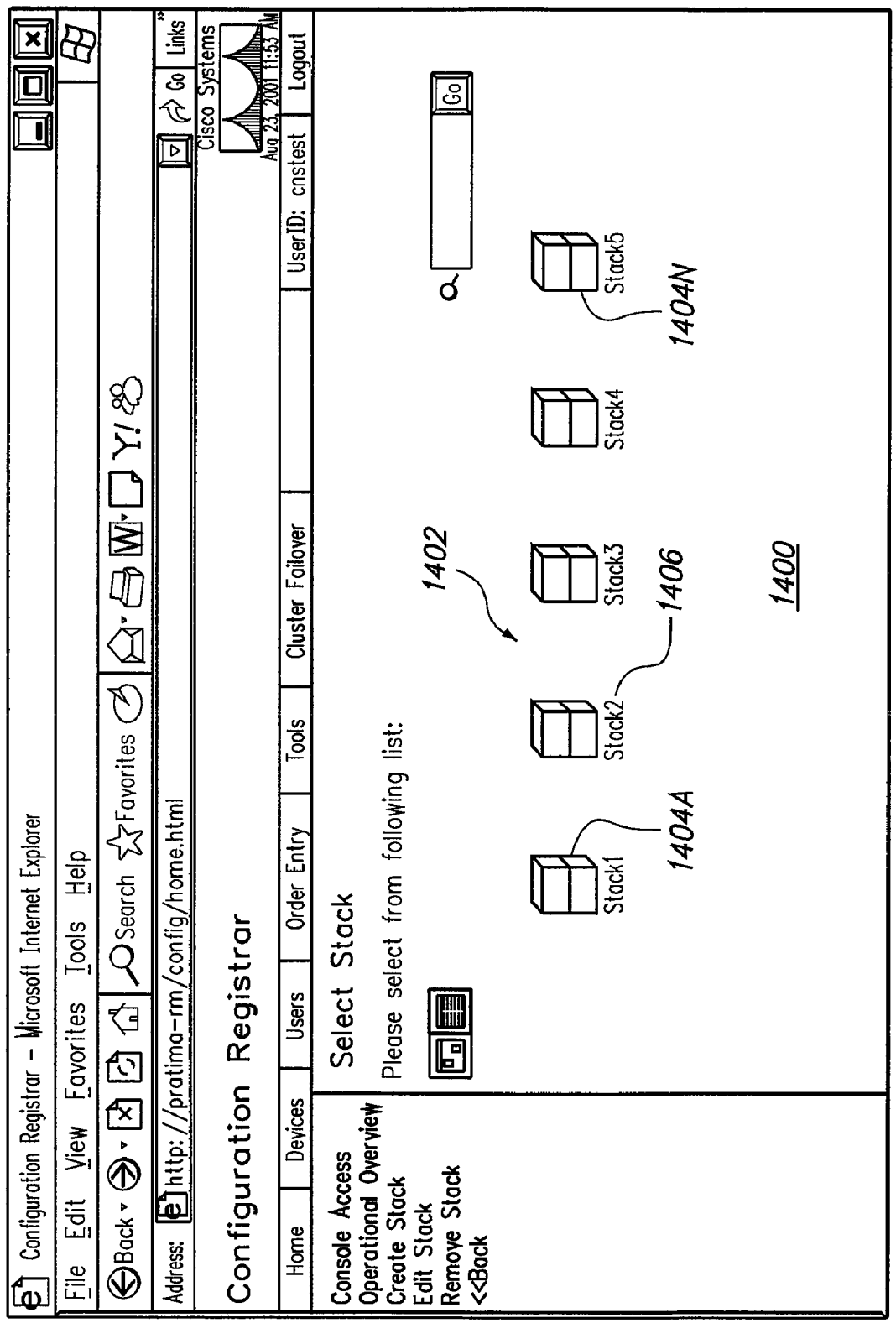
FIG. 14 is a screen display diagram showing a stack selection page.

When Edit Stack option 416 is selected, in response, cluster manager 110 displays a page that prompts the user to select a stack to edit. FIG. 14 is a screen display diagram showing a stack selection page. In the example of FIG. 14, stack selection page 1400 comprises a list 1402 of one or more stack icons 1404A, 1404N. Each of the stack icons includes a name label 1406 indicating the name under which the stack is saved. A user may select a stack for editing by selecting the corresponding icon 1404A, 1404N. There may be any number of defined stacks and icons displayed in page 1400.

Figure 15:
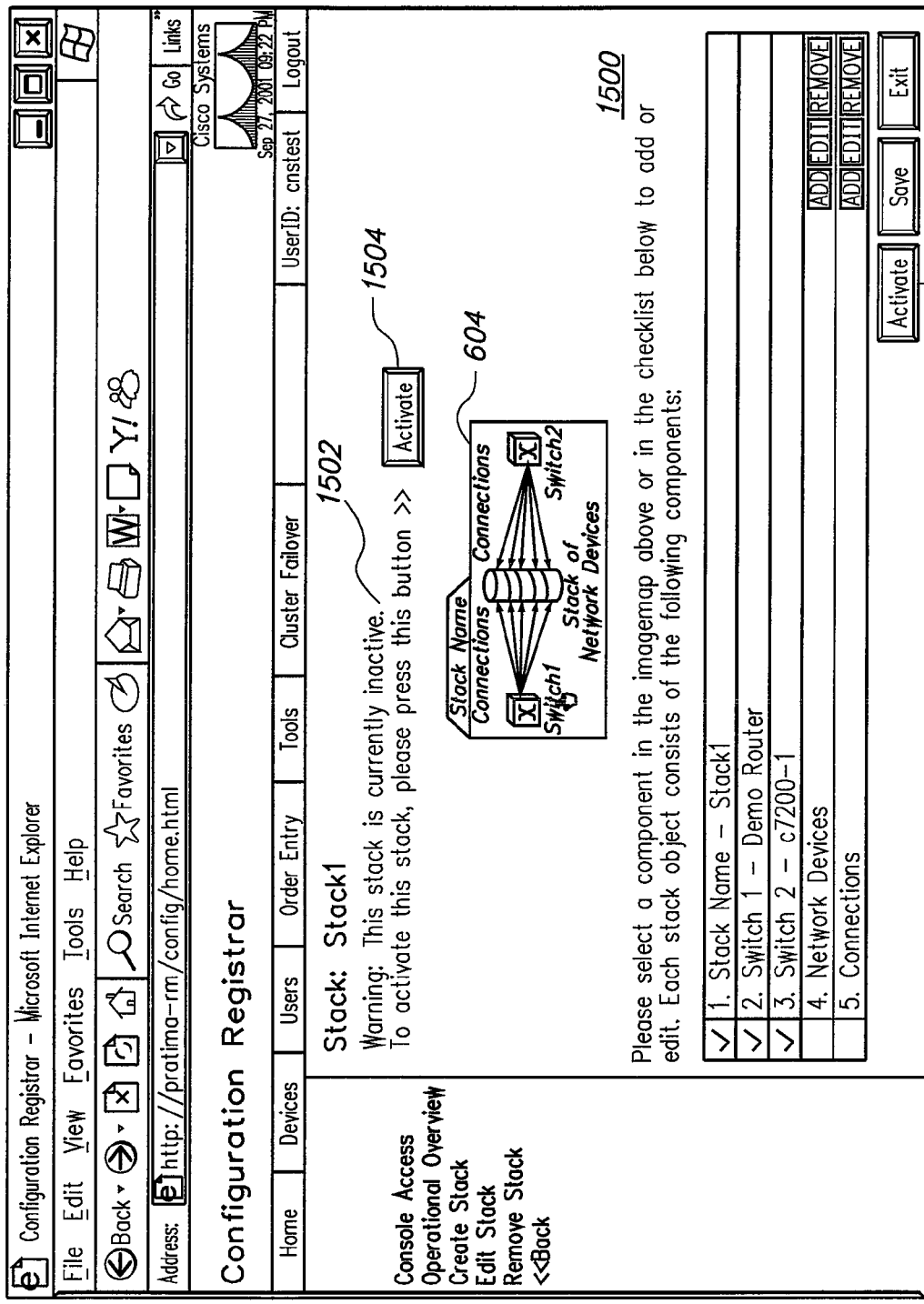
FIG. 15 is a screen display diagram showing a stack warning page.

If the user selects an icon 1404A, 1404N for a stack that is currently inactive, then cluster manager 110 displays a page containing a warning message and prompting the user to first activate the selected stack. FIG. 15 is a screen display diagram showing a stack warning page. In the example of FIG. 15, stack warning page 1500 comprises a warning message 1502 and an Activate button 1504. The user may activate a stack by selecting the Activate button 1504.

If the selected stack is currently active, the user may re-initialize the stack by selecting a "Re-initialize" button 1506. In response, cluster manager 110 issues reboot instructions to all actual devices in the stack, which generally will return the devices to an original state based on a minimal configuration. Re-initialization of devices may be required if a stack is physically moved to a new location.

All information regarding the stack is still stored safely in the RM box. The user simply needs to activate the stack again to have full functionality.

Referring again to FIG. 13, to edit other components of a stack, a user may select an object for editing from image map 604. Checklist 606 continues to reflect components that have been defined. Thus, checklist 606 enables the user to estimate of the components that remain to be defined.

Figure 16:
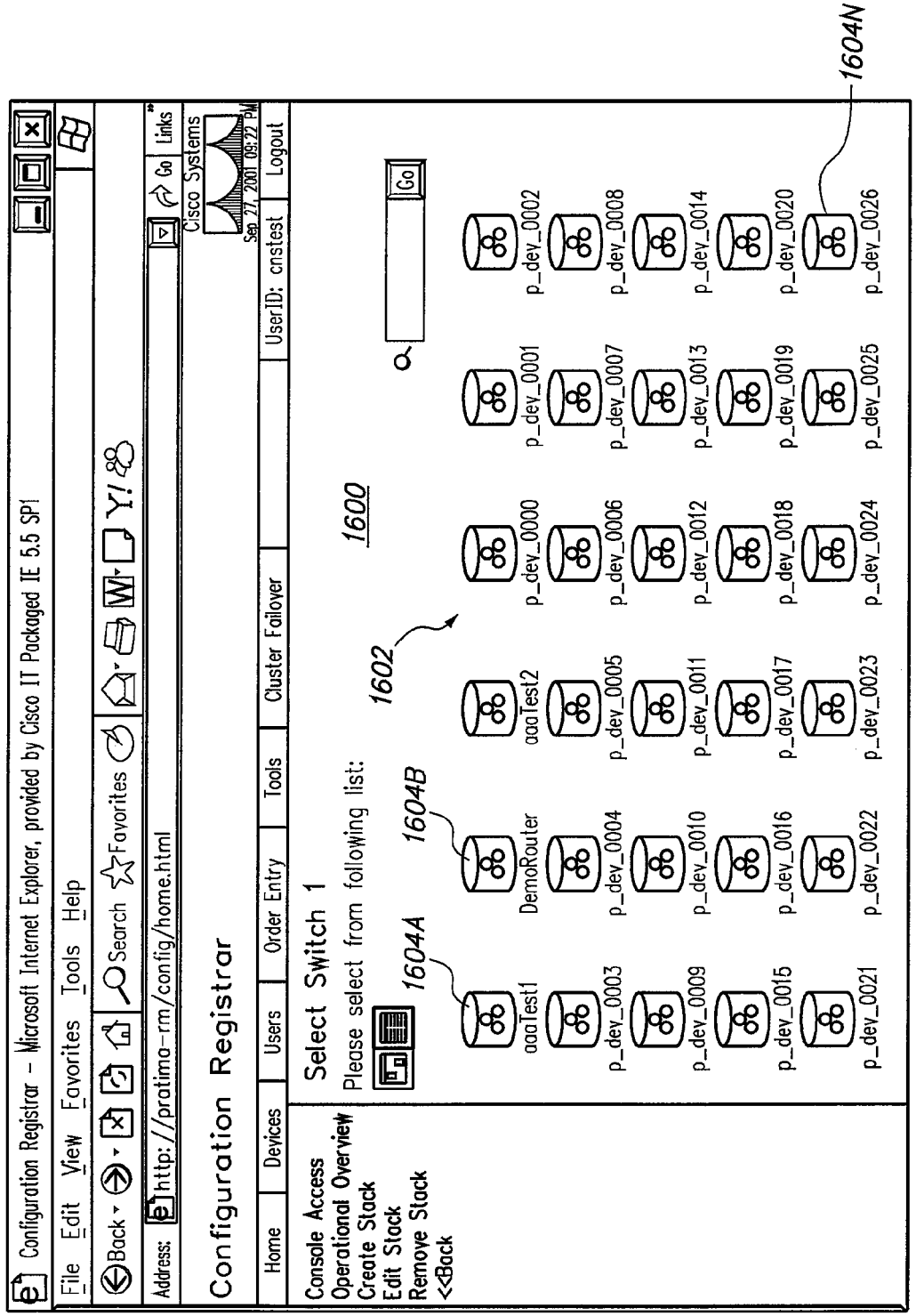
FIG. 16 is a screen display diagram providing an example switch selection page.

Selecting switch 608, designated Switch1 herein, enables the user to edit values relating to the Switch1 object. In response, a switch selection page is displayed. FIG. 16 is a screen display diagram providing an example switch selection page. In the example of FIG. 16, switch selection page 1600 comprises a list 1602 of one or more switch icons 1604A, 1604B, 1604N. A switch icon corresponding to a device that is currently selected as Switch1 is indicated with a color that is different from all other switch icons. In the example of FIG. 16, icon 1604B represents a switch device that is currently associated as Switch1 of the then-current cluster.

The user may select any other device to perform the function of Switch1 by selecting a corresponding switch icon 1604A-1604N. In one embodiment, if a cluster stack is currently active, the user cannot edit values associated with Switch1 or Switch2. Upon selecting a switch icon 1604A-1604N for a device to perform the function of Switch1, cluster manager 110 re-displays the cluster fail over graphical image map 604 as in FIG. 13 so that the user can select another object to edit.

New connections may be added to a stack by selecting on connections 614A, 614B. Alternately, new connections may be added by selecting on an Add button 619 in checklist 606. To edit an existing connection, the user may select an Edit button 621 in the checklist 606.

3.2.3 Console Access Operation

Referring again to FIG. 4, console access to the devices in a stack is provided by selecting Console Access option 410. The Console Access option 410 also enables the user to send a common event to all the devices that are grouped under one stack.

Figure 17:
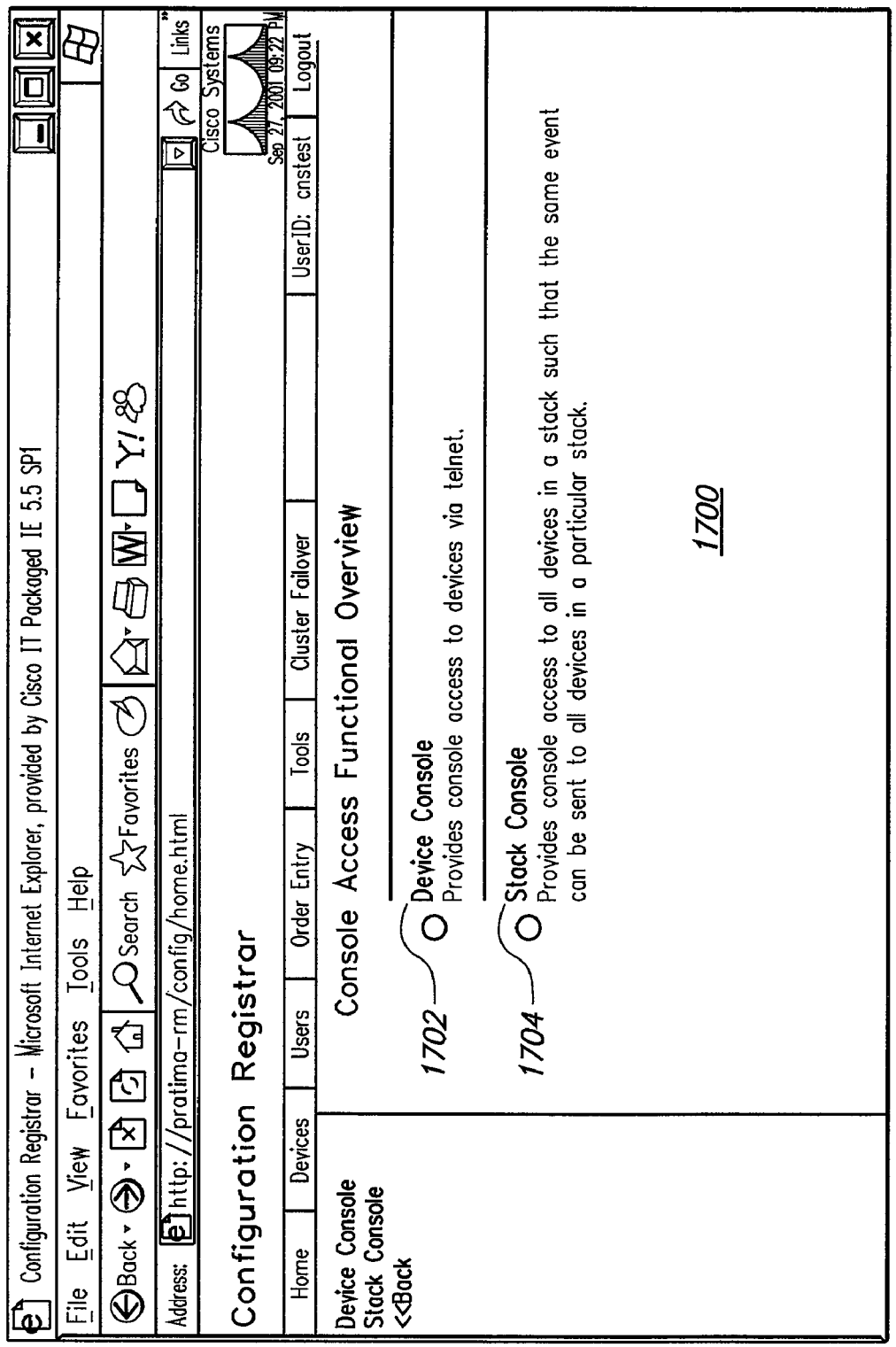
FIG. 17 is a screen display diagram providing an example console access overview page.

In response to selection of Console Access option 410, cluster manager 110 displays a console access overview page. FIG. 17 is a screen display diagram providing an example console access overview page. In the example of FIG. 17, console access overview page 1700 comprises a Device Console option 1702 and a Stack Console option 1704. The Device Console option 1702 provides console access to a device. The Stack Console option 1704 is used to send a common event to all the devices within a stack.

Figure 18:
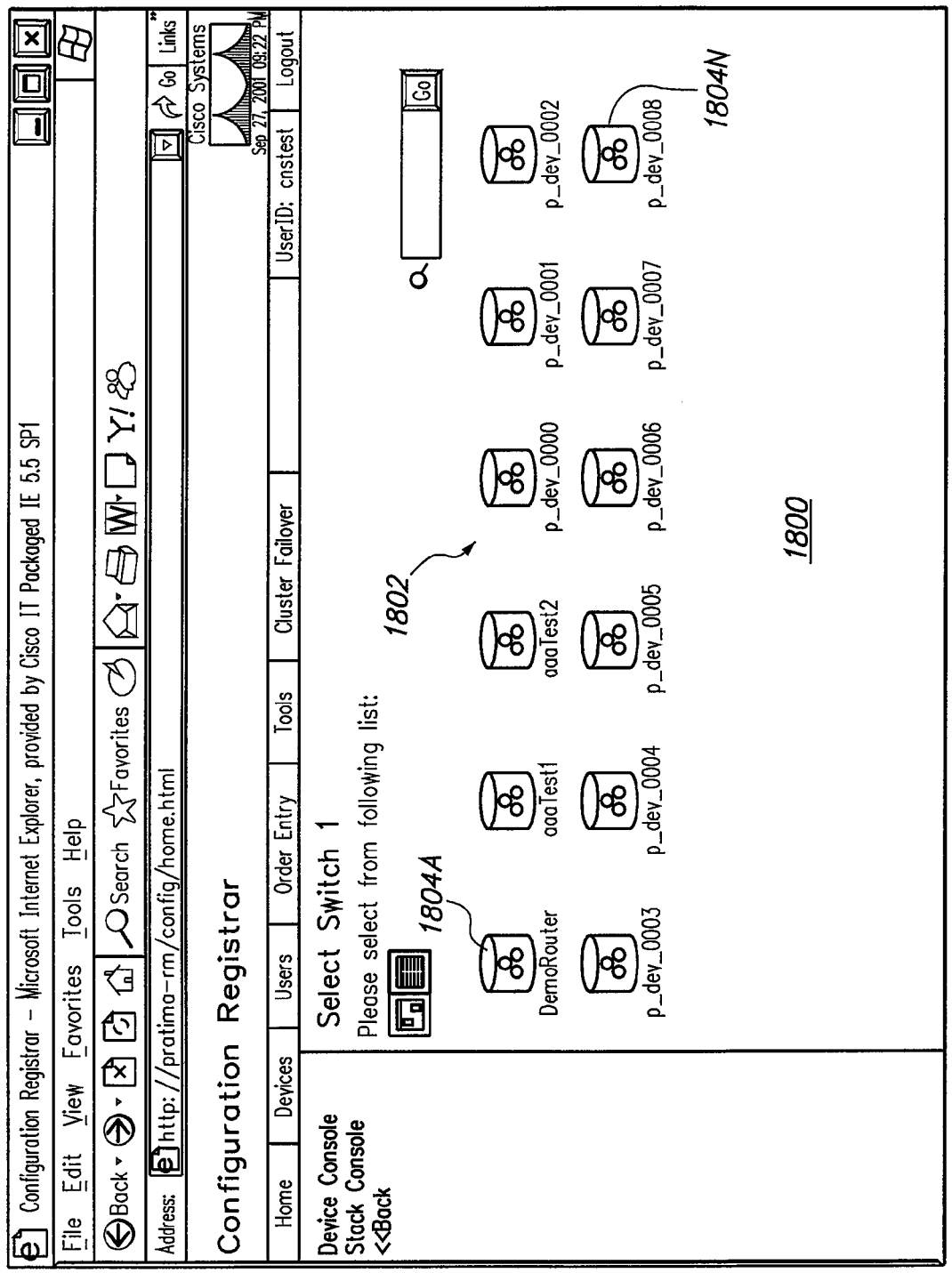
FIG. 18 is an example screen display showing a device selection page.

In response to a selection of the Device Console option 1702, cluster manager 110 displays a device selection page that prompts the user to select a device to which console access is desired. FIG. 18 is an example screen display showing a device selection page. In the example of FIG. 18, device selection page 1800 comprises a list 1802 of one or more device icons 1804A-1804N. Selecting an icon 1804A-1804N signals that the user wishes to establish console access to a device associated with the icon.

Figure 19:
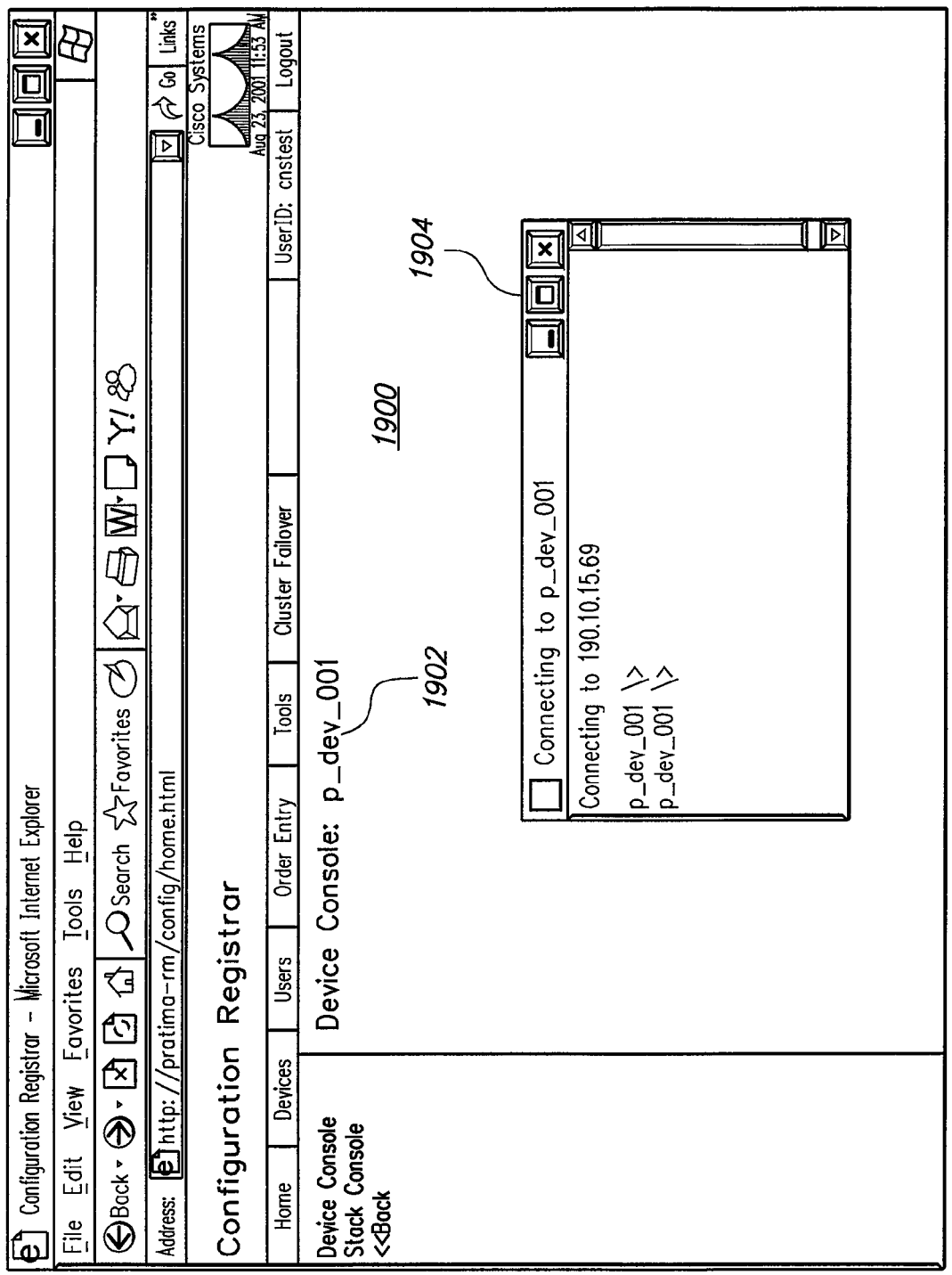
FIG. 19 is an example of a console display page that includes a telnet device console window.

In response to a user selection of one of the icons 1804A-1804N, cluster manager 110 prompts the user to confirm the selection. If confirmation is affirmative, then cluster manager 110 retrieves the telnet information associated with the selected device and establishes a telnet console connection to the device. Further, cluster manager 110 displays a user interface page that contains a telnet console window. FIG. 19 is an example of a console display page 1900 that includes a telnet device console window 1904. In an embodiment, a name 1902 of the selected device is also displayed in page 1900. In this manner the user is placed in direct console communication with the selected device, and the user may enter any desired console command in window 1904 for communication to the device and execution by the device.

Figure 20:
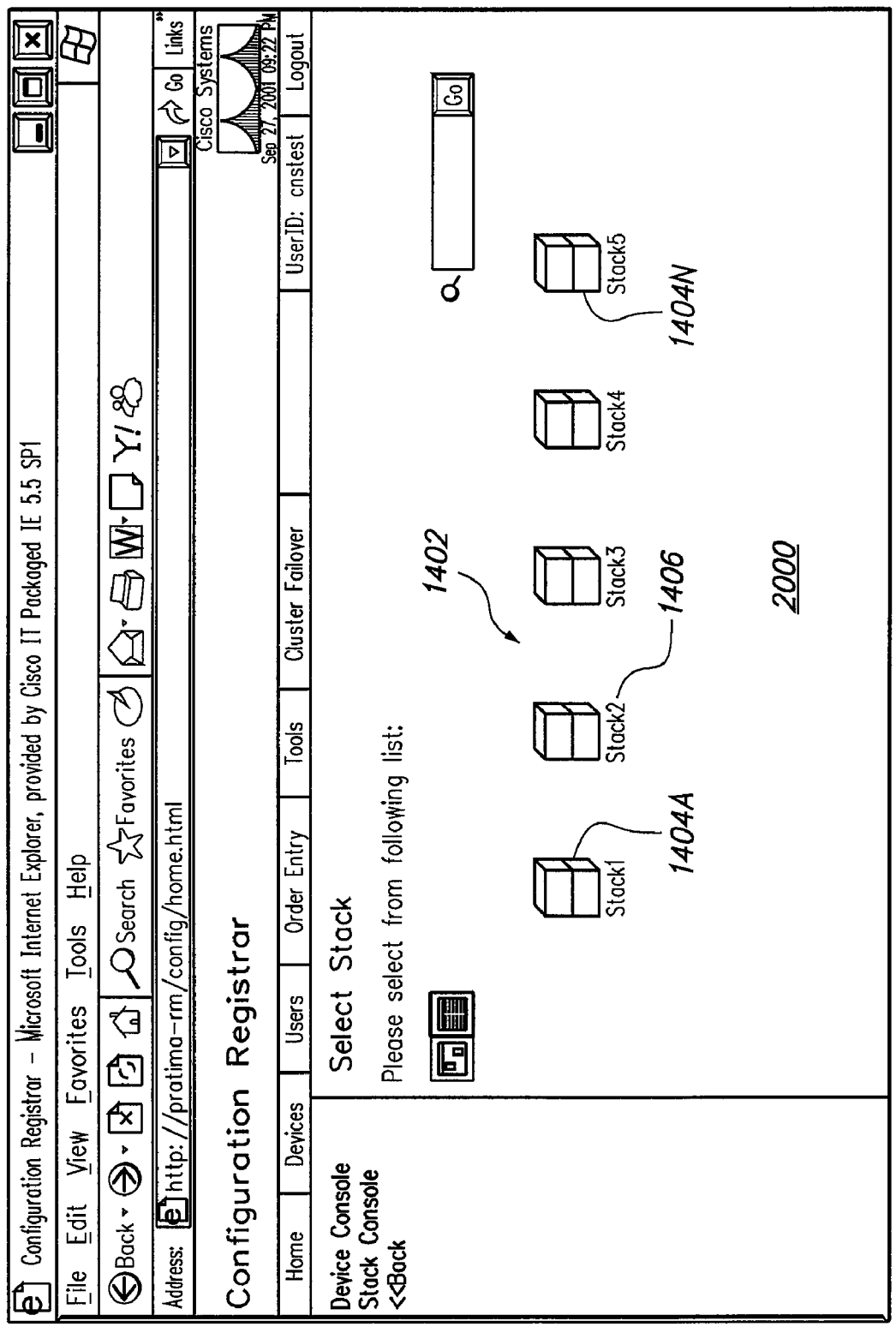
FIG. 20 is a screen display diagram that shows an example stack selection page.

Referring again to FIG. 17, selecting Stack Console option 1704 provides the user with console access to a stack. Thus, the user may send a specified command concurrently to all devices in a stack. In response to a selection of Stack Console option 1704 from the Console Access Overview page 1700, cluster manager 110 displays a page that prompts the user to select a stack. FIG. 20 is a screen display diagram that shows an example stack selection page 2000. In the example of FIG. 20, stack selection page stack selection page 2000 comprises a list 1402 of one or more stack icons 1404A, 1404N. Each of the stack icons includes a name label 1406 indicating the name under which the stack is saved. A user may select a stack for editing by selecting the corresponding icon 1404A, 1404N. There may be any number of defined stacks and icons displayed in page 2000.

Figure 21:
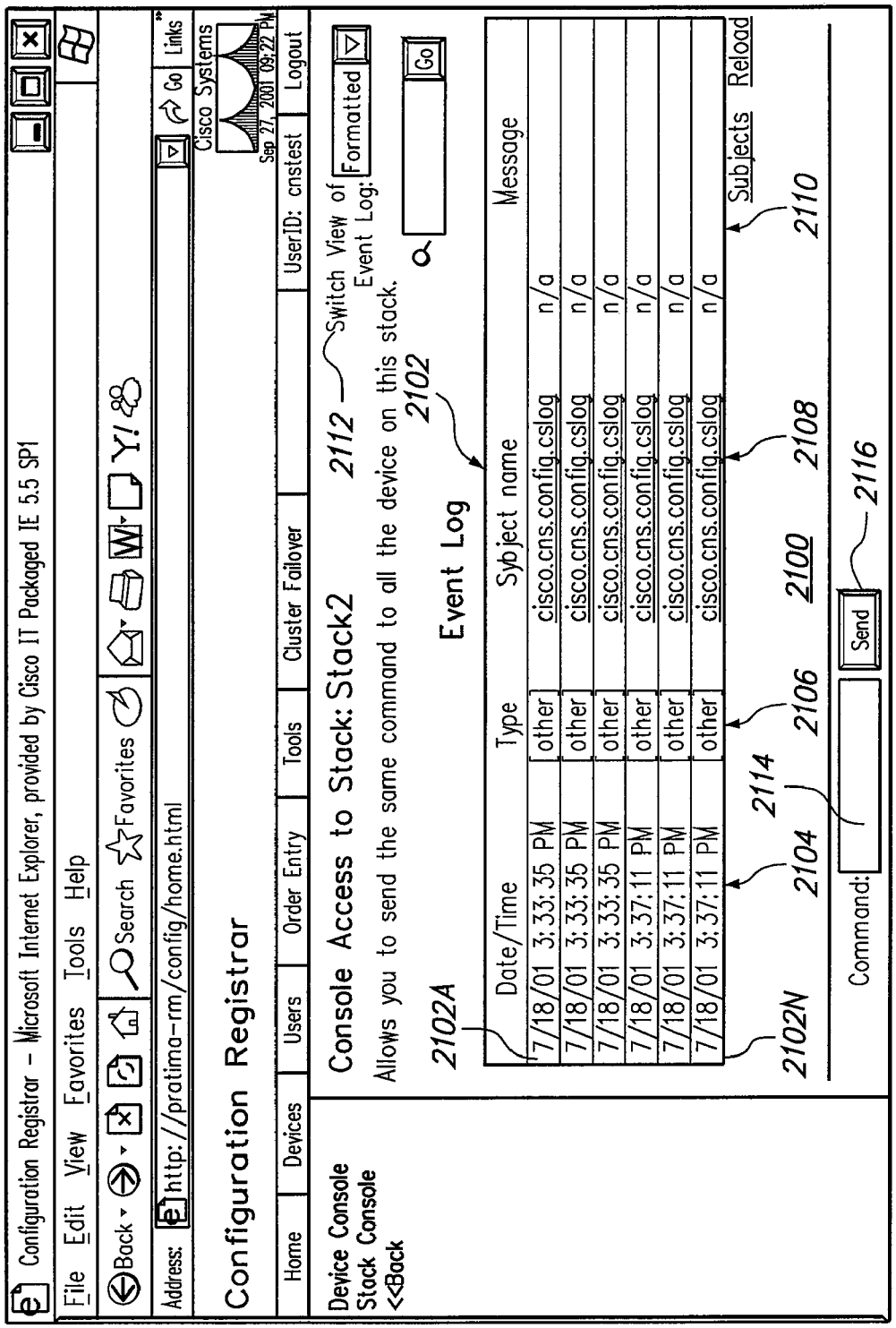
FIG. 21 is a screen display diagram providing an example event log page.

In response to selection of a stack, cluster manager 110 displays an event log page. FIG. 21 is a screen display diagram providing an example event log page. In the example of FIG. 21, event log page 2100 comprises an event log 2102 in table form comprising a time column 2104, type column 2106, event subject name column 2108, and message column 2110. Each row 2102A, 2102N of event log 2102 is associated with an event previously emitted by cluster manager 110.

To send a common command to all the devices in a stack, a user enters the command in command field 2114 and selects a Send button 2116.

In response, cluster manager 110 sends the entered command to all devices in the stack.

Figure 22:
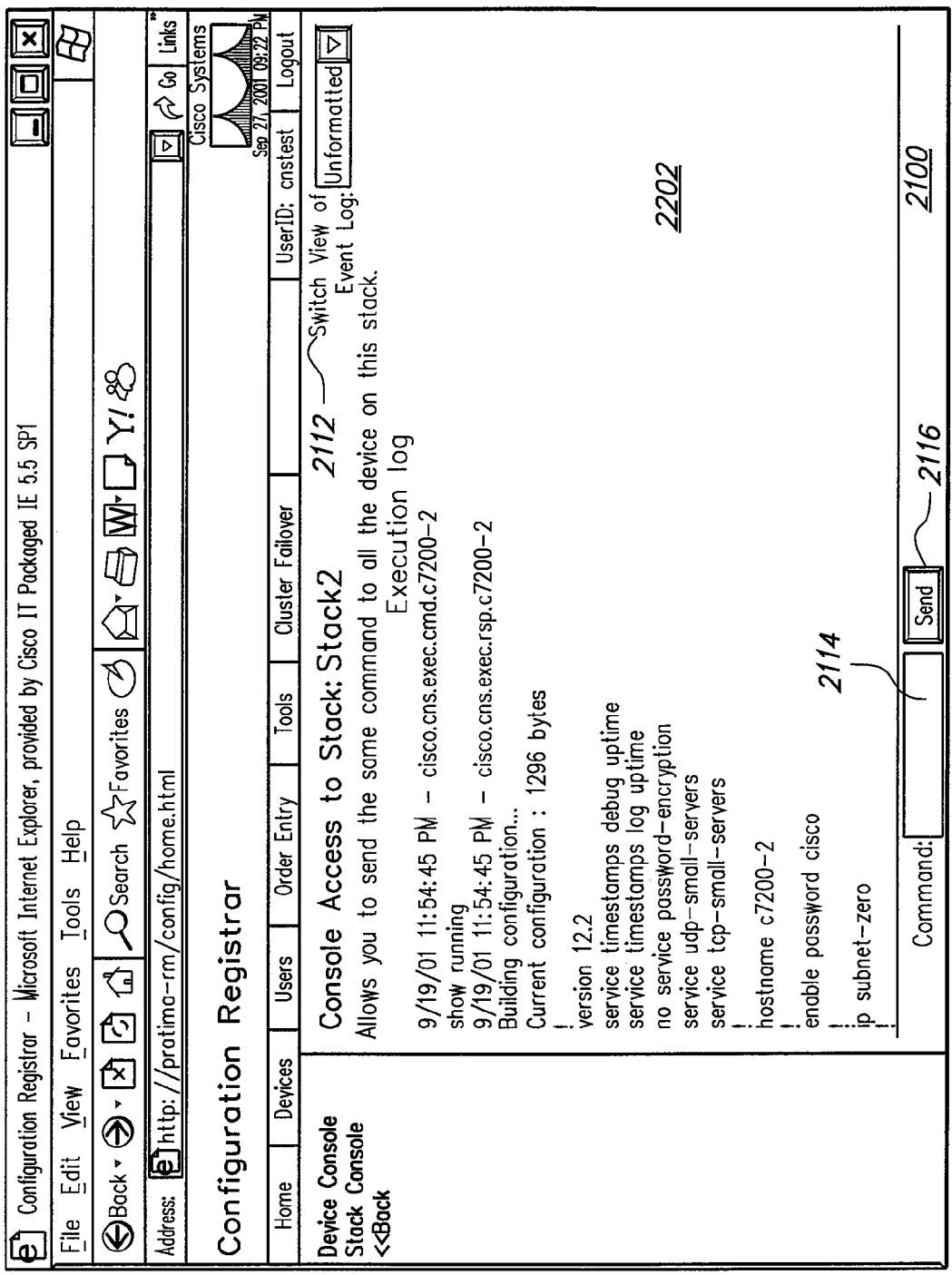
FIG. 22 is a screen display diagram showing an example event log page with a raw data view of an event log.

In the example of FIG. 21, event log 2102 is in a formatted view. The user may select a raw data view of the event log using view widget 2112. In response to selecting a raw data view, cluster manager 110 displays a log page providing a raw data view of the event log. FIG. 22 is a screen display diagram showing an example event log page with a raw data view of an event log. In the example of FIG. 22, event log page 2100 comprises a raw data view 2202.

3.2.4 Operational Overview Option

Operational overview information reflects the underlying state of the device and connection objects with respect to the provisioning operations specified for cluster activation and cluster failover. Adding and deleting device and connections reuse the same functionality as cluster activation and failover.

Figure 23:
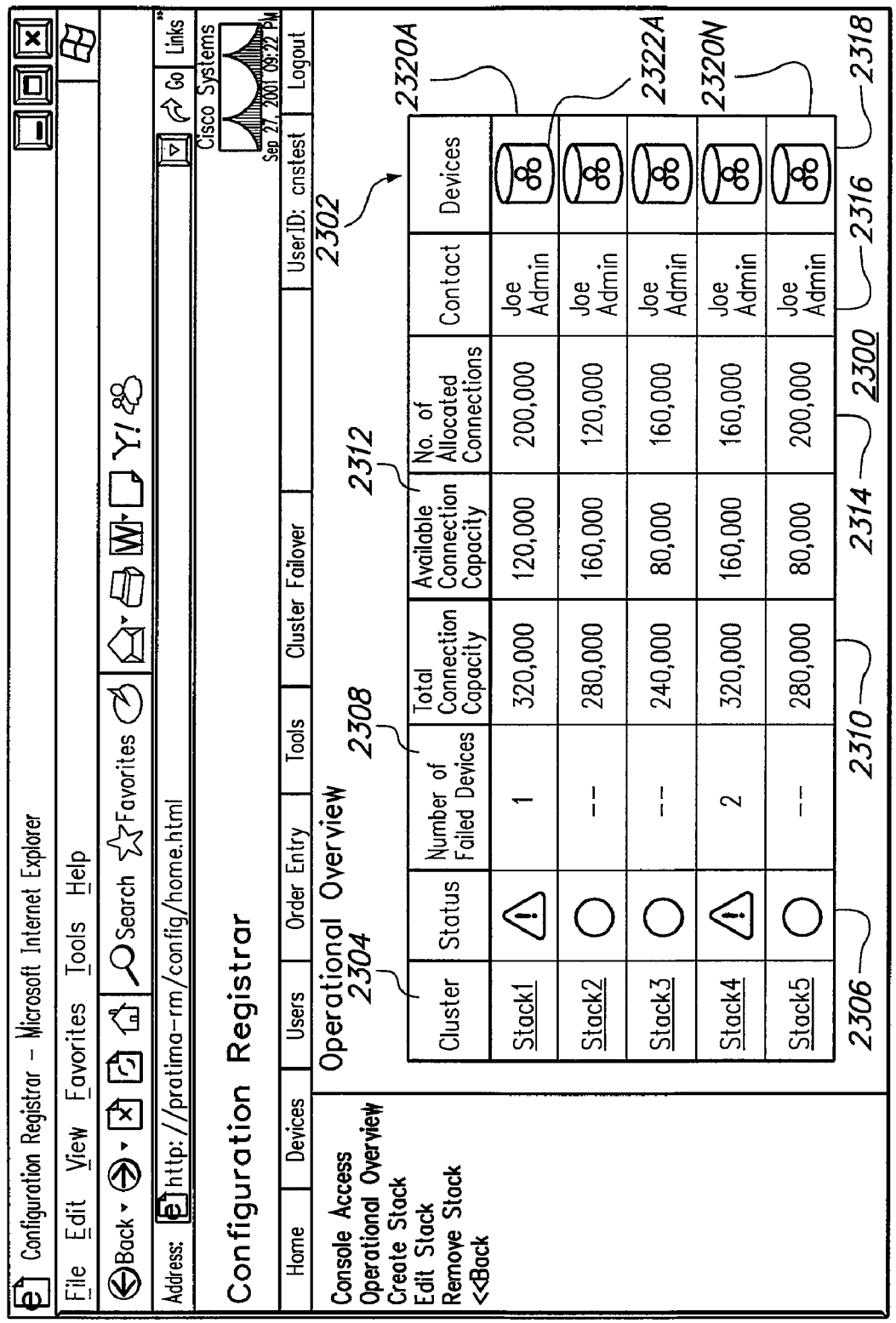
FIG. 23 is a screen display diagram providing an example of an operational overview information page.

Referring again to FIG. 4, Operational Overview option 412 enables a user to view all clusters and associated status information. In response to a selection of Operational Overview option 412, cluster manager 110 displays an operational overview information page. FIG. 23 is a screen display diagram providing an example of an operational overview information page. In the example of FIG. 23, an operational overview table 2302 comprises one or more rows 2320A, 2320N corresponding to stacks of defined clusters. Each row comprises a cluster column 2304, status column 2306, failed device column 2308, total connection column 2310, available connection column 2312, allocated connection column 2314, contact column 2316, and device column 2318.

Cluster column 2304 displays a name of a defined stack or cluster to uniquely identify one of the rows 2320A-2320N. Status column 2306, displays a graphic icon indicating the then-current operating the status of the associated stack. If any of the devices or connections in a stack fails, then the stack reports a warning status and an appropriate icon is displayed in status column 2306.

Failed device column 2308 identifies a number of failed devices in the stack. In one embodiment, if the status of a stack is "warning state," then the failed device column 2308 displays the number of devices that have failed in an associated stack. Total connection column 2310 displays a total connection capacity corresponding to a maximum number of connections that the stack may support. Available connection column 2312 indicates the number of free connections that may be used. Allocated connection column 2314 displays a number of connections that are active on the associated device. Contact column 2316 displays the name of the primary contact person for administration of the associated stack.

Figure 24:
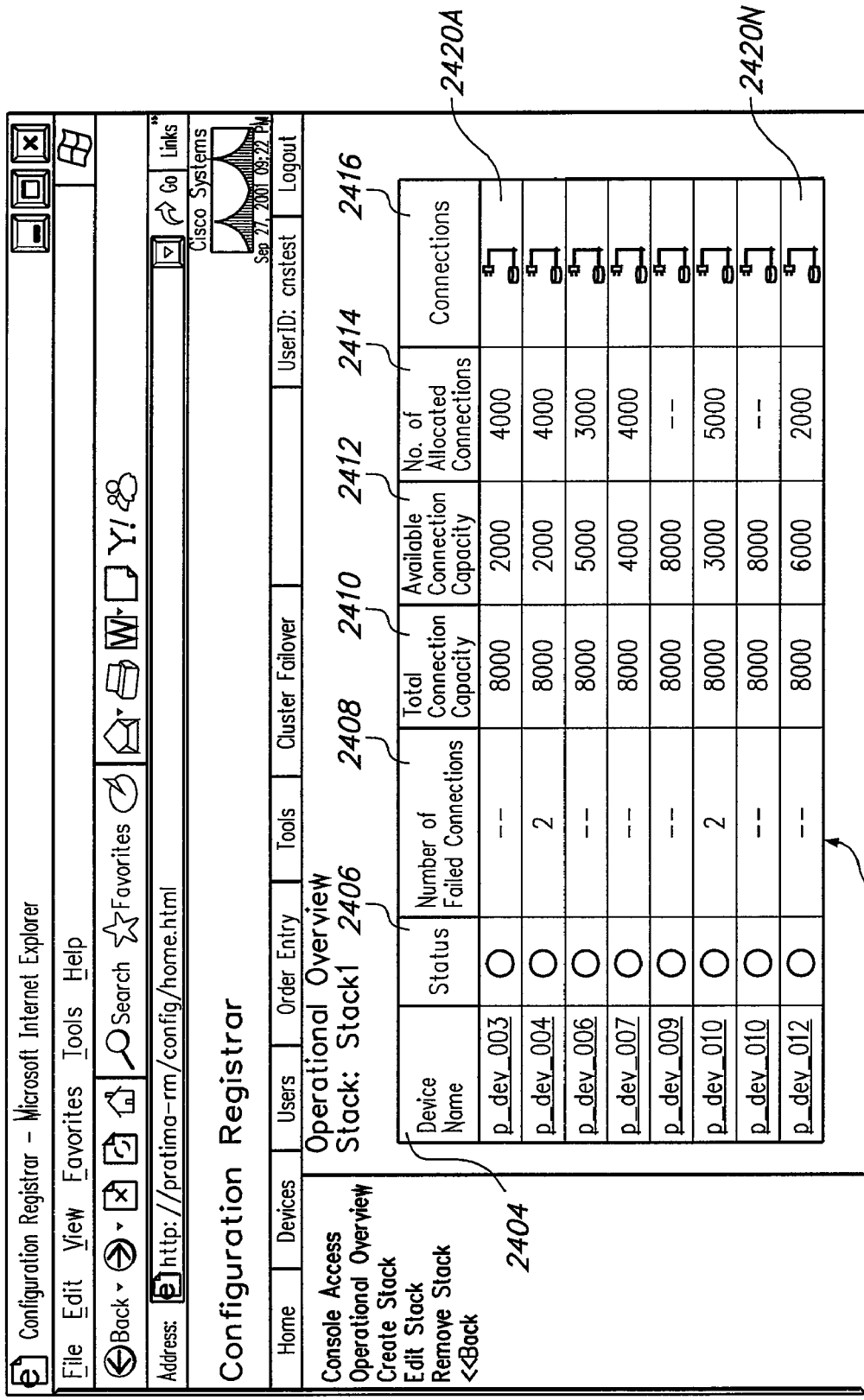
FIG. 24 is a screen display diagram that shows operational overview information for devices in a stack.

Device column 2318 provides a graphical link to view operational status information for devices in a stack. In response to selection of a device icon in column 2318, such as device icon 2322A, cluster manager displays a page that provides operational information about each device in the associated stack. FIG. 24 is a screen display diagram that shows operational overview information for devices in a stack.

In the example of FIG. 24, a device operational overview page 2400 comprises a device operational overview table 2402 comprising a plurality of rows 2420A, 2420N each corresponding to a device in the currently-selected stack or cluster. In one embodiment, each row comprises a device name column 2404, status column 2406, failed connections column 2408, total connections column 2410, available connections 2412, allocated connections 2414, and connections link column 2416.

The device name column 2404 provides a name that has been previously associated with a device in the stack, and provides a unique identifier for each row of the table 2402. Status column 2406 provides a graphical status indicator that informs the user about the status of the associated device. In one embodiment, a green light status indicator indicates that the device is in a normal operational state; a red light indicates that the device is broken, and possibly needs manual intervention; a gray light indicates that the stack is a backup device; and an in-progress icon indicates that a fail-over is in progress. In other embodiments, different graphical icons may be used.

Failed connections column 2408 provides the user with an exact number of failed connections. In one embodiment, column 2408 provides a value indicating the then-current number of failed connections for devices that are in normal operational status. If the associated device has no failed connections, then no value is displayed.

Total connections column 2410 displays the maximum number of connections supported by the device. Available connections 2412 column displays the available connection capacity for the device, indicating the number of additional connections that may be supported by the associated device. Allocated connections column 2414 specifies the number of connections that are currently active on the device.

Connections link column 2416 displays a graphical link that enables a user to view the operational status of all connections that are associated with the then-current device. Graphical links in column 2416 is selectable only for devices that are in operational status. For any device that is broken or designated as a backup device, the graphical link is grayed out. Selecting the connection icon for any device causes cluster manager 110 to display a view of all connections to the device and their status.

Figure 25:
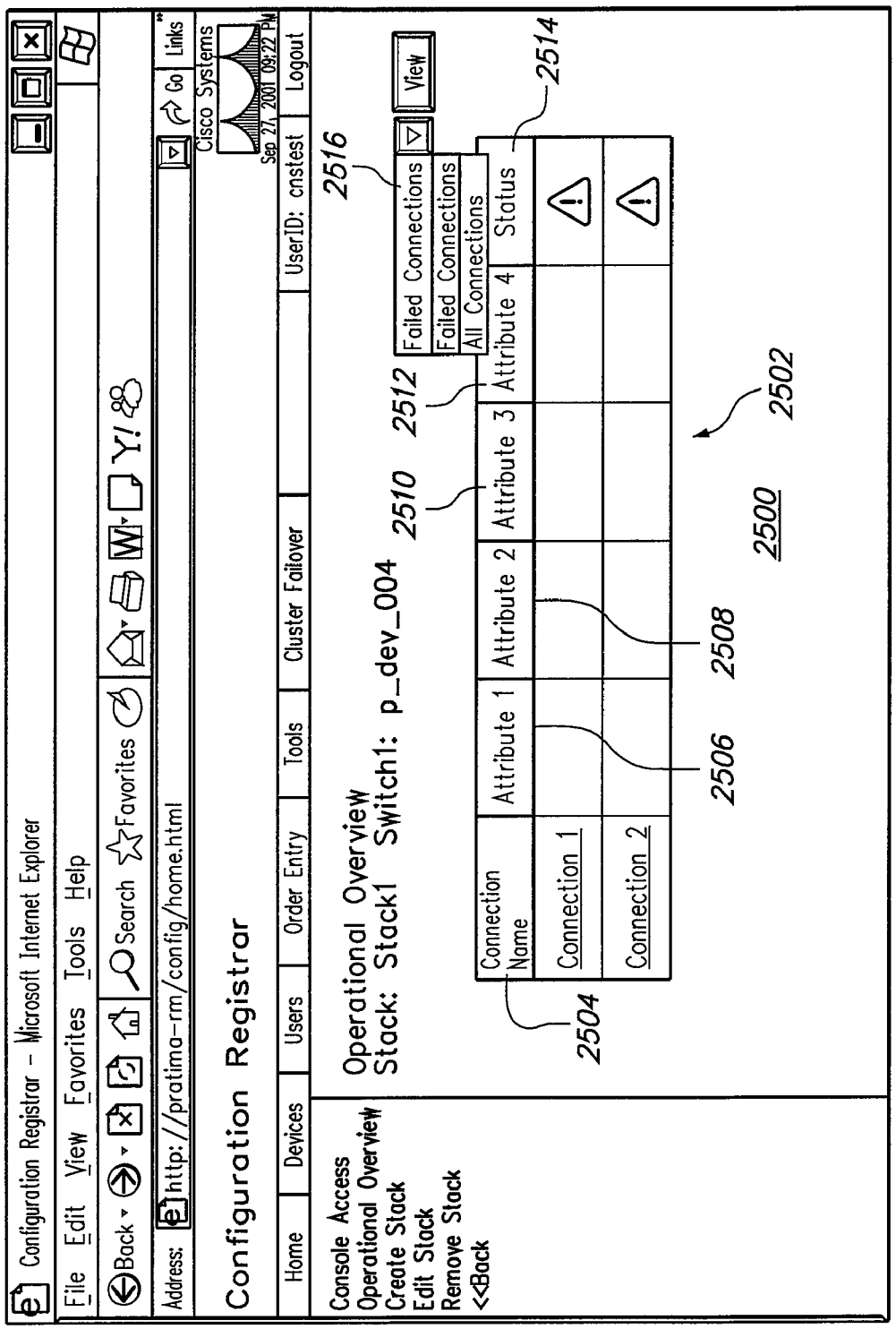
FIG. 25 is a screen display diagram that shows an example connection operational overview page.

FIG. 25 is a screen display diagram that shows an example connection operational overview page 2500 that comprises a connection operational overview page 2502. The table 2502 comprises rows for each connection that is associated with a stack. Table 2502, in one embodiment, comprises a connection name column 2504, one or more attribute columns 2506, 2508, 2510, 2512, and status column 2514.

The connection name column 2504 shows a name that has been uniquely assigned to a connection. The attribute columns 2506, 2508, 2510, 2512 display attributes that were previously entered for a connection. The status column 2514 provides a status indicator for the associated connection. Graphical icons indicating status may be used.

In one embodiment, by default, connection table 2502 shows only those connections that have failed. In another embodiment, the user optionally can cause cluster manager 110 to display all connections to the then-current device by selecting a view option from a view pull-down menu 2516.

The user may also view the device configuration of the devices that perform the function of the switches, or the nodes that are part of the stack. In one embodiment, selecting on the stack name in the Operational Status overview page causes cluster manager 110 to generate a page that displays the device configuration of the devices that perform the function of the switches, or the nodes that are part of the stack.

Figure 26:
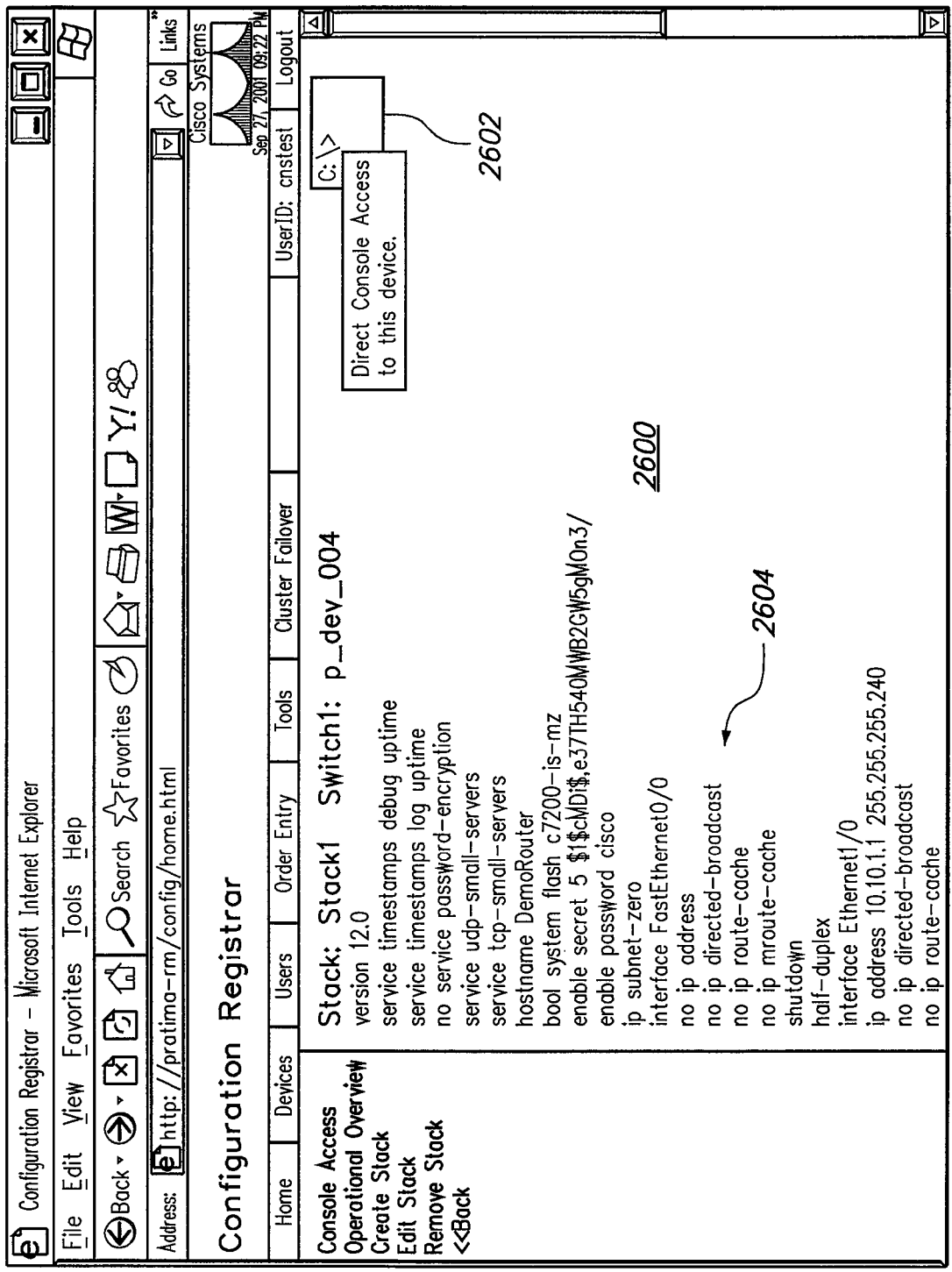
FIG. 26 is a screen display diagram of a configuration page that is generated in response to a selection of a switch icon.

Referring again to FIG. 6, in response to a selection of switch icons 608, 610, cluster manager 110 generates a page showing the then-current configuration of the real switch device that is associated with the icons 608, 610. As described above, selecting the text labels "Switch1," "Switch2" causes cluster manager 110 to select a device for association with the cluster using the page of FIG. 7. In contrast, FIG. 26 is a screen display diagram of an example configuration page that cluster manager 110 generates in response to a selection of switch icons 608, 610. In an embodiment, the user may select on any object in the image map 604 of FIG. 6 to view the then-current configuration of the device.

Referring again to FIG. 26, configuration page 2600 shows configuration commands 2604 of the then-current device configuration. A console access button 2602 provides the user with direct console access to the device. Thus, for example, when a device is in a broken state, an administrator may view the configuration for a broken device, and directly connect to the console to fix problems.

3.3 Implementation Mechanisms—Logical Cluster

1. Logical Objects. Logical device objects are used by cluster manager 110 to represent real stack devices. Switch objects are used by cluster manager to represent the real switches and connection objects are implemented corresponding to each end-to-end connection which needs to be provisioned through the cluster.

2. Generation of end-to-end connection CLI—the Connection Object a) End-to-End application connections (e.g., ATM PVC) can be provisioned to the Cluster. The object corresponding to the end-to-end connection is initially associated to a stack device object according to the selections made using the radio buttons 506, which is defined globally per cluster. Subsequently connection objects can be logically re-associated from a failed device object to a newly allocated device object from the backup pool.

b) The end-to-end connection CLI targeting the switches is generated by instantiating templates 1216 and 1220, which can refer to six attributes. The attributes 1204, 1206, 1208, 1210 are administrator defined and they are defined explicitly within the connection object itself. The fifth and sixth attributes are special attributes that are implicitly defined as the switch-1 interface name attached to the device that is home to the connection object and the similar interface name for switch-2.

c) The end-to-end connection CLI targeting the stack device is generated by instantiating template 1212 using attributes 1204, 1206, 1208, 1210.

d) CLI to UNprovision connections on the switches can be generated by instantiating templates 1218 and 1222 using the same set of six attributes as specified for b) above. UNprovisioning of a connection can occur as a result of a failure of the stack device associated with connection or due to an administrative deletion of the connection.

e) CLI to UNprovision connections on the stack devices can be generated by instantiating template 1214 using attributes as in c) above. Connections are UNprovisionned from stack devices as part of an administration deletion only. Failure of the associated device does not require UNprovisioning of connections from the failed stack device.

3. Generation of CLI to enable/disable physical and Link Level connections from switch to Stack device.

a) To generate CLI to enable the physical connection from a switch to a device, templates 1004 or 1008 are instantiated for switch1 or switch2 respectively. Associated with the instantiation of these templates are attributes 1014A, 1016A and 1014B and 1016B for switch1 and switch2 respectively. Attributes 1014A and 1014B contain the interface name on the switch which is physically connected to the stack device. Device enable CLI is generated as part of an adaptive reprovisioning when a stack device fails and a replacement stack device is logically selected from the backup pool or when activating the cluster or when adding a new device to a cluster.

b) To generate CLI to disable the physical connection from a switch a stack device, templates 1006 or 1010 are instantiated from switch1 and switch2 respectively. The same attributes as a) above are associated with the instantiation of these templates. Device (physical and link layer) disable CLI is generated as part of an adaptive reprovisioning when a stack device fails and it needs to be isolated from the network or when an administrative removal of the stack device occurs.

4. Console Implementation:

a) Device Console. Referring again to FIG. 19, the purpose of the device console is to provide individual device access and control from a single administrative point.

The stack devices may be behind a firewall. The cluster manager provides access across a firewall to the console of individual devices that would otherwise be blocked by the firewall. The cluster manager provides a connection to such devices in two aspects. A first aspect is between the administrator's HTML display device, such as a PC or web browser and a servlet within the cluster manager which drives the display of 1904. The second aspect is an actual telnet session from the cluster manager to the device console as specified in 1018. It is emphasized that the telnet runs on the cluster manager and not on the administrator's PC. It is assumed that the cluster manager 'straddles' the firewall, with the telnet leg on one side of the firewall, and the HTML/HTTP leg on the other side.

b) Stack console. Referring again to FIG. 21 and FIG. 22, a Cluster Console can present, to a network administrator, a single instance of a cluster console actually derived from the individual consoles of the constituent devices in the cluster. The Cluster console broadcasts configuration and execution commands (accepted on its cluster console interface to the administrator) to all the devices in the cluster. These broadcasts are in the form of events on the event bus using an XML payload. Within each device are agents that extract the commands wrapped in the XML and then present those commands to the device's native console. Each device's console output is re-directed and published on the event bus. The CNS cluster console listens on the event bus and collects the multiple responses and collates them into a single query response for presentation on the cluster console back to the original requestor/administrator.

In one embodiment, the functions of the cluster console performs the following functions:

a) INITIALIZATION: The cluster console subscribes to a well known event bus subject corresponding to bus events from devices containing acknowledgment of configuration and redirected device console output of execution commands. Within each component device of a Cluster Manager there is are configuration and exec agents which can publish events on the bus containing console responses encoded in an XML format as well as config-success and/or config fail messages. These same agents within each device also subscribe to a well known subject corresponding to config.load and exec events containing requests from the cluster console (originated from the administrator).

b) ACCEPT CONSOLE REQUEST/INPUT FROM ADMINISTRATOR: The administrator is presented with an output panel and can key in input for the console. He has the option of selecting config-mode or exec mode. As well he can select between a formatted presentation with a web look and feel or a text presentation which provides a lower level device console presentation.

c) CONVERT REQUEST/INPUT INTO EVENT-BUS BROADCAST: Convert cluster console input from administrator into an XML format and then publish/broadcast the XML as an config.load or an exec event on the event bus.

d) DEVICE AGENT RECEIVES CONFIG/EXEC EVENT: Each cluster component device which receives the published config/exec event extracts the imbedded command and then presents it to its own native system as though it were being presented to its console. The results (console output or config success/fail status) are encoded into XML and published on the event bus.

e) CLUSTER CONSOLE WAITS TO RECEIVE RESPONSES: The cluster console waits (a implementation defined maximum time) to receive the responses from each cluster component device. The responses are also encoded in a XML format by the device agents that are imbedded in each device. The device agent publishes the response using the event bus transport.

f) CLUSTER MANAGER AGGREGATES INDIVIDUAL RESPONSES INTO A SINGLE UI PRESENTATION: The output from each device is presented sequentially on the cluster console. Presentations are not interleaved but organized per device event name and time stamped accordingly.

g) TELNET OVERRIDE: A direct telnet window embedded in the main cluster console presentation is available for direct interaction between the administrator and the individual console of an specific device in the cluster.

Thus, a software mechanism and process provides an administrative user with a single virtual console that can access and send configuration to multiple devices of a cluster, or to all devices as a unitary whole. The event bus is the logical backplane for broadcasting commands to the devices in the cluster.

As a result, administration of large clusters is greatly simplified. Although the composite nature of the stack is not completely hidden from the administrator, the approaches herein provide a way to execute debug commands, show commands and many types of configuration commands on the cluster without having to individually configure or query each specific device. Further, the cluster console approach relieves the administrator from needing to keep track of the IP address of individual devices, which ones are active and which ones are the backup pool, which is dynamic depending on failover events.

4.0 Implementation Mechanisms

Hardware Overview

Figure 27:
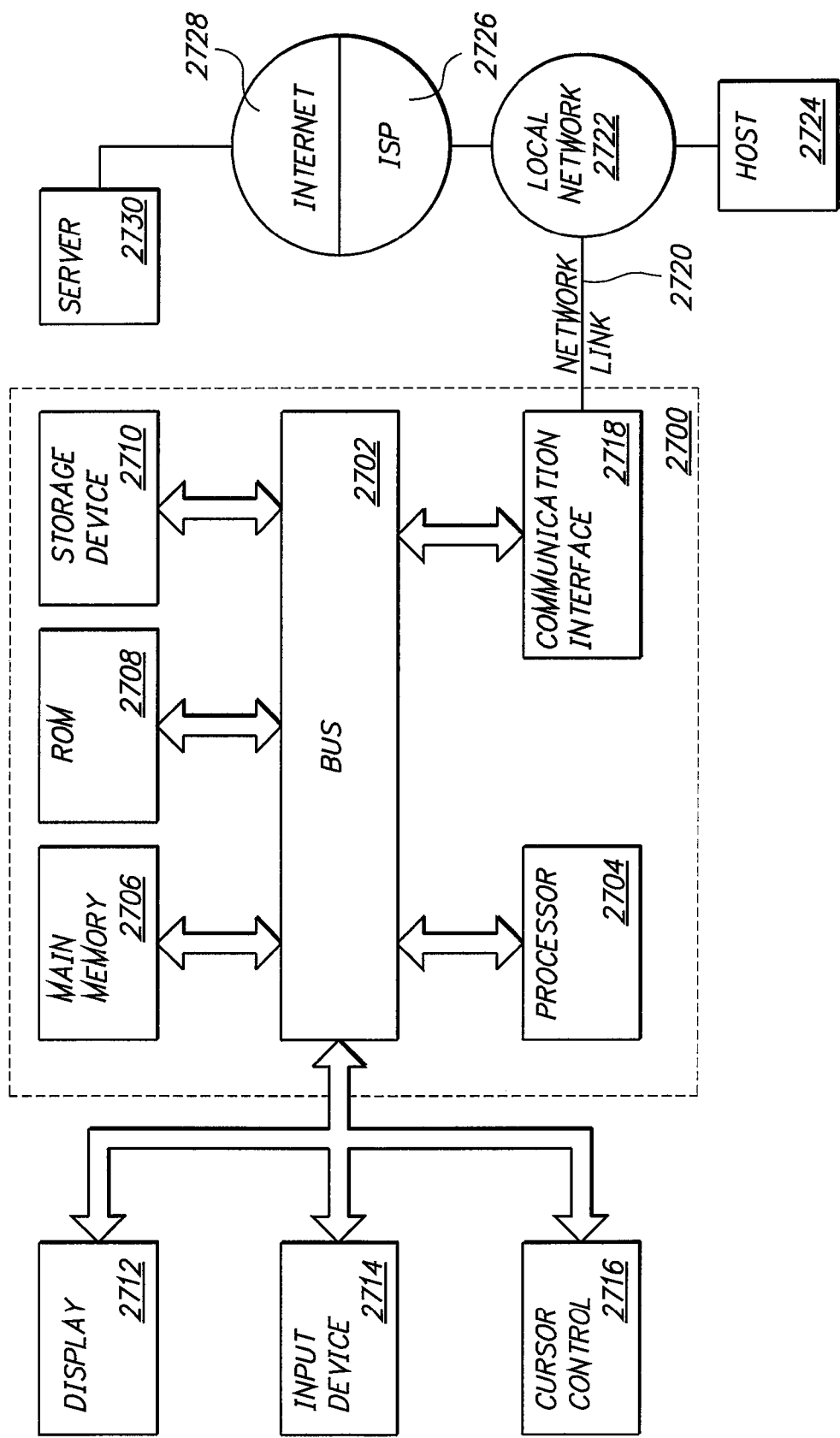
FIG. 27 is a block diagram that illustrates a computer system upon which an embodiment may be implemented.

FIG. 27 is a block diagram that illustrates a computer system 2700 upon which an embodiment of the invention may be implemented. Computer system 2700 includes a bus 2702 or other communication mechanism for communicating information, and a processor 2704 coupled with bus 2702 for processing information. Computer system 2700 also includes a main memory 2706, such as a random access memory ("RAM") or other dynamic storage device, coupled to bus 2702 for storing information and instructions to be executed by processor 2704. Main memory 2706 also may be used for storing temporary variables or other intermediate information during execution of instructions to be executed by processor 2704. Computer system 2700 further includes a read only memory ("ROM") 2708 or other static storage device coupled to bus 2702 for storing static information and instructions for processor 2704. A storage device 2710, such as a magnetic disk or optical disk, is provided and coupled to bus 2702 for storing information and instructions.

Computer system 2700 may be coupled via bus 2702 to a display 2712, such as a cathode ray tube ("CRT"), for displaying information to a computer user. An input device 2714, including alphanumeric and other keys, is coupled to bus 2702 for communicating information and command selections to processor 2704. Another type of user input device is cursor control 2716, such as a mouse, trackball, stylus, or cursor direction keys for communicating direction information and command selections to processor 2704 and for controlling cursor movement on display 2712. This input device typically has two degrees of freedom in two axes, a first axis (e.g., x) and a second axis (e.g., y), that allows the device to specify positions in a plane.

The invention is related to the use of computer system 2700 for automatic re-provisioning of network elements to adapt to failures. According to one embodiment of the invention, automatic re-provisioning of network elements to adapt to failures is provided by computer system 2700 in response to processor 2704 executing one or more sequences of one or more instructions contained in main memory 2706. Such instructions may be read into main memory 2706 from another computer-readable medium, such as storage device 2710. Execution of the sequences of instructions contained in main memory 2706 causes processor 2704 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 2704 for execution. Such a medium may take many forms, including but not limited to, non-volatile media, volatile media, and transmission media. Non-volatile media includes, for example, optical or magnetic disks, such as storage device 2710. Volatile media includes dynamic memory, such as main memory 2706. Transmission media includes coaxial cables, copper wire and fiber optics, including the wires that comprise bus 2702. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 2704 for execution. For example, the instructions may initially be carried on a magnetic disk of a remote computer. The remote computer can load the instructions into its dynamic memory and send the instructions over a telephone line using a modem. A modem local to computer system 2700 can receive the data on the telephone line and use an infrared transmitter to convert the data to an infrared signal. An infrared detector can receive the data carried in the infrared signal and appropriate circuitry can place the data on bus 2702. Bus 2702 carries the data to main memory 2706, from which processor 2704 retrieves and executes the instructions. The instructions received by main memory 2706 may optionally be stored on storage device 2710 either before or after execution by processor 2704.

Computer system 2700 also includes a communication interface 2718 coupled to bus 2702. Communication interface 2718 provides a two-way data communication coupling to a network link 2720 that is connected to a local network 2722. For example, communication interface 2718 may be an integrated services digital network ("ISDN") card or a modem to provide a data communication connection to a corresponding type of telephone line. As another example, communication interface 2718 may be a local area network ("LAN") card to provide a data communication connection to a compatible LAN. Wireless links may also be implemented. In any such implementation, communication interface 2718 sends and receives electrical, electromagnetic or optical signals that carry digital data streams representing various types of information.

Network link 2720 typically provides data communication through one or more networks to other data devices. For example, network link 2720 may provide a connection through local network 2722 to a host computer 2724 or to data equipment operated by an Internet Service Provider ("ISP") 2726. ISP 2726 in turn provides data communication services through the world wide packet data communication network now commonly referred to as the "Internet" 2728. Local network 2722 and Internet 2728 both use electrical, electromagnetic or optical signals that carry digital data streams. The signals through the various networks and the signals on network link 2720 and through communication interface 2718, which carry the digital data to and from computer system 2700, are exemplary forms of carrier waves transporting the information.

Computer system 2700 can send messages and receive data, including program code, through the network(s), network link 2720 and communication interface 2718. In the Internet example, a server 2730 might transmit a requested code for an application program through Internet 2728, ISP 2726, local network 2722 and communication interface 2718. In accordance with the invention, one such downloaded application provides for automatic re-provisioning of network elements to adapt to failures as described herein.

The received code may be executed by processor 2704 as it is received, and/or stored in storage device 2710, or other non-volatile storage for later execution. In this manner, computer system 2700 may obtain application code in the form of a carrier wave.

5.0 Extensions and Alternatives

In an alternative embodiment, a cluster may include multiple redundant switches, for each switch-A and switch-B respectively. Thus, a cluster has a pool of switches corresponding to switch-A, and one of the pools is active. The same applies to switch-B. Within each pool of switches, each physical interface is electrically in parallel with all the corresponding the interfaces of all the other switches. Within a given pool, only the active switch has interfaces that are electrically active. All the other (non-active) switches in the pool are unconfigured with respect to any application connections and in an electrically shutdown state on all the interfaces. However, at least one interface on each switch provides connectivity to the cluster manager 110. There is sufficient configuration on even the non-active switches in the pool to support event bus communication to the cluster manager. When a failure occurs within one of the cluster network elements, the switch re-configuration is managed as the following set of steps:

i. New switch configuration is broadcast on event bus to event bus group name shared by all switches in the switch-pool-A (or switch-pool-B, depending). The switch configuration event contains a unique-ID generated by the cluster manager 110.

ii. New switch UN-configuration is also broadcast as above.

iii. All switches would apply the configuration and then all would broadcast the 'config-success' event acknowledging successful apply of config. The config-success event echoes back the unique-ID contained in the original configure event, and it contains a timestamp generated on the switch which applied the config indicating the time the config was applied.

iv. If switch detects a config-success event published by a switch other than itself with a time stamp earlier than the time stamp of its own published config-success then it applies the UN-configuration that was also published (for this purpose) from the cluster manager. If this switch did not yet apply the configuration originally published by the cluster manager, then it abandons the request (since another switch seems to have done that already.

v. Clock synchronization among the cluster manager and all the switches is provided. Existing methods of providing clock synchronization are known in other broadcast mediums such as cable and fixed wireless.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX—EXAMPLE APPLICATION PROGRAMMING INTERFACE

TABLE OF CONTENTS

UNITED STATES PATENT APPLICATION ........................................................................................... 1

AUTOMATIC RE-PROVISIONING OF NETWORK ELEMENTS TO ADAPT TO FAILURES ............ 1

HICKMAN PALERMO TRUONG & BECKER LLP ................................................................................ 1

AUTOMATIC RE-PROVISIONING OF NETWORK ELEMENTS TO ADAPT TO FAILURES ............ 1

1 OVERVIEW ........................................................................................................................................ 57

2 FEATURE LIST .................................................................................................................................. 57
    2.1    MANAGING CNS CLUSTER FAILOVER .................................................................................... 57
    2.2    PROVISIONING SERVICE REQUEST ON CLUSTER USING CNS CLUSTER FAILOVER API ........ 58
    2.3    CLUSTER STATUS ..................................................................................................................... 59

3 SYSTEM ARCHITECTURE .............................................................................................................. 59

4 FEATURE USE SCENARIO AND XML DTD DEFINITION ......................................................... 60
    4.1    CLUSTER MANAGEMENT USE SCENARIO ............................................................................. 61
        *4.1.1    Creating Cluster* ........................................................................................................ 61
        *4.1.2    Remove a primary or backup router from a cluster after activation* ........................ 62
        *4.1.3    Adding primary or backup router to a cluster after activation* ................................ 62
        *4.1.4    Deactivate and activating a cluster* ........................................................................... 63
        *4.1.5    Replacing ingress or egress switch* .......................................................................... 65
    4.2    CLUSTER PROVISIONING USE SCENARIO ............................................................................. 65
        *4.2.1    Templates example for RBE protocol* ....................................................................... 65
        *4.2.2    Provisioning connection unrelated Service Feature* .................................................. 66
        *4.2.3    Modify Service Feature Provisioning* ....................................................................... 69
        *4.2.4    Configure connection related Provisioning* .............................................................. 71
        *4.2.5    Unprovisioning* .......................................................................................................... 73
        *4.2.6    Sample IE2100 configuration templates and use cases for LAC* .............................. 73
        *4.2.7    Sample IE2100 configuration templates and use cases for LAC* .............................. 73
    4.3    XML DTD DEFINITIONS .......................................................................................................... 73
        *4.3.1    Common XML DTD* .................................................................................................. 73
        *4.3.2    Create Device DTD* ................................................................................................... 75
        *4.3.3    Delete Device DTD* ................................................................................................... 75
        *4.3.4    Create Clusters DTD* ................................................................................................. 76
        *4.3.5    Delete Clusters DTD* ................................................................................................. 76
        *4.3.6    Associate switches to Cluster DTD* ........................................................................... 77
        *4.3.7    Associate Aggregator Router to Cluster DTD* .......................................................... 78
        *4.3.8    unassociate switches from Cluster DTD* ................................................................... 79
        *4.3.9    unassociate aggregator router from Cluster DTD* .................................................... 79
        *4.3.10    Activate-clusters DTD* ............................................................................................. 80
        *4.3.11    Deactivate-cluster DTD* ........................................................................................... 80
        *4.3.12    Force-failover DTD* ................................................................................................ 81
        *4.3.13    Provision-routers DTD* ........................................................................................... 81
        *4.3.14    Provision-switches DTD* ......................................................................................... 82

|     |       |                              |     |
| --- | ----- | ---------------------------- | --- |
|     | 4.3.15 | *Provision-connection DTD*  | *83* |
|     | 4.3.16 | *Modify-provision DTD*      | *84* |
|     | 4.3.17 | *Delete-provision DTD*      | *85* |
| 4.4 |       | CNS CLUSTER FAILOVER EVENTS | 85  |
|     | 4.4.1 | *Device Failure DTD*        | *85* |
|     | 4.4.2 | *Device Failure Sample XML* | *86* |
|     | 4.4.3 | *Device Recover DTD*        | *86* |
|     | 4.4.4 | *Device Recover Sample XML* | *86* |
|     | 4.4.5 | *Failover Start DTD*        | *86* |
|     | 4.4.6 | *Failover Start Sample XML* | *87* |
|     | 4.4.7 | *Failover End DTD*          | *87* |
|     | 4.4.8 | *Failover End Sample XML*   | *87* |
| 4.5 |       | ERROR CODE                  | 88  |

1 Overview

CCNSC SP provides features to manage the CNS Cluster Failover and provisioning user request using CNS Cluster Failover to benefit from the high availability feature. Communication between the CCNSC SP and CNS Cluster Failover follows standard CNS client server communication as described in "Cisco Network Services SDK Programmer's Guide and API Reference".

CNS Cluster Failover consists of a Java HTTP servlet that receives XML requests via an HTTP POST. An XML request must be submitted as form data using the MIME content type multipart/form-data, as the value of the parameter named command (i.e. a name/value pair where the name is command and the value is the XML content).

This document describes some use scenario of features supported by CCNSC SP and defines the XML DTD for each function that need to be provided by CNS Cluster Failover to support those features.

2 Feature List

This section shows features that can be supported by CCNSC related to managing 7400s cluster and provisioning Service Request using CNS Cluster Failover.

2.1 Managing CNS Cluster Failover

CCNSC SP may allow user to manage the CNS Cluster using CCNSC SP GUI. Those features are:

- Create and delete Cluster.
- Associate switch to and de-associate switch from a Cluster
- Associate aggregator router to and de-associate aggregator router from a Cluster
- Designate aggregator router(s) to become backup router of a Cluster
- Show the properties of a Cluster.

- Retrieves information about Clusters, which are created through CNS Cluster Failover prior to CCNSC SP. This information is used for recreation of the cluster information into CCNSC SP modeling
- Receives events generated by CNS Cluster Failover when cluster is created through IE2100's GUI to maintain consistency between the CNS Cluster Failover and CCNSCP SP

2.2 Provisioning Service Request on Cluster using CNS Cluster Failover API

CCNSC SP is a Service Feature based provisioning system. CCNSC SP fulfills a Service Request by applying a set of Service Features to the network entity (Device, Radius Server, etc). For IOS based device, each Service Feature can be associated with one or many configuration templates.

When provisioning a service request on cluster, CCNSC SP invokes CNS Cluster Management API to apply the configuration. The Service Request can be applied in following cases:

- Initialization Configuration. During initialization, operator chooses the Service Feature to be applied to the cluster. The following list some examples of the Service Feature that are available to user
    - Basic Service Feature
    - Add DHCP Service Feature
    - Add IPPool Service Feature
    - Add Radius Server Service Feature
    - Add VirtualTemplate Service Feature
- Adding Service Feature (non connection related). CCNSC SP allows user to provision additional Service Feature whenever required
    - Add IPPool Service Feature
    - Add Radius Server Service Feature
    - Add Virtual Template Service Feature
- Adding Service Feature (connection related). CCNSC SP allows user to provision a subscriber session, such as

- o Add PVC Session
- o Add PVC Range
- Modifying Service Feature. CCNSC SP allows. User to modify previously provisioned service feature, such as changing the IP Pool range.

2.3 Cluster Status

Using CCNSC SP, user could view the status of a cluster, such as,

- The status of the router (backup or primary)
- The PVC connections of each 7400s
- The device assign to cluster
- The fail over history

3 System Architecture

Cluster is a logical collection of devices that comprise of an ingress switch, egress switch, one or two IE 2100 and a set of aggregator routers. Aggregator routers can have the role as active router or backup router. The following list assumptions about cluster

- Ingress and egress switch can be the same physical switch
- Ingress and egress switch can be shared between clusters
- Egress switch is not mandatory
- IE2100 can be shared between clusters
- Aggregator router can not be shared among clusters
- User will have to ensure connection between routers and switches and IE2100s
- CCNSC SP does not aware of physical location of routers and switches The following diagram shows the system architecture of the CCNSC SP and CNS Cluster Failover interaction

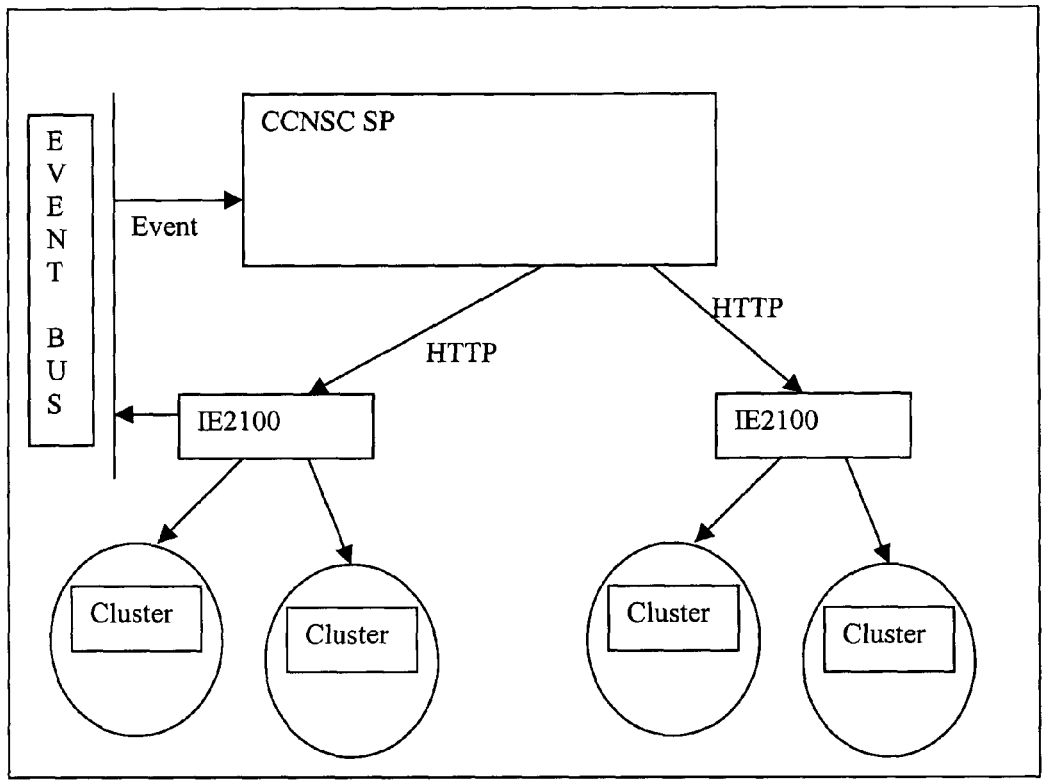
Figure 1 System Architecture
4 Feature Use Scenario and XML DTD definition
This section discusses the use scenario for features that will be supported by CCNSC SP and defines the XML DTD for each operation.

4.1 Cluster Management Use Scenario
4.1.1 Creating Cluster
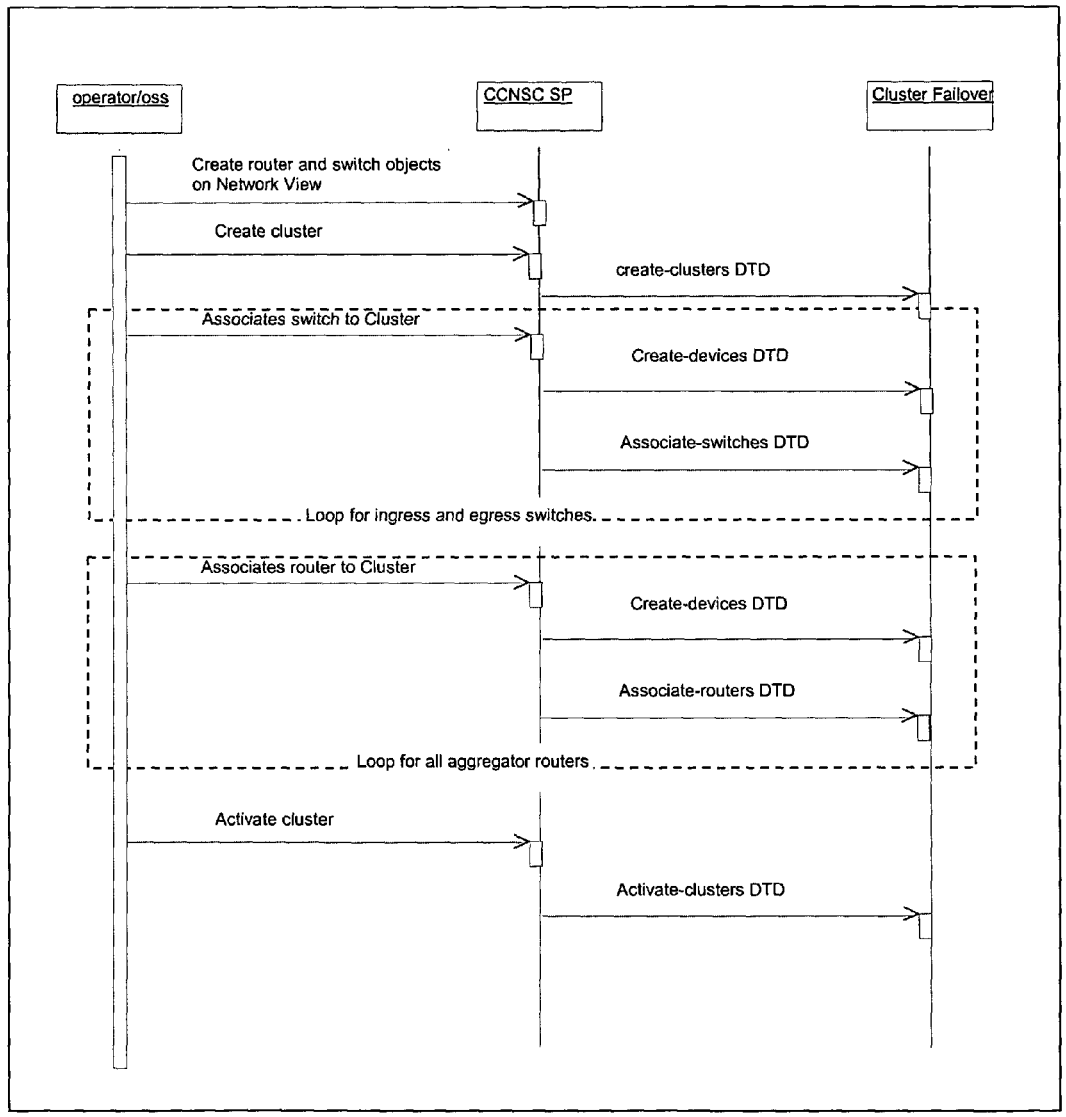
Figure 2 Creating Cluster

4.1.2 Remove a primary or backup router from a cluster after activation

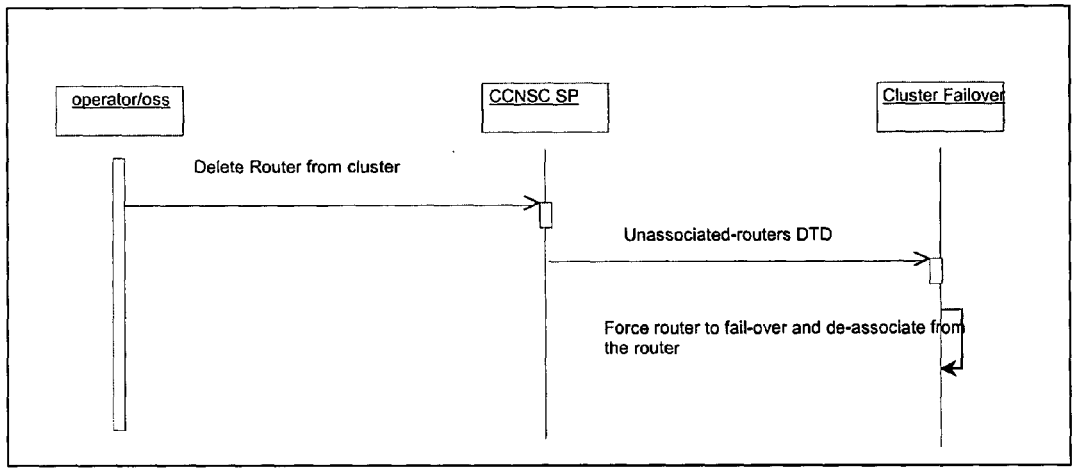

Figure 3 Remove Aggregator Router from Cluster

Note: If the selected aggregator router is an active router and the force-failover is true, CNS Cluster Failover will force the fail-over on the router and then remove it from the cluster. The force-failover is used to prevent client to de-associate an active cluster unintentionally.

4.1.3 Adding primary or backup router to a cluster after activation

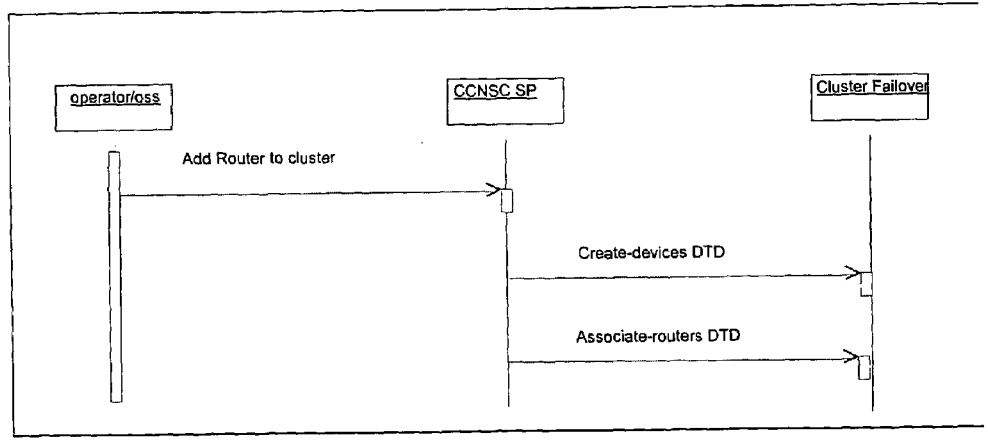
Figure 4 Add Aggregator Router to Cluster
4.1.4 Deactivate and activating a cluster
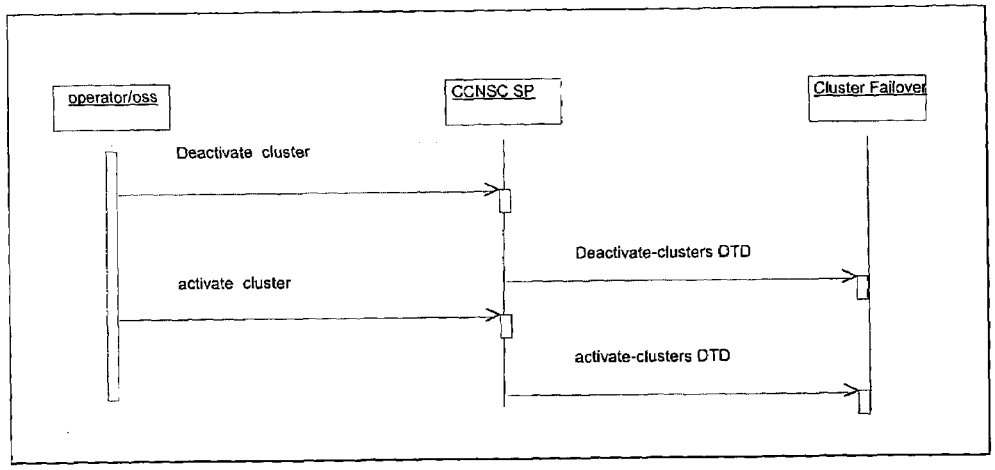
Figure 5 Activate/Deactivate Cluster
Note:
1. *deactivate-cluster* operation removes the configlets by applying negation configuration to the physical devices but does not remove the provision object (connection object) from the IE2100.

2. *activate-cluster* operation applies configlets on physical devices (router and switches)

During the activation process, CNS Cluster Failover performs following operations, among other things,
   - If there are provision objects (connection object) for the switch, apply them to the switch
   - If there are initial configurations for the switch interface, apply them to the switch. This initial configuration is provided to the IE2100 during *associate-router* operation
   - If there are initial configuration for the router, apply them to the router. This initial configuration is provided to the IE2100 during *associate-router* operation
   - If there are provision objects (connection object) for routers, apply them to the router.

The initial configuration for the switch and the router is provided to the CNS Cluster Failover during the association of the router to the cluster (associate-router DTD).

4.1.5 Replacing ingress or egress switch

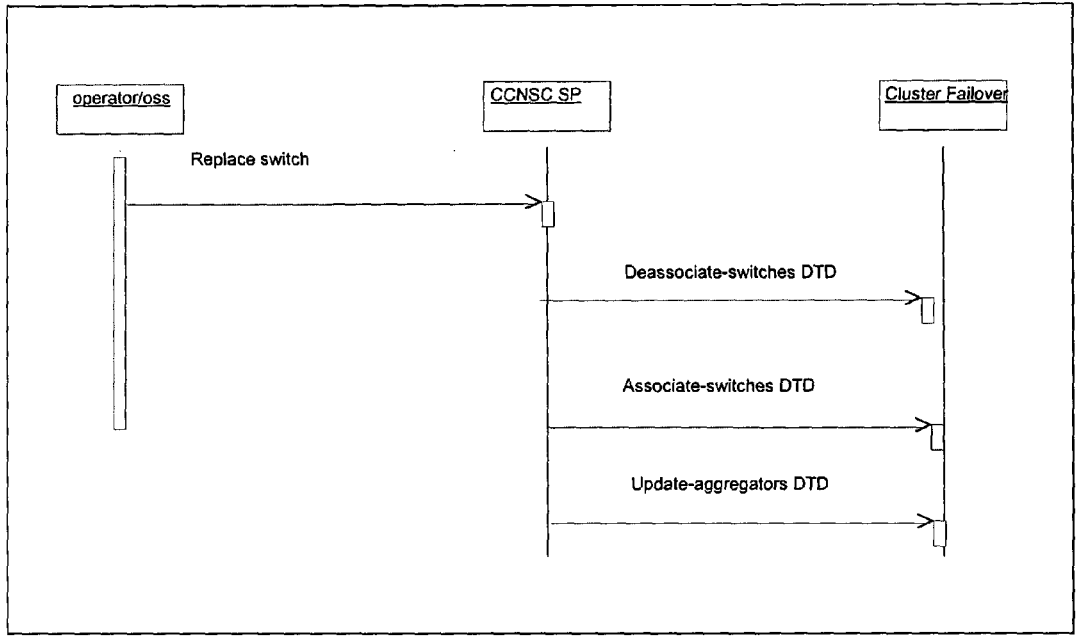

Figure 6 Replacing Switch

Note:

1. An ingress or egress switch can not be replace on active cluster.

2. When an ingress or an egress switch is replace, the link information between the aggregator and the switches need to be updated (update-aggregator DTD)

*4.2 Cluster Provisioning use scenario*

CNS Cluster Failover provides 4 XML DTDs for cluster provisioning. Those XML DTD are *provision-routers, provision-switches, provision-connection, modify-provision and delete-provision* XML DTDs.

4.2.1 Templates example for RBE protocol

CCNSC SP creates configuration templates on IE2100 template manager for switches and aggregator routers.

- ingress-switch-add-connection.cfgtpl

Interface ${LDAP://this:attrName=SW1InterfaceName}
${LDAP://this:attrName=ingress-switch-add-connection-configlet}

Note: the ${LDAP://this:attrName=SW1InterfaceName} is the special keyword that is used by CNS Cluster Failover to perform fail over operation.

- ingress-switch-delete-connection.cfgtpl

Interface ${LDAP://this:attrName=SW1InterfaceName}
    ${LDAP://this:attrName=ingress-switch-delete-connection-configlet}

- device-provision.cfgtpl ${LDAP://this:attrName=device-provision-configlet}

- device-unprovision.cfgtpl ${LDAP://this:attrName=device-unprovision-configlet}

4.2.2 Provisioning connection unrelated Service Feature

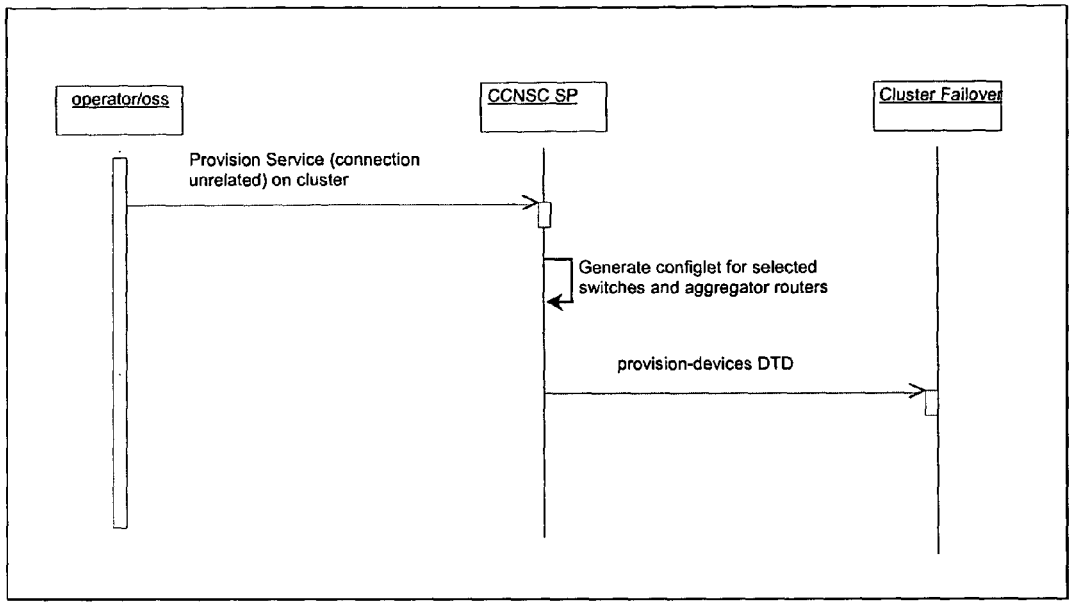

Figure 7 Provisioning Basic Service Features

The connection unrelated provisioning could be as simple as setting the hostname, IP Address or configuring the Virtual Template. For each device (aggregator router or ingress/egress switch) that needs to be provisioning for basic service, CCNSC SP creates the required configlet for provisioning and configlet for un-provisioning.

CCNSC SP invokes HTTP POST commands using *provision-routers or provision-switches* DTD. The following shows the example XML file for configuring an ingress switch and multiple aggregator routers. In this example, the provision-devices request provisioning 2 aggregator routers

```
<provision-devices>
  <cluster-name> cluster-1 </cluster-name>
  <provision-id> provision-number-1 </provision-id>

<configuration-info>
    <device-name> 7400-1 </device-name>
```

```xml
      <provision-template-name> device-provision.cfgtpl </provision-template-name>
      <unprovision-template-name> device-unprovision.cfgtpl </unprovision-template-name>
      <attribute-avpair>
        <attribute-name> device-provision-configlet </attribute-name>
        <attribute-value> a configlet string </attribute-value>
      </attribute-avpair>
      <attribute-avpair>
        <attribute-name> device-provision-configlet </attribute-name>
        <attribute-value> a configlet string </attribute-value>
      </attribute-avpair>
   </configuration-info>

<configuration-info>
      <device-name> 7400-2 </device-name>
      <provision-template-name> device-provision.cfgtpl </provision-template-name>
      <unprovision-template-name> device-unprovision.cfgtpl </unprovision-template-name>
      <attribute-avpair>
        <attribute-name> device-provision-configlet </attribute-name>
        <attribute-value> a configlet string </attribute-value>
      </attribute-avpair>
      <attribute-avpair>
        <attribute-name> device-provision-configlet </attribute-name>
        <attribute-value> a configlet string </attribute-value>
      </attribute-avpair>
   </configuration-info>
</provision-devices>
```

4.2.3 Modify Service Feature Provisioning

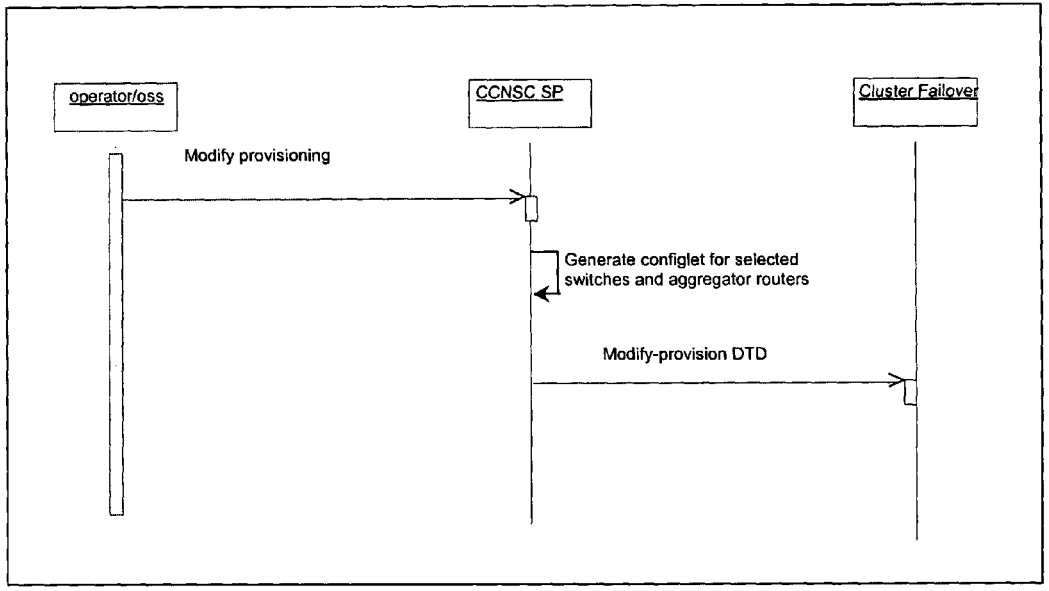

Figure 8 Modify Provisioning

The Modify Provisioning operation includes a provision-id (previously provisioned) and a set of configuration-info for devices. When invokes, the CNS Cluster Failover might do the following for each device, 1. Apply the negation configlet that is defined in the original *provision-devices* operation.
2. Replace the provision object (aka connection object) from the original provision operation with the new provision object
3. Apply the provision object to the device CCNSC SP invokes HTTP POST commands using *modify-provision* DTD. The following shows example XML file for modifying previous operation with *provision-id = provision-number-1*. In this example, the operation modify an aggregator router (the original provision request consists of 2 aggregator routers)

```xml
<modify-provision>
  <cluster-name> cluster-1 </cluster-name>
  <provision-id> provision-number-001 </provision-id>

<configuration-info>
    <device-name> 7400-1 </device-name>
    <provision-template-name> device-provision.cfgtpl </provision-template-name>
    <unprovision-template-name> device-unprovision.cfgtpl </unprovision-template-name>
    <attribute-avpair>
      <attribute-name> device-provision-configlet </attribute-name>
      <attribute-value> a configlet string </attribute-value>
    </attribute-avpair>
    <attribute-avpair>
      <attribute-name> device-provision-configlet </attribute-name>
      <attribute-value> a configlet string </attribute-value>
    </attribute-avpair>
  </configuration-info>

</modify-provision>
```

4.2.4 Configure connection related Provisioning

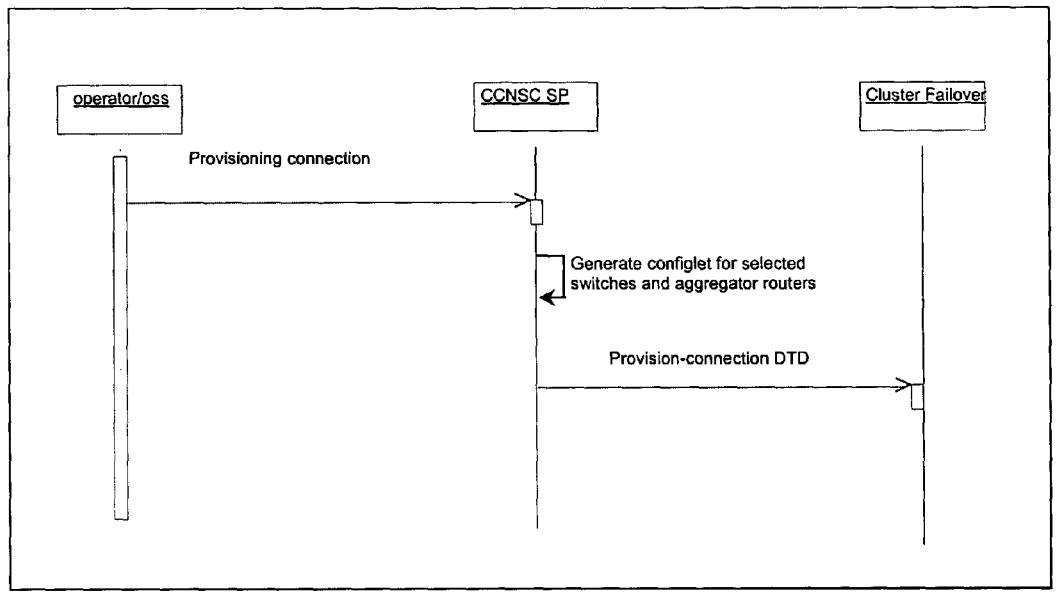

Figure 9 Provision Connection

Provision connection DTD uses a special IE2100 configuration template to allow CNS Cluster Failover to perform fail over operation. The following shows the example XML file for configuring a session

```
<provision-connection>
   <cluster-name> cluster-1 </cluster-name>
   <provision-id> provision-number-2 </provision-id>
   <ingress-switch-configuration-info>
     <configuration-info>
       <device-name> switch-1 </device-name>
       <provision-template-name> ingress-switch-add-connection.cfgtpl </provision-template-name>
       <unprovision-template-name> ingress-switch-delete-connection.cfgtpl </unprovision-template-name>
```

```xml
<!--Note: The SW1InterfaceName will be filled in by CNS Cluster Manager >
<          based on the given aggregator router>
<attribute-avpair>
  <attribute-name> ingress-switch-add-connection-configlet </attribute-name>
  <attribute-value> a configlet string </attribute-value>
</attribute-avpair>
<attribute-avpair>
  <attribute-name> ingress-switch-delete-connection-configlet </attribute-name>
  <attribute-value> a configlet string </attribute-value>
</attribute-avpair>
      </configuration-info>
    </ingress-switch-configuration-info>
    <router-configuration-info>
      <configuration-info>
        <device-name> 7400-1 </device-name>
        <provision-template-name> device-provision.cfgtpl </provision-template-name>
        <unprovision-template-name> device-unprovision.cfgtpl </unprovision-template-name>
        <attribute-avpair>
          <attribute-name> device-provision-configlet </attribute-name>
          <attribute-value> a configlet string </attribute-value>
        </attribute-avpair>
        <attribute-avpair>
          <attribute-name> device-unprovision-configlet </attribute-name>
          <attribute-value> a configlet string </attribute-value>
        </attribute-avpair>
      </configuration-info>
    </router-configuration-info>
</provision-connection>
```

4.2.5 Unprovisioning

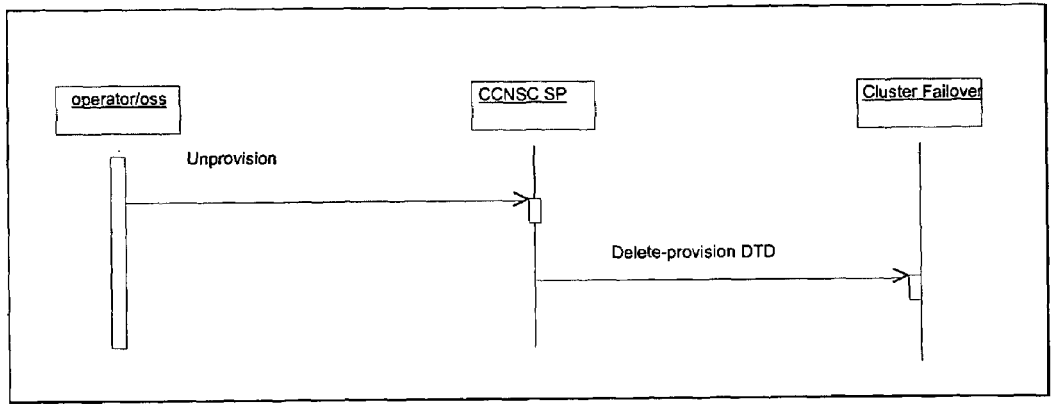

Figure 10 Unprovisioning

The following shows the example XML file for configuring a session

```
<delete-provision>
    <cluster-name> cluster-1 </cluster-name>
    <provision-id> provision-number-2 </provision-id>
</delete-provision>
```

4.2.6 Sample IE2100 configuration templates and use cases for LAC
TBD

4.2.7 Sample IE2100 configuration templates and use cases for LAC
TBD

4.3 XML DTD definitions

4.3.1 Common XML DTD

Each DTD will have a common section and operation specific section. The common XML DTD follows the specification defined in Cisco Networking Services SDK Programmer's Guide and API Reference.

*<!ELEMENT cns-request (message-id, security, message) >*
*<!ELEMENT cns-response (message-id, status, message)>*

*<!ELEMENT message-id (#PCDATA)>*
*<!ELEMENT security (username, password)>*
*<!ELEMENT username (#PCDATA)>*
*<!ELEMENT password(#PCDATA)>*
*<!—note: >*
*<!ELEMENT status(#PCDATA)>*

Cluster Failover specific DTD will be

*<!ELEMENT message ( cluster-management)>*

*<!ELEMENT cluster-management ( create-devices,*
*delete-devices,*
*entities-operation-result,*
*create-clusters,*
*delete-clusters,*
*associate-switches,*
*associate-routers,*
*unassociate-switches,*
*unassociate-routers,*
*activate-clusters,*
*deactivate-clusters,*
*force-failover,*
*provision-routers,*
*provision-switches,*
*modify-provision,*
*provision-connection,*

*delete-provision*
*)>*

4.3.2 Create Device DTD

1. Request DTD

*<!-- Interface: create-devices -->*
   *<!ELEMENT create-devices (device-object+)>*
   *<!ELEMENT device-object(device-name, device-type, device-connection-info)>*
   *<!ELEMENT device-connection-info(device-ip,*
           *telnet-login-name,*
           *telnet-login-password,*
           *enable-password)>*

2. Response DTD

*<!-- Interface: entities-operation-result -->*
   *<!ELEMENT entities-operation-result (entity-operation-result)>*
   *<!ELEMENT entity-operation-result (entity-name, error-info)>*
   *<!ELEMENT error-info(error-code, error-message)>*
     *<!-- Note: entity-name is the device-name>*

The error-code value can be:

| | |
   |---|---|
   | 2001 – 2010 | : Generic error message |
   | 2011 | : Device name is not unique |
   | 2024 | : Device is unreachable |
   | 2025 | : Device authentication failed |

4.3.3 Delete Device DTD

1. Request DTD

*<!-- Interface: delete-devices -->*
   *<!ELEMENT delete-devices(device-name+)>*

*<!ELEMENT device-name (#PCDATA)>*

2. Response DTD

The response of the operation uses the *entities-operation-result* DTD

*<!-- Interface: entities-operation-result -->*

The error-code value can be:

| 2001 – 2010 | : Generic error message |
   | 2012 | : Device name does not exist in IE2100 |

4.3.4 Create Clusters DTD

1. Request DTD

*<!-- Interface: create-clusters -->*
   *<!ELEMENT create-clusters (cluster-info+)>*
   *<!ELEMENT cluster-info(cluster-name, connection-mode)>*
   *<!—Note: connection-mode can be "round-robin", "fill-up" or "user-defined">*

2. Response DTD

The response of the operation uses the *entities-operation-result* DTD
   *<!-- Interface: entities-operation-result -->*

The error-code value can be:

| 2001 – 2010 | : Generic error message |
   | 2014 | : Cluster name is not unique |

4.3.5 Delete Clusters DTD

1. Request DTD

*<!-- Interface: delete-clusters -->*
   *<!ELEMENT delete-clusters(cluster-name+, force-deactivation)>*

*<!ELEMENT cluster-name (#PCDATA)>*

*<--Note: force-deactivation can be "true" or "false", if "false", then an activated cluster can not be delete>*

2. Response DTD

The response of the operation will use the *entities-operation-result* DTD.

*<!--Interface: entities-operation-result -->*

The error-code value could be:
   - 2001 – 2010 : Generic error message
   - 2015 : Cluster name does not exist in IE2100
   - 2029 : Cluster is in active state Note: The force-deactivation flag is added to ensure that the client (CCNSC SP) does not accidentally delete an active cluster.

4.3.6 Associate switches to Cluster DTD

1. Request DTD

*<!-- Interface: associate-switches -->*

*<!ELEMENT associate-switches (cluster-name, ingress-switch-name, egress-switch-name)>*

Note:
   i. *ingress-switch-name* and *egress-switch-name* can be the same physical switch.
   ii. CCNSC SP might associate ingress switch and egress switch independently. When associate ingress switch only, the egress switch-name will be empty 2. Response DTD The response of the operation uses the *entities-operation-result* DTD

*<!-- Interface: entities-operation-result -->*

The error-code value can be:

| | |
|---|---|
| 2001 – 2010 | : Generic error message |
| 2015 | : Cluster name does not exist in IE2100 |
| 2017 | : Ingress switch name does not exist in IE2100 |
| 2020 | : Egress switch name does not exist in IE2100 |

4.3.7 Associate Aggregator Router to Cluster DTD

1. Request DTD

*<!-- Interface: associate-routers -->*

*<!ELEMENT associate-router (cluster-name, router-connection-info+)>*

*<!ELEMENT router-connection-info (router-name,*

*router-type,*

*maximum-connection,*

*ingress-switch-interface,*

*egress-switch-interface,*

*ingress-switch-interface-initial-configlet,*

*egress-switch-interface-initial-configlet,*

*router-initial-configlet*

*)>*

Note:

- router-type can be "primary" or "backup"
- maximum-connection can be just any number, if the connection-mode is "user-defined" during the creation of cluster
- Removed ingress-router-interface and egress-router-interface from original DTD, since it is not used
- Ingress-switch-interface-initial-configlet, egress-switch-interface-initial-configlet, and router-initial-configlet are the configlet used by CNS Cluster Failover during the cluster activation 2. Response DTD The response of the operation uses the *entities-operation-result* DTD `<!-- Interface: entities-operation-result -->`

The error-code value can be:

| | |
|---|---|
| 2001 – 2010 | : Generic error message |
| 2015 | : Cluster name does not exist in IE2100 |

4.3.8 unassociate switches from Cluster DTD

1. Request DTD

`<!-- Interface: unassociate-switches -->`
`<!ELEMENT unassociated-switches (cluster-name, ingress-switch-name, egress-switch-name)>`

2. Response DTD

The response of the operation uses the *entities-operation-result* DTD

`<!—Interface: entities-operation-result -->`

The error-code value can be:

| | |
|---|---|
| 2001 – 2010 | : Generic error message |
| 2015 | : Cluster name does not exist in IE2100 |
| 2018 | : Ingress switch name does not exist in Cluster |
| 2020 | : Egress switch name does not exist in IE2100 |

4.3.9 unassociate aggregator router from Cluster DTD

1. Request DTD

`<!-- Interface: unassociate-routers -->`
`<!ELEMENT unassociated-routers (cluster-name, router-name+, force-failover)>`

2. Response DTD

The response of the operation uses the *entities-operation-result* DTD

<!—*Interface: entities-operation-result* -->

The error-code value can be:

2001 – 2010   : Generic error message
    2015           : Cluster name does not exist in IE2100
    2018           : Ingress switch name does not exist in Cluster
    2020           : Egress switch name does not exist in IE2100

4.3.10 Activate-clusters DTD

1. Request DTD

<!—*Interface: activate-clusters* -->
<!ELEMENT *activate-clusters (cluster-name+)*>

2. Response DTD

The response of the operation uses the *entities-operation-result* DTD

<!—*Interface: entities-operation-result* -->

The error-code value can be:

2001 – 2010   : Generic error message
    2015           : Cluster name does not exist in IE2100
    2026           : Cluster has been activated

4.3.11 Deactivate-cluster DTD

1. Request DTD

<!-- *Interface: deactivate-clusters* -->
<!ELEMENT *deactivate-clusters (cluster-name+)*>

2. Response DTD

The response of the operation uses the *entities-operation-result* DTD

*<!—Interface: entities-operation-result -->*

The error-code value can be:

| | |
|---|---|
| 2001 – 2010 | : Generic error message |
| 2015 | : Cluster name does not exist in IE2100 |
| 2027 | : Cluster has been deactivated |

4.3.12 Force-failover DTD

1. Request DTD

*<!—Interface: force-failover -->*
*<!ELEMENT force-failover (cluster-name, device-name)>*

2. Response DTD

The response of the operation uses the *entities-operation-result* DTD

*<!—Interface: entities-operation-result -->*

The error-code value can be:

| | |
|---|---|
| 2001 – 2010 | : Generic error message |
| 2015: | : Cluster name does not exist in IE2100 |
| 2012 | : Device name does not exist in IE2100 |
| 2028 | : Force failover failed |

4.3.13 Provision-routers DTD

1. Request DTD

*<!-- Interface: provision-routers -->*
*<!ELEMENT provision-routers (cluster-name,*
                            *provision-id,*
                            *configuration-info+)>*

```
<!ELEMENT configuration-info (device-name,
                              template-name,
                              negation-template-name,
                              attribute-avpair+)
<!ELEMENT attribute-avpair(attribute-name, attribute-value)
<!--Note: provision-unique-id must be unique within a cluster>
<!--      ingress-switch-info and egress-switch-info can be empty>
```

2. Response DTD

The response of the operation uses the *entities-operation-result* DTD

```
<!-- Interface: entities-operation-result -->
```

The error-code value can be:

2001 – 2010   : Generic error message
    2015           : Cluster name does not exist in IE2100

The *provision-routers* DTD is used to provision service request that is not related to a connection. When receiving this request, CNS Cluster Failover creates a provision object (or connection object) for each device in *configuration-info* sequence. If the cluster has been activated, CNS Cluster Failover will also provision the physical device.

The *provision-id* (or connection name) is used for the identification of this request. It will also be used during the modify provisioning and delete provisioning request. CCNSC SP needs to provide a unique *provision-id* for a given cluster.

4.3.14 Provision-switches DTD

1. Request DTD

```
<!-- Interface: provision-switches -->
<!ELEMENT provision-switches (cluster-name,
```

*provision-id,*

*configuration-info+)>*

<!ELEMENT configuration-info (device-name, template-name, negation-template-name, attribute-avpair+)

<!ELEMENT attribute-avpair(attribute-name, attribute-value)

<!--Note: provision-unique-id must be unique within a cluster>

<!--      ingress-switch-info and egress-switch-info can be empty>

2. Response DTD

The response of the operation uses the *entities-operation-result* DTD

<!-- Interface: entities-operation-result -->

The error-code value can be:

2001 – 2010   : Generic error message

2015          : Cluster name does not exist in IE2100

4.3.15 Provision-connection DTD

1. Request DTD

<!-- Interface: provision-connection -->

<!ELEMENT provision-connection (cluster-name,

*provision-id,*

*ingress-switch-info,*

*egress-switch-info,*

*aggregator-router-info+)>*

<!ELEMENT ingress-switch-info(configuration-info)>

<!ELEMENT egress-switch-info(configuration-info)>

<!ELEMENT aggregator-router-info(configuration-info)>

2. Response DTD

The response of the operation uses the *entities-operation-result* DTD

<!-- Interface: entities-operation-result -->

The error-code value can be:
- 2001 – 2010 : Generic error message
- 2015 : Cluster name does not exist in IE2100

The *provision-connection* DTD is used to provision service request that is related to a connection. This operation might include an ingress switch, an egress switch and an aggregator router. The IE2100 configuration template for the switches is designed to allow the CNS Cluster Failover to handle a fail over event.
An example of the switch configuration template can be
    Interface {SW1InterfaceName}
        {LDAP://this:attrName=configlet}
The *SW1InterfaceName* attribute allows CNS Cluster Failover to perform fail over by replacing it with the switch interface that connects to a backup router.

4.3.16 Modify-provision DTD

1. Request DTD
   <!—Interface: modify-provision -->
   <!ELEMENT modify-provision (cluster-name,
                       provision-id,
                       configuration-info+)>

2. Response DTD
   The response of the operation uses the *entities-operation-result* DTD
   <!—Interface: entities-operation-result -->

The error-code value can be:
   - 2001 – 2010 : Generic error message
   - 2015 : Cluster name does not exist in IE2100

Modify provision is used to modify previously provisioned service request. For example, modifying the ip pool range. The provision-id (connection name) must be of one that is previously provisioned.

4.3.17 Delete-provision DTD

1. Request DTD

*<!—Interface: delete-provision -->*
   *<!ELEMENT delete-provision (cluster-name,*
               *provision-id,*
               *device-name+)>*

2. Response DTD

The response of the operation uses the *entities-operation-result* DTD
   *<!—Interface: entities-operation-result -->*

The error-code value can be:
       2001 – 2010   : Generic error message
       2015          : Cluster name does not exist in IE2100

*4.4 CNS Cluster Failover Events*

4.4.1 Device Failure DTD

```
<?xml version="1.0" encoding="UTF-8"?>
<!-- edited with XML Spy v4.2 U (http://www.xmlspy.com) by ke liu (ibm) -->
<!--DTD generated by XML Spy v4.2 U (http://www.xmlspy.com)-->
<!--Comment describing your root element-->
<!ELEMENT device-failure (event-id, cluster-id, device-id)>
<!ELEMENT event-id (#PCDATA)>
<!ELEMENT cluster-id (#PCDATA)>
<!ELEMENT device-id (#PCDATA)>
```

4.4.2 Device Failure Sample XML

```xml
<?xml version="1.0" encoding="UTF-8"?>
<!-- edited with XML Spy v4.2 U (http://www.xmlspy.com) by ke liu (ibm) -->
<!--Sample XML file generated by XML Spy v4.2 U (http://www.xmlspy.com)-->
<!DOCTYPE device-failure SYSTEM "C:\Program Files\Altova\XML Spy Suite\Examples\lukeTest\deviceFailure.dtd">
<device-failure>
    <event-id>Text</event-id>
    <cluster-id>Text</cluster-id>
    <device-id>Text</device-id>
</device-failure>
```

4.4.3 Device Recover DTD

```xml
<?xml version="1.0" encoding="UTF-8"?>
<!--DTD generated by XML Spy v4.2 U (http://www.xmlspy.com)-->
<!--Comment describing your root element-->
<!ELEMENT device-recover (event-id, cluster-id, device-id+)>
<!ELEMENT event-id (#PCDATA)>
<!ELEMENT cluster-id (#PCDATA)>
<!ELEMENT device-id (#PCDATA)>
```

4.4.4 Device Recover Sample XML

```xml
<?xml version="1.0" encoding="UTF-8"?>
<!--Sample XML file generated by XML Spy v4.2 U (http://www.xmlspy.com)-->
<!DOCTYPE device-recover SYSTEM "C:\Program Files\Altova\XML Spy Suite\Examples\lukeTest\deviceRecover.dtd">
<device-recover>
    <event-id>Text</event-id>
    <cluster-id>Text</cluster-id>
    <device-id>Text</device-id>
</device-recover>
```

4.4.5 Failover Start DTD

```xml
<?xml version="1.0" encoding="UTF-8"?>
```

```
<!-- edited with XML Spy v4.2 U (http://www.xmlspy.com) by ke liu (ibm) -->
<!--DTD generated by XML Spy v4.2 U (http://www.xmlspy.com)-->
<!--Comment describing your root element-->
<!ELEMENT failover-start (event-id, cluster-id, failing-device-id, backup-device-id)>
<!ELEMENT event-id (#PCDATA)>
<!ELEMENT cluster-id (#PCDATA)>
<!ELEMENT failing-device-id (#PCDATA)>
<!ELEMENT backup-device-id (#PCDATA)>
```

4.4.6 Failover Start Sample XML

```
<?xml version="1.0" encoding="UTF-8"?>
<!--Sample XML file generated by XML Spy v4.2 U (http://www.xmlspy.com)-->
<!DOCTYPE failover-start SYSTEM "C:\Program Files\Altova\XML Spy Suite\Examples\lukeTest\failoverStart.dtd">
<failover-start>
    <event-id>Text</event-id>
    <cluster-id>Text</cluster-id>
    <failing-device-id>Text</failing-device-id>
    <backup-device-id>Text</backup-device-id>
</failover-start>
```

4.4.7 Failover End DTD

```
<?xml version="1.0" encoding="UTF-8"?>
<!--DTD generated by XML Spy v4.2 U (http://www.xmlspy.com)-->
<!--Comment describing your root element-->
<!ELEMENT failoverEnd (event-id, status)>
<!ELEMENT event-id (#PCDATA)>
<!ELEMENT status (return-code, return-message)>
<!ELEMENT return-code (#PCDATA)>
<!ELEMENT return-message (#PCDATA)>
```

4.4.8 Failover End Sample XML

```
<?xml version="1.0" encoding="UTF-8"?>
<!--Sample XML file generated by XML Spy v4.2 U (http://www.xmlspy.com)-->
<!DOCTYPE failoverEnd SYSTEM "C:\Program Files\Altova\XML Spy Suite\Examples\lukeTest\failoverEnd.dtd">
<failoverEnd>
    <event-id>Text</event-id>
```

```
<status>
    <return-code>Text</return-code>
    <return-message>Text</return-message>
</status>
</failoverEnd>
```

4.5 Error Code

| Error Code | Error Message | Description |
| --- | --- | --- |
| 200 | Success | The request succeeded |
| 400 | Request missing | No data was posted to the servlet |
| 2011 | Device name is not unique | Object name is not unique within IE2100 |
| 2012 | Device name does not exist in IE2100 | The object that is assigned to the cluster has not been created on IE2100 |
| 2013 | Device name does not exist in Cluster | |
| 2014 | Cluster name is not unique | |
| 2015 | Cluster name does not exist in IE2100 | |
| 2016 | Ingress switch name is not unique | |
| 2017 | Ingress switch name does not exist in IE2100 | |
| 2018 | Ingress switch name does not exist in Cluster | |
| 2019 | Egress switch name is not unique | |
| 2020 | Egress switch name does not exist in IE2100 | |
| 2021 | Egress switch name does not exist in Cluster | |
| 2023 | Cluster contains aggregator routers | |
| 2024 | Device is unreachable | |

| | | |
|---|---|---|
| 2025 | Device authentication failed | |
| 2026 | Cluster has been activated | |
| 2027 | Cluster has not been activated | |
| 2028 | Force failover failed | |
| 2029 | Cluster is in active state | |

What is claimed is:

1. A method of automatically re-provisioning a network element in adaptation to a failure, the method comprising the computer-implemented steps of:
   identifying a network element that has failed;
   a cluster manager selecting a substitute network element from among a pool of one or more available network elements to replace the specific network element identified as failing;
   the cluster manager receiving connection configuration information from the specific network element identified as failing;
   wherein the cluster manager is communicatively coupled to a cluster comprising a plurality of active network elements, the pool of one or more available network elements, a first network switch, and a second network switch;
   based on the connection configuration information, the cluster manager re-configuring the substitute network element and one or more switch devices associated with the identified network element, wherein the re-configuring causes the one or more switch devices to change one or more connections from the identified network element to the substitute network element;
   the cluster manager managing a plurality of connection objects corresponding to the number of subscribers in the network;
   wherein a connection object comprises a programmatic object that points to a fixed defined set of templates and contains attributes providing specific substitution values to be used when instantiating the templates into actual configurations; and
   the cluster manager logically re-associating all of the plurality of connection objects of the specific network element identified as failing with the new network element selected from the pool of available substitute network elements.

2. The method as recited in claim 1, wherein the specific network element identified as failing is one of a plurality of network elements in the cluster.

3. The method as recited in claim 1, further comprising:
   the cluster manager searching for a device in the free pool that is available for use as a fail-over device.

4. The method as recited in claim 1, wherein the step of re-configuring comprises the steps of sending a trigger event to the substitute network element that causes the substitute network element to retrieve a configuration over a network connection.

5. The method as recited in claim 1, wherein re-configuring comprises dynamically reconfiguring the selected network element as a logical clone of the identified network element.

6. The method as recited in claim 1, further comprising the step of associating the identified network element with the pool of available network elements.

7. The method as recited in claim 1, further comprising the steps of:
   sending an initial configuration to the substitute network element;
   sending a partial accumulated configuration to the substitute network element; and
   sending instructions that cause the identified network element to reboot based on a configuration setting of a cluster associated with the identified network element.

8. The method as recited in claim 1, further comprising the steps of:
   receiving first user input in a graphical user interface that associates the network elements in a cluster with a first switch and a second switch;
   receiving second user input that specifies which network elements are reserved in the pool of available network elements.

9. The method as recited in claim 1, wherein each of the network elements is a network aggregation device or a network access server.

10. The method as recited in claim 1, further comprising repeating the steps for multiple concurrently failed network elements.

11. The method as recited in claim 1, further comprising the steps of:
    receiving a message specifying a failure of a network element over an event bus on which the network elements publish events and on which a cluster manager subscribes to events;
    based on the message, identifying the network element that has failed.

12. The method as recited in claim 1, wherein the network switches are asynchronous transfer mode (ATM) switches, and wherein the network elements are routers in a packet-switched network.

13. The method as recited in claim 1, wherein the specific network element identified as failing is one of a plurality of network elements in the cluster.

14. The method as recited in claim 1, further comprising:
    the cluster manager using a keepalive or heartbeat protocol to determine the status of a plurality of stack elements.

15. The method as recited in claim 1, further comprising:
    a switch adjacent to a failing node sending an event on an event bus indicating that an interface on a failing switch is no longer active.

16. The method as recited in claim 15, further comprising:
    the cluster manager receiving notification of the event and identifying a node that has failed.

17. The method as recited in claim 16, further comprising:
    the cluster manager correlating an interface on the failing node to a specific stack element.

18. A method of automatically re-provisioning a network element in adaptation to a failure, the method comprising the computer-implemented steps of:
    receiving first user input that defines a cluster comprising a first network switch, a plurality of network elements, and a second network switch;
    receiving second user input that specifies one or more of the network elements as a pool of available network elements;
    identifying a network element that has failed;
    selecting a substitute network element from among the pool; and
    re-configuring the first network switch and the second network switch, wherein the re-configuring causes the first network switch and second network switch to change one or more connections from the identified network element to the substitute network element
    wherein the steps are performed by a cluster manager that is communicatively coupled to a cluster comprising a plurality of active network elements, the pool of one or more available network elements, the first network switch, and the second network switch;
    the cluster manager managing a plurality of connection objects corresponding to the number of subscribers in the network;
    wherein a connection object comprises a programmatic object that points to a fixed defined set of templates and contains attributes providing specific substitution values to be used when instantiating the templates into actual configurations; and the cluster manager logically re-associating all of the plurality of connection objects of the specific network element identified as failing with the substitute network elements selected from the pool of available substitute network elements.

19. The method as recited in claim 18, further comprising repeating the steps for multiple concurrently failed network elements.

20. The method as recited in claim 18, further comprising the steps of:
receiving a message specifying a failure of a network element over an event bus on which the network elements publish events and on which a cluster manager subscribes to events;
based on the message, identifying the network element that has failed.

21. The method as recited in claim 18, wherein the network switches are asynchronous transfer mode (ATM) switches, and wherein the network elements are routers in a packet-switched network.

22. The method as recited in claim 18, wherein the step of re-configuring comprises the steps of sending a trigger event to the substitute network element that causes the substitute network element to retrieve a configuration over a network connection.

23. The method as recited in claim 18, wherein re-configuring comprises dynamically reconfiguring the selected network element as a logical clone of the identified network element.

24. The method as recited in claim 18, further comprising the step of associating the identified network element with the pool of available network elements.

25. The method as recited in claim 18, further comprising the steps of:
sending an initial configuration to the substitute network element;
sending a partial accumulated configuration to the substitute network element; and
sending instructions that cause the identified network element to reboot based on a configuration setting of a cluster associated with the identified network element.

26. The method as recited in claim 18, wherein each of the network elements is a network aggregation device or a network access server.

27. A computer-readable medium storing one or more sequences of instructions for automatically re-provisioning a network element in adaptation to a failure, which instructions, when executed by one or more processors, cause the one or more processors to carry out the steps of:
identifying a network element that has failed;
a cluster manager selecting a substitute network element from among a pool of one or more available network elements to replace the specific network element identified as failing;
the cluster manager receiving connection configuration information from the specific network element identified as failing;
wherein the cluster manager is communicatively coupled to a cluster comprising a plurality of active network elements, the pool of one or more available network elements, a first network switch, and a second network switch;
based on the connection configuration information, the cluster manager re-configuring the substitute network element and one or more switch devices associated with the identified network element, wherein the re-configuring causes the one or more switch devices to change one or more connections from the identified network element to the substitute network element;
the cluster manager managing a plurality of connection objects corresponding to the number of subscribers in the network;
wherein a connection object comprises a programmatic object that points to a fixed defined set of templates intended to be applied to a stack device and adjacent switches, and contains attributes providing specific substitution values to be used when instantiating the templates into actual configurations; and
the cluster manager logically re-associating all of the plurality of connection objects of the specific network element identified as failing with the new network element selected from the pool of available substitute network elements.

28. The computer-readable medium as recited in claim 27, further comprising instructions for:
sending an initial configuration to the substitute network element;
sending a partial accumulated configuration to the substitute network element; and
sending instructions that cause the identified network element to reboot based on a configuration setting of a cluster associated with the identified network element.

29. The computer-readable medium as recited in claim 27, further comprising instructions for:
receiving first user input in a graphical user interface that associates the network elements in a cluster with a first switch and a second switch;
receiving second user input that specifies which network elements are reserved in the pool of available network elements.

30. The computer-readable medium as recited in claim 27, wherein each of the network elements is a network aggregation device or a network access server.

31. The computer-readable medium as recited in claim 27, further comprising instructions for repeatedly executing the instructions for multiple concurrently failed network elements.

32. The computer-readable medium as recited in claim 27, further comprising instructions for performing the steps of:
receiving a message specifying a failure of a network element over an event bus on which the network elements publish events and on which a cluster manager subscribes to events;
based on the message, identifying the network element that has failed.

33. The computer-readable medium as recited in claim 27, wherein the network switches are asynchronous transfer mode (ATM) switches, and wherein the network elements are routers in a packet-switched network.

34. The computer-readable medium as recited in claim 27, wherein the identified network element is one of a plurality of network elements in a cluster that is associated with first and second network switches.

35. The computer-readable medium as recited in claim 27, wherein the instructions for re-configuring further comprise instructions for sending a trigger event to the substitute network element that causes the substitute network element to retrieve a configuration over a network connection.

36. The computer-readable medium as recited in claim 27, wherein the instructions for re-configuring further comprise instructions for dynamically reconfiguring the selected network element as a logical clone of the identified network element.

37. The computer-readable medium as recited in claim 27, further comprising instructions for associating the identified network element with the pool of available network elements.

38. A method of automatically re-provisioning a network element in adaptation to a failure, the method comprising the computer-implemented steps of:
   a cluster manager identifying a network element that has failed;
   the cluster manager selecting a substitute network element from among a pool of one or more available network elements to replace the specific network element identified as failing;
   the cluster manager receiving connection configuration information from the specific network element identified as failing; and
   based on the connection configuration information, re-configuring the substitute network element and one or more switch devices associated with the identified network element, wherein the re-configuring causes the one or more switch devices to change one or more connections from the identified network element to the substitute network element;
   sending an initial configuration to the substitute network element;
   sending a partial accumulated configuration to the substitute network element; and
   sending instructions that cause the identified network element to reboot based on a configuration setting of a cluster associated with the identified network element;
   the cluster manager managing a plurality of connection objects corresponding to the number of subscribers in the network;
   wherein a connection object comprises a programmatic object that points to a fixed defined set of templates and contains attributes providing specific substitution values to be used when instantiating the templates into actual configurations; and
   the cluster manager logically re-associating all of the plurality of connection objects of the specific network element identified as failing with the new network element selected from the pool of available substitute network elements.

39. An apparatus for automatically re-provisioning a network element in adaptation to a failure, comprising:
   means for identifying a network element that has failed;
   means for selecting a substitute network element from among a pool of one or more available network elements to replace the specific network element identified as failing;
   means for receiving connection configuration information from the specific network element identified as failing; and
   means for re-configuring the substitute network element and one or more switch devices associated with the identified network element, based on the connection configuration information, wherein the re-configuring causes the one or more switch devices to change one or more connections from the identified network element to the substitute network element; and
   a cluster manager that is communicatively coupled to a cluster comprising the failed and substitute network elements and the one or more switch devices;
   the cluster manager managing a plurality of connection objects corresponding to the number of subscribers in the network;
   wherein a connection object comprises a programmatic object that points to a fixed defined set of templates intended to be applied to a stack device and adjacent switches, and contains attributes providing specific substitution values to be used when instantiating the templates into actual configurations; and
   the cluster manager logically re-associating all of the plurality of connection objects of the specific network element identified as failing with the new network element selected from the pool of available substitute network elements.

40. The apparatus as recited in claim 39, further comprising:
   means for sending an initial configuration to the substitute network element;
   means for sending a partial accumulated configuration to the substitute network element; and
   means for sending instructions that cause the identified network element to reboot based on a configuration setting of a cluster associated with the identified network element.

41. The apparatus as recited in claim 39, further comprising:
   means for receiving first user input in a graphical user interface that associates the network elements in a cluster with a first switch and a second switch;
   means for receiving second user input that specifies which network elements are reserved in the pool of available network elements.

42. The apparatus as recited in claim 39, wherein each of the network elements is a network aggregation device or a network access server.

43. The apparatus as recited in claim 39, further comprising means for using the other means repeatedly for multiple concurrently failed network elements.

44. The apparatus as recited in claim 39, further comprising:
   means for receiving a message specifying a failure of a network element over an event bus on which the network elements publish events and on which a cluster manager subscribes to events;
   means for identifying the network element that has failed, based on the message.

45. The apparatus as recited in claim 39, wherein the network switches are asynchronous transfer mode (ATM) switches, and wherein the network elements are routers in a packet-switched network.

46. The apparatus as recited in claim 39, wherein the identified network element is one of a plurality of network elements in a cluster that is associated with first and second network switches.

47. The apparatus as recited in claim 39, wherein the re-configuring means comprises means for sending a trigger event to the substitute network element that causes the substitute network element to retrieve a configuration over a network connection.

48. The apparatus as recited in claim 39, wherein the re-configuring means comprises means for dynamically reconfiguring the selected network element as a logical clone of the identified network element.

49. The apparatus as recited in claim 39, further comprising means for associating the identified network element with the pool of available network elements.

50. An apparatus for automatically re-provisioning a network element in adaptation to a failure, comprising:
- a network interface that is coupled to the data network for receiving one or more packet flows therefrom;
- a processor;
- one or more stored sequences of instructions which, when executed by the processor, cause the processor to carry out the steps of:
  - identifying a network element that has failed;
  - a cluster manager selecting a substitute network element from among a pool of one or more available network elements to replace the specific network element identified as failing;
  - the cluster manager receiving connection configuration information from the specific network element identified as failing; and
  - based on the connection configuration information, the cluster manager re-configuring the substitute network element and one or more switch devices associated with the identified network element, wherein the re-configuring causes the one or more switch devices to change one or more connections from the identified network element to the substitute network element;
  - the cluster manager managing a plurality of connection objects corresponding to the number of subscribers in the network;
  - wherein a connection object comprises a programmatic object that points to a fixed defined set of templates intended to be applied to a stack device and adjacent switches, and contains attributes providing specific substitution values to be used when instantiating the templates into actual configurations; and
  - the cluster manager logically re-associating all of the plurality of connection objects of the specific network element identified as failing with the new network element selected from the pool of available substitute network elements.

51. The apparatus as recited in claim 50, further comprising the step of associating the identified network element with the pool of available network elements.

52. The apparatus as recited in claim 50, further comprising the steps of:
- sending an initial configuration to the substitute network element;
- sending a partial accumulated configuration to the substitute network element; and
- sending instructions that cause the identified network element to reboot based on a configuration setting of a cluster associated with the identified network element.

53. The apparatus as recited in claim 50, further comprising the steps of:
- receiving first user input in a graphical user interface that associates the network elements in a cluster with a first switch and a second switch;
- receiving second user input that specifies which network elements are reserved in the pool of available network elements.

54. The apparatus as recited in claim 50, wherein each of the network elements is a network aggregation device or a network access server.

55. The apparatus as recited in claim 50, further comprising repeating the steps for multiple concurrently failed network elements.

56. The apparatus as recited in claim 50, further comprising the steps of:
- receiving a message specifying a failure of a network element over an event bus on which the network elements publish events and on which a cluster manager subscribes to events;
- based on the message, identifying the network element that has failed.

57. The apparatus as recited in claim 50, wherein the network switches are asynchronous transfer mode (ATM) switches, and wherein the network elements are routers in a packet-switched network.

58. The apparatus as recited in claim 50, wherein the step of re-configuring comprises the steps of sending a trigger event to the substitute network element that causes the substitute network element to retrieve a configuration over a network connection.

59. The apparatus as recited in claim 50, wherein re-configuring comprises dynamically reconfiguring the selected network element as a logical clone of the identified network element.

60. A method of automatically re-provisioning a network element in adaptation to a failure, the method comprising the computer-implemented steps of:
- a cluster manager identifying a network element that has failed;
- the cluster manager selecting a substitute network element from among a pool of one or more available network elements to replace the specific network element identified as failing;
- the cluster manager receiving connection configuration information from the specific network element identified as failing; and
- based on the connection configuration information, the cluster manager re-configuring the substitute network element and one or more switch devices associated with the identified network element, wherein the re-configuring causes the one or more switch devices to change one or more connections from the identified network element to the substitute network element;
- wherein the step of re-configuring comprises the steps of sending a trigger event to the substitute network element that causes the substitute network element to retrieve configuration information over a network connection;
- the cluster manager managing a plurality of connection objects corresponding to the number of subscribers in the network;
- wherein a connection object comprises a programmatic object that points to a fixed defined set of templates and contains attributes providing specific substitution values to be used when instantiating the templates into actual configurations; and
- the cluster manager logically re-associating all of the plurality of connection objects of the specific network element identified as failing with the new network element selected from the pool of available substitute network elements.

61. A method of automatically re-provisioning a network element in adaptation to a failure, the method comprising the computer-implemented steps of:
- a cluster manager identifying a network element that has failed;
- the cluster manager selecting a substitute network element from among a pool of one or more available network elements to replace the specific network element identified as failing;
- the cluster manager receiving connection configuration information from the specific network element identified as failing; and based on the connection configuration information, the cluster manager re-configuring the substitute network element and one or more switch devices associated with the identified network element, wherein the re-configuring causes the one or more switch devices to change one or more connections from the identified network element to the substitute network element;

wherein re-configuring comprises dynamically reconfiguring the selected network element as a logical clone of the identified network element;

the cluster manager managing a plurality of connection objects corresponding to the number of subscribers in the network;

wherein a connection object comprises a programmatic object that points to a fixed defined set of templates intended to be applied to a cluster, and contains attributes providing specific substitution values to be used when instantiating the templates into actual configurations; and when failover occurs, the cluster manager logically re-associating all of the plurality of connection objects of the specific network element identified as failing with the new network element selected from the pool of available substitute network elements.

* * * * *